(12) United States Patent
Gobara et al.

(10) Patent No.: US 7,929,541 B2
(45) Date of Patent: *Apr. 19, 2011

(54) COMMUNICATION SYSTEM, INFORMATION PROCESSING APPARATUS, SERVER, AND COMMUNICATION METHOD

(75) Inventors: Kunio Gobara, Osaka (JP); Hajime Maekawa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/574,774

(22) Filed: Oct. 7, 2009

(65) Prior Publication Data

US 2010/0023646 A1    Jan. 28, 2010

Related U.S. Application Data

(63) Continuation of application No. 10/576,065, filed as application No. PCT/JP2004/015721 on Oct. 22, 2004, now Pat. No. 7,623,513.

(30) Foreign Application Priority Data

Oct. 27, 2003  (JP) .................................. 2003-365668

(51) Int. Cl.
*H04L 12/28* (2006.01)
*H04L 12/56* (2006.01)

(52) U.S. Cl. ..................... 370/395.2; 709/222; 709/227; 709/228

(58) Field of Classification Search .......................... None
See application file for complete search history.

(56) References Cited

U.S. PATENT DOCUMENTS

| | | | |
|---|---|---|---|
| 7,031,275 B1 | 4/2006 | Borella et al. | |
| 7,227,872 B1 | 6/2007 | Biswas et al. | |
| 7,328,280 B2 | 2/2008 | Takeda et al. | |
| 2003/0210691 A1 | 11/2003 | Chen et al. | |
| 2004/0190549 A1* | 9/2004 | Huitema | 370/466 |
| 2005/0210126 A1 | 9/2005 | Friedman | |
| 2006/0101145 A1* | 5/2006 | Hoffman et al. | 709/227 |
| 2006/0218624 A1 | 9/2006 | Ravikumar et al. | |
| 2007/0091798 A1 | 4/2007 | Gobara et al. | |
| 2008/0215669 A1 | 9/2008 | Gaddy et al. | |

FOREIGN PATENT DOCUMENTS

JP         2004-180003          6/2004

(Continued)

OTHER PUBLICATIONS

International Search Report for Application No. PCT/JP2004/015721, Feb. 15, 2005, Panasonic Corporation.

(Continued)

*Primary Examiner* — Ayaz R Sheikh
*Assistant Examiner* — Peter Chau
(74) *Attorney, Agent, or Firm* — RatnerPrestia

(57) ABSTRACT

A first information processor transmits a bubble packet to a second communication control unit for leaving transmission record in a first communication control unit by way of the first communication control unit, a second information processor transmits a reply packet to one or more ports including at least the bubble packet transmitting port as the port of the first communication control unit used in transmission of bubble packet, and the first information processor receives the reply packet transmitted from the second information processor by way of the second communication control unit. In this configuration, the invention presents a communication system capable of establishing communication between plural information processors for communicating by way of communication control unit (NAT).

4 Claims, 28 Drawing Sheets

FOREIGN PATENT DOCUMENTS

| | | |
|---|---|---|
| JP | 2004-304317 | 10/2004 |
| WO | WO 02/082794 | 10/2002 |

OTHER PUBLICATIONS

Takuya Oikawa, "IPv6style; Advanced Networking Pack for Windows XP Daikaibo Dai 1 Kai IPv6 Setsuzoku o Sarani Tokateki ni suru Teredo," Sep. 29, 2003, [retrieval date Jan. 18, 2005], URL:http://www.ipv6style.jp/jp/tryout/20030929/20030929_p.shtml, with English translation.

"The Cable Guy-2003 Nen 4 Gatsu: Windows XP Peer-to-Peer Update no IPv6 Kino," (Apr. 2003), [retrieval date Jan. 18, 2005], URL:http//www.microsoft.com/japan/technet/community/columns/cableguy/cg0403.mspx, with English translation.

* cited by examiner

Second information processor 2

| Trans-<br>mission side \ Reception side | Full Cone NAT | R NAT | PR NAT | AS NAT | PS NAT |
|---|---|---|---|---|---|
| Full Cone NAT | O | O | O | O | O |
| R NAT | O | O | O | O | O |
| PR NAT | O | O | O | Δ | Δ |
| AS NAT | O | O | O | O | O |
| PS NAT | O | O | O | Δ | × |

O : Connection enabled
Δ : Connection enabled by exchanging transmission and reception
× : Connection disabled Second information processor 40

| Transmission side \ Reception side | Full Cone NAT | R NAT | PR NAT | AS NAT | PS NAT |
|---|---|---|---|---|---|
| Full Cone NAT | O | O | O | O | Δ |
| R NAT | O | O | O | O | Δ |
| PR NAT | O | O | O | O | Δ |
| AS NAT | O | O | O | O | Δ |
| PS NAT | O | O | O | O | × |

O : Connection enabled
Δ : Connection enabled by exchanging transmission and reception
× : Connection disabled

FIG. 41 PRIOR ART

| Reception side / Transmission side | Full Cone NAT | R NAT | PR NAT | AS NAT | PS NAT |
|---|---|---|---|---|---|
| Full Cone NAT | O * 1 | O * 1 | O * 1 | O * 2 | O * 2 |
| R NAT | O * 1 | O * 1 | O * 1 | O * 2 | O * 2 |
| PR NAT | O * 1 | O * 1 | O * 1 | O * 3 | O * 3 |
| AS NAT | O * 1 | O * 1 | O * 3 | O * 3 | O * 3 |
| PS NAT | O * 1 | O * 1 | × | × | × |

O : Connection enabled
× : Connection disabled

COMMUNICATION SYSTEM, INFORMATION PROCESSING APPARATUS, SERVER, AND COMMUNICATION METHOD

This application is a continuation of U.S. patent application Ser. No. 10/576,065, filed Apr. 13, 2006, which is a U.S. National Phase Application of PCT International Application PCT/JP2004/015721, filed Oct. 22, 2004, the entire disclosures of which are incorporated herein by reference.

TECHNICAL FIELD

The present invention relates to communication system or the like for establishing communications between plural information processors.

BACKGROUND ART

First, classification of NAT (network address translation) is explained. The NAT includes the transmission port assigning rule and reception filter rule, and the NAT is classified according to their combination. The transmission port assigning rule is divided into a cone type in which, not depending on the packet destination (IP address, port), when the port of NAT local side (for example, LAN side) information processor and the IP address are the same, the port of the global side (for example, the Internet or WAN side) assigned to the NAT is the same, an address sensitive type in which a new port is assigned for each packet destination address, and a port sensitive in which a new port is assigned for each destination port of packet. The reception filter rule for judging possibility of reception of packet from the local side to the port transmitting the packet from the NAT local side is divided into an address sensitive filter for receiving the packet only from the address transmitting the packet from the port, a port sensitive filter for receiving the packet only from the port transmitting the packet from the port, and no filter having no filter. By combining the transmission port assigning rule and reception filter rule, the NAT can be classified into the following type types.

Full cone NAT: Transmission port assigning rule of cone type, and reception port filter rule of no filter.

Restricted cone NAT: Transmission port assigning rule of cone type, and reception port filter rule of address sensitive filter.

Port restricted cone NAT: Transmission port assigning rule of cone type, and reception port filter rule of port sensitive filter.

Address sensitive symmetric NAT: Transmission port assigning rule of address sensitive type, and reception port filter rule of address sensitive filter.

Port sensitive symmetric NAT: Transmission port assigning rule of port sensitive type, and reception port filter rule of port sensitive filter.

In the NAT communication, it has been proposed to establish communications between PC1 and PC2 without using server as shown in FIG. 40.

In this case, probably, there is a combination of NATs unable to establish communications. In FIG. 40, when communicating from PC1 of information processor connected to NAT1 local side to PC2, let us call NAT1 as sending side NAT, and NAT2 as receiving side NAT. Hence, combination of NATs capable of establishing communications between PC1 and PC2 is as shown in FIG. 41. Abbreviations of NATs in FIG. 41 are specifically described in the following preferred embodiments. In FIG. 41, connection of *1 has been known hitherto. Even in the combination of NATs capable of establishing communications, connection of *3 involves an uncertainty because communications cannot be established unless the port number differential of NAT is known and the position of the latest port of receiving side NAT is known.

As prior conditions for establishing communications between information processors, it is desired to detect the range of ports of NAT passing through the bubble packet (the packet sent in order to leave communication record in the NAT) transmitted from one information processor.

DISCLOSURE OF THE INVENTION

It is hence an object of the invention to present communication system or the like capable of securely establishing communications between plural information processors for communicating by way of a communication control unit for controlling the communications.

It is other object of the invention to present communication system or the like capable of detecting the range of ports in the communication control unit allowing to pass the bubble packet transmitted from the information processor.

To achieve the object, the communication system of the invention comprises a first information processor, a second information processor, a first communication control unit for controlling the communication of the first information processor, a second communication control unit for controlling the communication of the second information processor, and a server for establishing the communication between the first information processor and second information processor, in which the first information processor includes a bubble packet transmitter for sending a bubble packet for leaving transmission record in the first communication control unit in the second communication control unit by way of the first communication control unit, and a reply packet receiver for receiving the reply packet sent from the second information processor by way of the second communication control unit, to the bubble packet transmitting port which is a port of the first communication control unit used in transmission of the bubble packet, and the second information processor includes a reply packet transmitter for sending the reply packet to one or more ports including at least the bubble packet transmitting port.

In this configuration, by sending the reply packet to the port of the first communication control unit assigned by transmission of bubble packet, communication between the first information processor and second information processor can be established.

The first information processor of the invention is a first information processor communicating with the second information processor by way of the first communication control unit for controlling the communication of the first information processor and the second communication control unit for controlling the communication of the second information processor, and it includes a bubble packet transmitter for sending a bubble packet for leaving transmission record in the first communication control unit to the second communication control unit by way of the first communication control unit, and a reply packet receiver for receiving the reply packet sent from the second information processor by way of the second communication control unit, to the bubble packet transmitting port which is a port of the first communication control unit used in transmission of the bubble packet.

In this configuration, the bubble packet transmitting port used in establishing communication with the second information processor can be assigned in the first communication control unit by sending the bubble packet, and by receiving the reply packet sent to the bubble packet transmitting port, communication between the first information processor and second information processor can be established.

The server of the invention is a server for establishing communication between the first information processor and second information processor by way of the first communication control unit for controlling communication of the first information processor and the second communication control unit for controlling communication of the second information processor, and it includes an information transmitter and receiver for transmitting and receiving information between the first information processor and second information processor, a characteristic determination unit for determining the characteristic of the first communication control unit and second communication control unit, and a determination unit for transmitting and receiving for determining either one of the first information processor and second information processor as transmission side (sending side information processor) and other one as reception side (receiving information processor) according to the determination by the characteristic determination unit.

In this configuration, depending on the characteristic of the first communication control unit and second communication control unit, one of the first information processor and second information processor is determined as the transmission side and other as reception side so as to establish communication between the first information processor and second information processor.

The server of the invention is also a server for establishing communication between the first information processor and second information processor by way of the first communication control unit for controlling communication of the first information processor and the second communication control unit for controlling communication of the second information processor, and it includes a detector for detecting port number for receiving a range detecting packet for detecting the range of ports including the bubble packet transmitting port which is a port of the first communication control unit used in transmission of bubble packet for leaving transmission record in the first communication control unit to the second communication control unit from the first information processor, and detecting the position of the port of the first communication control unit allowing to pass this range detecting packet, and a port number information transmitter for detecting port number for sending the port information for detecting showing the position of the port detected by the detector for detecting port number to the first information processor.

In this configuration, the port information for detecting used for detecting the range of ports including the bubble packet transmitting port in the first information processor can be sent to the first information processor.

The server of the invention is further a server for establishing communication between the first information processor and second information processor by way of the first communication control unit for controlling communication of the first information processor and the second communication control unit for controlling communication of the second information processor, and it includes a target port transmitter for transmitting bubble packet for sending the target port information for transmitting bubble packet showing the position of the target port for transmitting bubble packet which is a port in the second communication control unit as the target of transmission of bubble packet for leaving transmission record in the first communication control unit by the first information processor to the first information processor.

In this configuration, the position of the port as the target of transmission of bubble packet can be noticed to the first information processor by the target port information for transmitting bubble packet.

The communication system of the invention is a communication system comprising an information processor, a communication control unit for controlling the communication of the information processor, and a server, in which the information processor includes a bubble packet transmitter for transmitting one or more bubble packets for leaving transmission record in the communication control unit by way of the communication control unit, and a range detection packet transmitter for sending the range detecting packet used in detection of range of ports including one or more bubble packet transmitting ports as ports of the communication control unit used in transmission of one or more bubble packets to the server, and the server includes a range detector for receiving the range detecting packet, and detecting the range of ports including the one or more bubble packet transmitting ports on the basis of the range detecting packet.

In this configuration, by the range detecting packet transmitted from the information processor, the range of ports including the bubble packet transmitting port can be detected in the server. By sending a packet from other device to the range of ports including the detected bubble packet transmitting port, this packet can be received in the information processor.

The communication system of the invention is a communication system comprising an information processor, a communication control unit for controlling the communication of the information processor, and a server, in which the information processor includes a bubble packet transmitter for transmitting one or more bubble packets for leaving transmission record in the communication control unit by way of the communication control unit, a range detection packet transmitter for sending the range detecting packet used in detection of range ports including one or more bubble packet transmitting ports as ports of the communication control unit used in transmission of one or more bubble packets for leaving transmission record in the communication control unit to the server by way of the communication control unit, a port information receiver for detecting for receiving the port information for detecting showing the position of the port of the communication control unit allowing the range detecting packet to pass, and a range detector for detecting the range of ports including the one or more bubble packet transmitting ports on the basis of the port information for detecting received in the port information receiver for detecting, and the server includes a detector for detecting port number for receiving the range detecting packet and detecting the position of the port of the communication control unity allowing to pass the range detecting packet, and a port number information transmitter for detecting port number for sending the port information for detecting showing the position of the part detecting the detector for detecting port number to the information processor.

In this configuration, by the range detecting packet transmitted from the information processor, the range of ports including the bubble packet transmitting port can be detected. By sending a packet from other device to the range of ports including the detected bubble packet transmitting port, this packet can be received in the information processor.

BRIEF DESCRIPTION OF THE DRAWINGS

FIG. 41 is a diagram showing combination of conventional NATs that can be connected.

DETAILED DESCRIPTION OF THE PREFERRED EMBODIMENTS

Preferred Embodiment 1

A communication system in preferred embodiment 1 of the invention is described while referring to the accompanying drawings.

Figure 1:
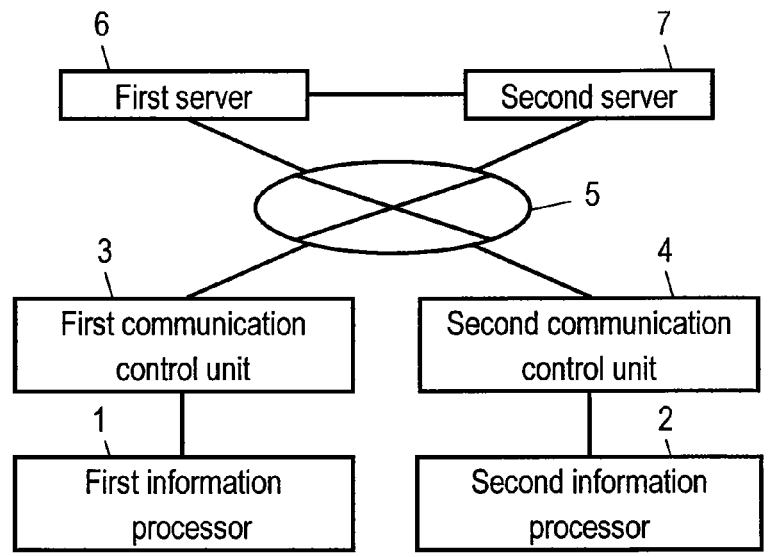
FIG. 1 is a block diagram of configuration of communication system in preferred embodiment 1 of the invention.

FIG. 1 is a block diagram of configuration of communication system in the preferred embodiment. In FIG. 1, the communication system in the preferred embodiment comprises first information processor 1, second information processor 2, first communication control unit 3, second communication control unit 4, first server 6, and second server 7. First communication control unit 3, second communication control unit 4, first server 6, and second server 7 are connected by way of wired or wireless communication network 5. Communication network 5 is, for example, the Internet.

In FIG. 1, first information processor 1 and second information processor 2 are connected respectively to first communication control unit 3 and second communication control unit 4, but other devices may be also connected to first communication control unit 3 and second communication control unit 4.

Figure 2:
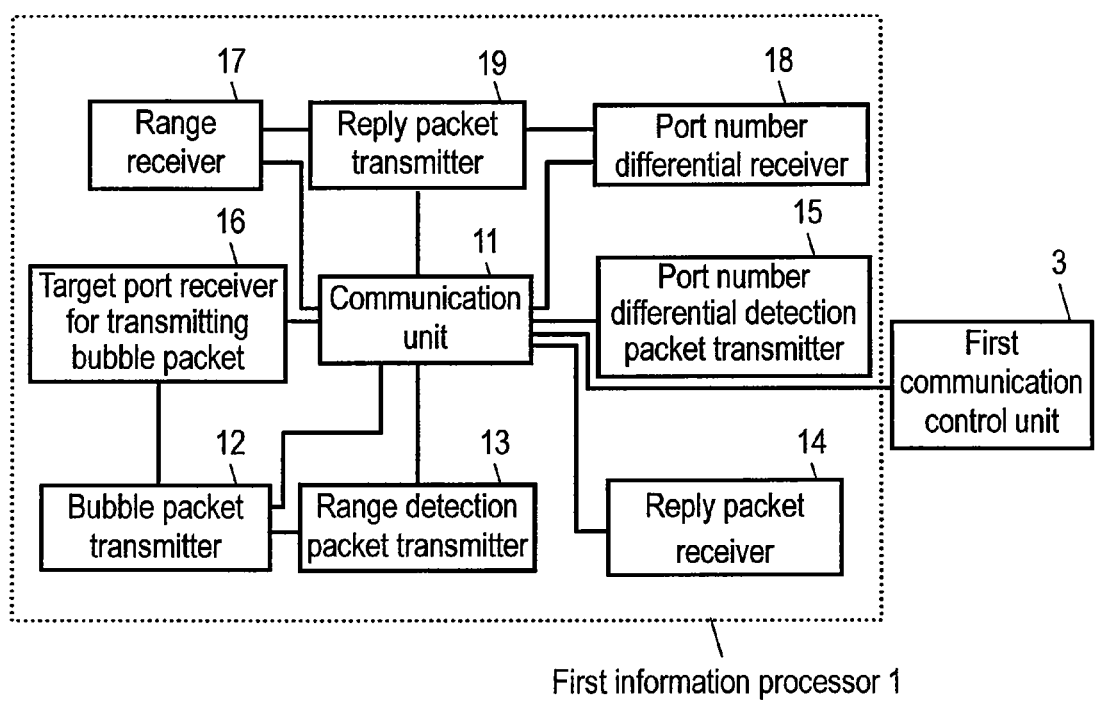
FIG. 2 is a block diagram of configuration of first information processor in the preferred embodiment.

FIG. 2 is a block diagram of configuration of first information processor 1. In FIG. 2, first information processor 1 comprises communication unit 11, bubble packet transmitter 12, range detection packet transmitter 13, reply packet receiver 14, port number differential detection packet transmitter 15, target port receiver for transmitting bubble packet 16, range receiver 17, port number differential receiver 18, and reply packet transmitter 19.

Communication unit 11 communicates between bubble packet transmitter 12 or other internal constituent elements in first information processor 1 and first communication control unit 3.

Bubble packet transmitter 12 transmits a bubble packet to second communication control unit 4 by way of communication unit 11 and first communication control unit 3. The bubble packet is a packet for leaving transmission record in first transmission control unit 3 in order to establish communication between first information processor 1 and second information processor 2. Establishment of communication means to start peer-to-peer communication without resort to server between first information processor 1 and second information processor 2. Leaving of communication record is to assign port (open port) for receiving a transmission packet described below, in first communication control unit 3. Generally, a bubble packet is transmitted in order to leave transmission record, but as a result of transmission of a specified packet, the transmission record for receiving the transmission packet may be left in first communication control unit 3 (in this case, the specified packet leaving the transmission record is the bubble packet). This bubble packet may contain certain information or no information. The bubble packet is transmitted by connectionless protocol such as UDP (user datagram protocol).

Range detection packet transmitter 13 sends a range detecting packet to first server 6 or second server 7. This range detecting packet is used for detecting the range of ports including the bubble packet transmitting port. The bubble packet transmitting port is a port of first communication control unit 3 used in transmission of bubble packet. The range detecting packet is transmitted before the bubble packet is transmitted and/or after bubble packet is transmitted. When sending the range detecting packet before and after transmission of bubble packet, the range detecting packet may be sent to different addresses (IP addresses) before and after. The range detecting packet is transmitted by UDP or TCP (transmission control protocol). This range detecting packet may contain certain information or no information.

Reply packet receiver 14 receives the transmission packet sent from second information processor 2 by way of second communication control unit 4. This reply packet is transmitted to the port assigned by transmission of bubble packet in first communication control unit 3, that is, to the bubble packet transmitting port. By receiving the reply packet, communication is established between first information processor 1 and second information processor 2. The reply packet is transmitted, for example, by UDP. The reply packet may contain certain information or no information.

Port number differential detection packet transmitter 15 sends the port number differential detecting packet for detecting the port number differential in first communication control unit 3 to first server 6 by way of first communication control unit 3. The port number differential is the differential (interval) of ports used (assigned) continuously. For example, when the port number differential is 1, the port used next to port number 2000 is port number 2001. When the port number differential is 2, the port used next to port number 2000 is port number 2002. The port number differential detecting packet is transmitted, for example, by UDP or TCP. The port number differential detecting packet may contain certain information or no information.

Target port receiver for transmitting bubble packet 16 receives target port information for transmitting bubble packet. Target port information for transmitting bubble packet is the information indicating the position of target port for transmitting bubble packet which is the target port for transmitting bubble packet in second communication control unit 4. For example, when port number of target port for transmitting bubble packet is included in the target port information for transmitting bubble packet, the position of target port for transmitting bubble packet can be known from first information processor 1. The target port for transmitting bubble packet is, for example, a port of transmitting and receiving information by second information processor 2 to and from first server 6.

The components from bubble packet transmitter 12 to target port receiver for transmitting bubble packet 16 are used when first information processor 1 operates as information processor at transmission side. The information processor at transmission side is the side of sending the bubble packet when establishing communication between the first information processor 1 and second information processor 2. In this preferred embodiment, unless the transmission and reception are exchanged as described later, the bubble packet sending side and the communication (connection) requesting side (sending/calling side) are the same, and the transmission side is also the communication requesting side.

On the other hand, the information processor at the opposite side is the information processor at the reception side, that is the information processor at the side of sending reply packet to the bubble packet. In the preferred embodiment, unless the transmission and reception are exchanged, the reply packet sending side and the side receiving the communication request (receiving side) are the same, and hence the reception side is also the communication request receiving side. The components from range receiver 17 to reply packet transmitter 19 described below are used when the first information processor 1 operates as the information processor at reception side.

Range receiver 17 receives range information. The range information is the information showing the range of ports for sending the reply packet to second communication control unit 4 from reply packet transmitter 19. The range information shows the range of ports including the bubble packet transmitting port in second communication control unit 4 (port used in transmission of bubble packet from second information processor 2 to first communication control unit 3), for example, by the port number. The range information may show the range of ports by indicating the upper limit of ports only, or by the lower limit of ports only, or the range of ports may be indicated by both upper limit and lower limit of ports. The upper limit of ports refers to the port of the greater port number, and the lower limit of ports refers to the port of the smaller port number.

Port number differential receiver 18 receives port number differential information which is the information showing the port number differential in second communication control unit 4.

Reply packet transmitter 19 sends a reply packet to one or more ports including at least the bubble packet transmitting port in second communication control unit 4. At this time, by sending the reply packet to the port in the range showing the range information received in range receiver 17, the reply packet can be sent to the ports including the bubble packet transmitting port in second communication control unit 4. When sending reply packets to two or more ports, the reply packet is sent in every port number differential indicated by port number differential information. As a result, when the port number differential indicated by port number differential information is 2 or more, the reply packet can be sent efficiently. The reply packet may be also sent from the port making communication with first server 6 by first information processor 1.

Figure 3:
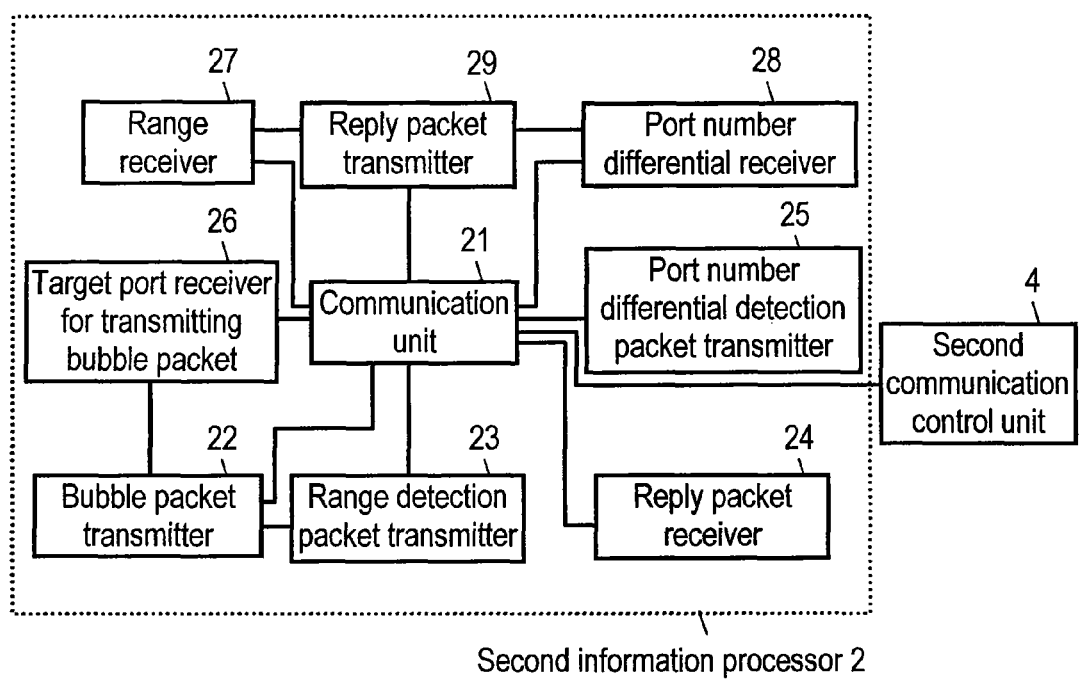
FIG. 3 is a block diagram of configuration of second information processor in the preferred embodiment.

FIG. 3 is a block diagram of configuration of second information processor 2. Second information processor 2 comprises communication unit 21, bubble packet transmitter 22, range detection packet transmitter 23, reply packet receiver 24, packet transmitter for detecting port number differential 25, target port receiver for transmitting bubble packet 26, range receiver 27, port number differential receiver 28, and reply packet transmitter 29. Herein, the components from communication unit 21 to reply packet transmitter 29 in second information processor 2 are same as communication unit 11 to reply packet transmitter 19 in first information processor 1, except that first information processor 1, first communication control unit 3, second information processor 2, and second communication unit 4 are exchanged, and detailed description is omitted.

The components from bubble packet transmitter 22 to target port receiver for transmitting bubble packet 26 in second information processor 2 are used when second information processor 2 operates at transmission side. On the other hand, range receiver 27 to reply packet transmitter 29 is used when second information processor 2 operates at reception side.

First communication control unit 3 is to control communication of first information processor 1, and controls communication of local side (first information processor 1 side) and global side (communication network 5 side), by using the so-called NAT. Types of NAT include full cone NAT, restricted cone NAT (R NAT), port restricted cone NAT (PR NAT), address sensitive symmetric NAT (AS NAT), and port sensitive symmetric NAT (PS NAT).

Second communication control unit 4 is to control communication of second information processor 2, by using the NAT, same as first communication control unit 3. As combination of first communication control unit 3 and second communication control unit 4, except for combination of PS NAT at both, communication between first information processor 1 and second information processor 2 can be established. In first communication control unit 3 and second communication control unit 4, ports are assigned so that the port numbers may increase or decrease in every specified port number differential. In the following explanation, the ports are assigned so that the port numbers may increase.

Figure 4:
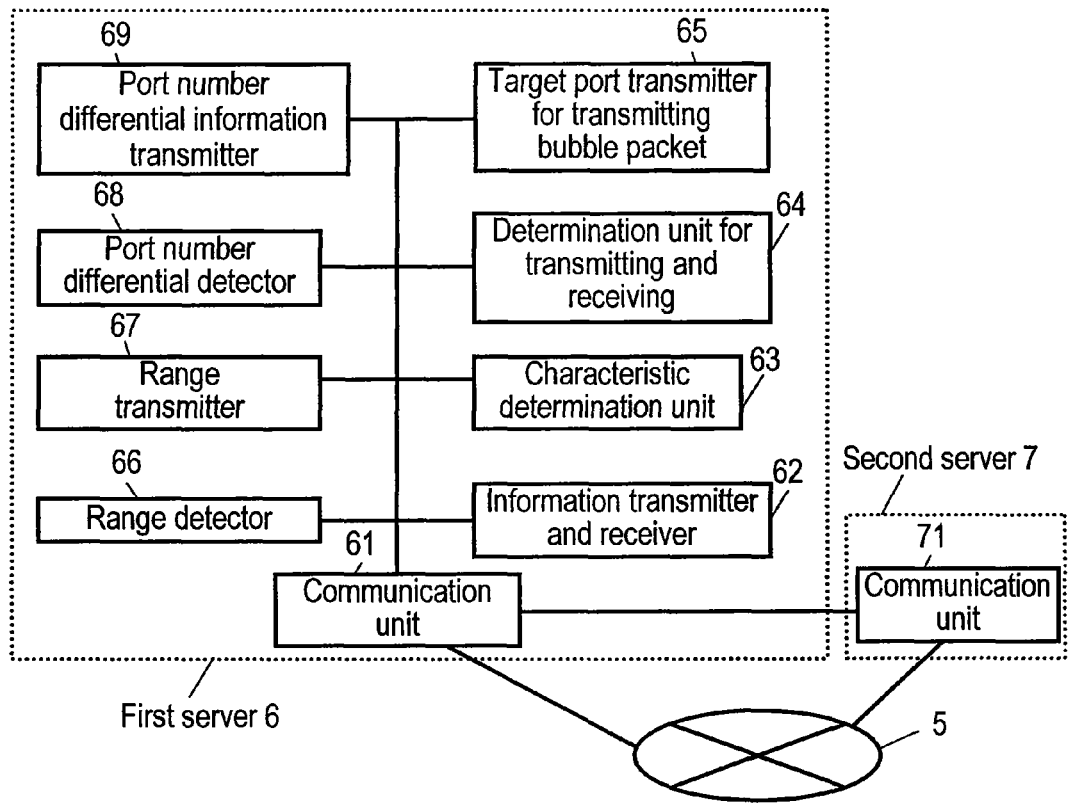
FIG. 4 is a block diagram of configuration of first and second servers in the preferred embodiment.

FIG. 4 is a block diagram of configuration of first server 6 and second server 7. In FIG. 4, first server 6 comprises communication unit 61, information transmitter and receiver 62, characteristic determination unit 63, determination unit for transmitting and receiving 64, target port transmitter for transmitting bubble packet 65, range detector 66, range transmitter 67, port number differential detector 68, and port number differential information transmitter 69. Second server 7 comprises communication unit 71.

Communication units 61, 71 communicate between information transmitter and receiver 62 and other parts of first server 6, and first information processor 1 and second information processor 2. Communication unit 61 and communication unit 71 exchange information between servers. In second server 7, only communication unit 71 is shown, but other elements may be also added aside from communication unit 71.

Information transmitter and receiver 62 transmits and receives information to and from first information processor 1 and second information processor 2. Transmission or reception of information by information transmitter and receiver 62 is carried out by way of communication unit 61 and communication unit 71.

Characteristic determination unit 63 determines the characteristic of first communication control unit 3 and second communication control unit 4. Herein, the characteristic of first communication control unit 3 and second communication control unit 4 refers to the type of NAT used in first communication control unit 3 and others. Hence, the characteristic of first communication control unit 3 is determined to be, for example, full cone NAT or AS NAT.

Determination unit for transmitting and receiving 64 determines either one of first information processor 1 and second information processor 2 as transmission side (sending side information processor) and other as reception side (receiving side information processor) depending on the result of determination by characteristic determination unit 63. As a result of this determination, the communication control unit for controlling communication of sending side information processor, out of first communication control unit 3 and second communication control unit 4, is the sending side communication control unit, and the communication control unit for controlling communication of receiving side information processor side is the receiving side communication control unit.

Target port transmitter for transmitting bubble packet 65 sends the target port information for transmitting bubble packet indicating the position of target port for transmitting bubble packet in receiving side communication control unit to sending side information processor.

Range detector 66 receives the range detecting packet sent from the sending side information processor, and detects the range of ports including the bubble packet transmitting port on the basis of the received range detecting packet. For detection of port range, the port number included in the header of the range detecting packet may be acquired, and recorded in a specified memory or the like. That is, the range detecting packet may be sent from the sending side information processor to communication unit 61, or may be once sent to communication unit 71 of second server 7, and received by way of communication unit 61. In the later case, IP addresses are differential in first server 6 and second server 7.

Range transmitter 67 sends range information which is the information showing the range of ports including the bubble packet transmitting port detected by range detector 66 to the receiving side information processor.

Port number differential detector 68 receives the port number differential detecting packet sent from the sending side information processor by way of the sending side communication control unit. The port number differential detecting packet is a packet used for detection of port number differential in the sending side communication control unit. Port number differential detector 68 detects the port number differential in the sending side communication control unit on the basis of the received port number differential detecting packet.

Port number differential information transmitter 69 sends the port number differential information which is the information showing the port number differential detected by port number differential detector 68 to the receiving side information processor.

The operation of communication system of the preferred embodiment is explained. Referring now to the flowchart in FIG. 5, the communication method until start of communication between first information processor 1 and second information processor 2 is explained.

(Step S101) Characteristic determination unit 63 of first server 6 determines the characteristic of first communication control unit 3 and second communication control unit 4, and it is determined which one of first information processor 1 and second information processor 2 is at transmission side or reception side.

Herein, communication between information processors cannot be established if PS NAT is used at transmission side and AS NAT is used at reception side, or if PR NAT is used at transmission side and AS NAT or PS NAT is used at reception side, and hence the transmission side and reception side must be determined properly. If PS NAT is used at both transmission side and reception side, communication between information processors cannot be established in the method of this preferred embodiment. In this case, the reason of failure in establishment of communication is explained later.

(Step S102) Sending bubble packet from sending side information processor to receiving side communication control unit, a reply packet is sent from the receiving side information processor to one or more ports including at least the bubble packet transmitting port, and communication is established. The detail of process at steps S101 and S102 is described below.

Figure 6:
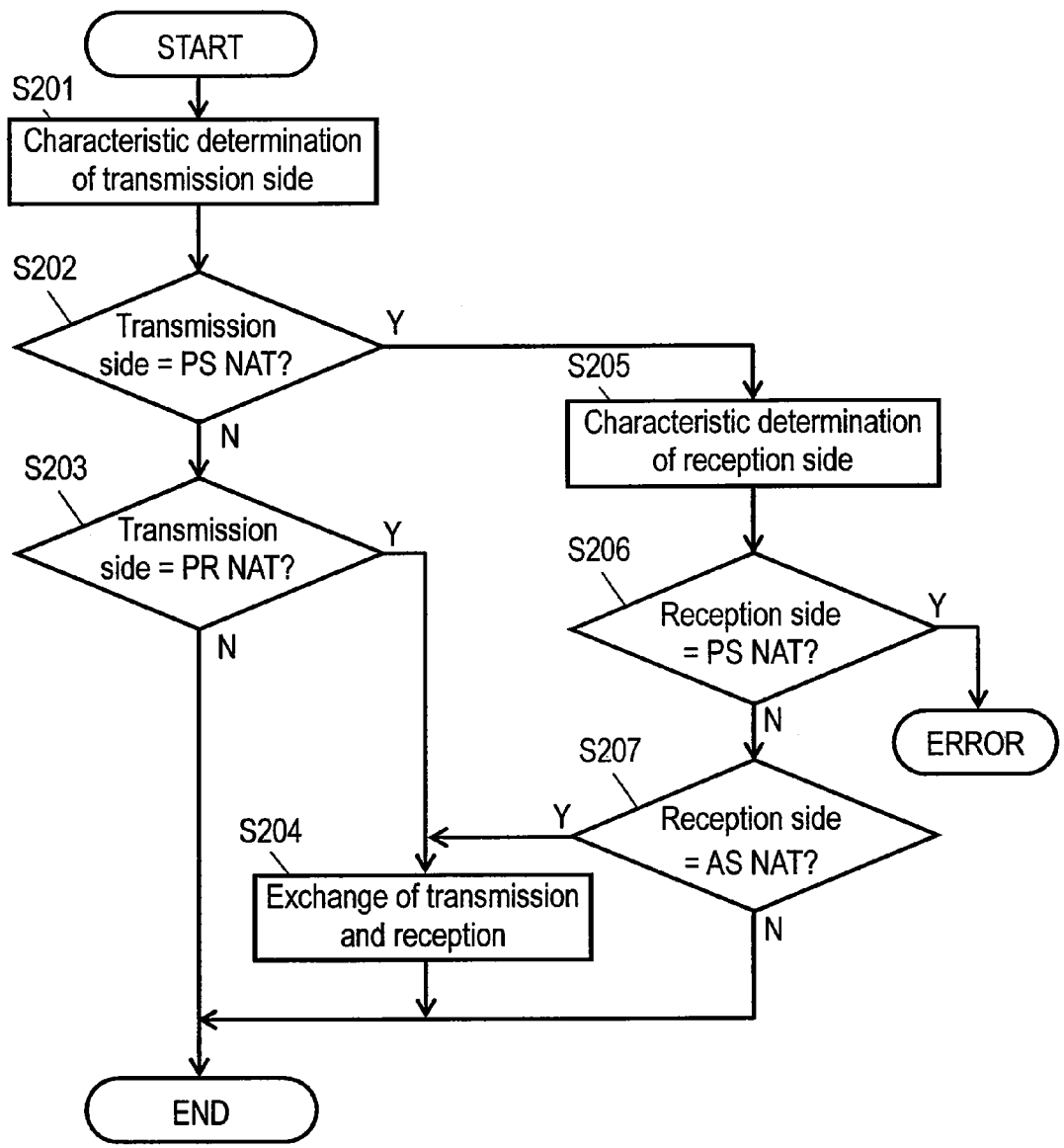
FIG. 6 is a flowchart of determination process of transmission and reception in the preferred embodiment.

FIG. 6 is a flowchart of process of determination of transmission or reception by first server 6 at step S101. In the explanation of this flowchart, it is attempted to communicate from first information processor 1 to second information processor 2. Therefore, first information processor 1 and first communication control unit 3 are at transmission side, and second information processor 2 and second communication control unit 4 are at reception side. When attempted to communicate from second information processor 2 to first information processor 1, the operation is same as explained in the flowchart below, except that first information processor 1 and first communication control unit 3, and second information processor 2 and second communication control unit 4 are exchanged.

(Step S201) Characteristic determination unit 63 of first server 6 determines characteristic of first communication control unit 3 at transmission side. Method of determination of characteristic is described later.

(Step S202) Determination unit for transmitting and receiving 64 judges whether PS NAT is used or not in first communication control unit 3. When using PS NAT, the process goes to step S205, and if not using, the process goes to step S203.

(Step S203) Determination unit for transmitting and receiving 64 judges whether PR NAT is used or not in first communication control unit 3. When using PR NAT, the process goes to step S204, and if not using, the determination process of transmission or reception is over. That is, communication at step S102 is established by supposing first information processor 1 and first communication control unit 3 to be at transmission side, and second information processor 2 and second communication control unit 4 at reception side.

(Step S204) Determination unit for transmitting and receiving 64 exchanges transmission and reception, and the determination process of transmission and reception is over. That is, communication at step S102 is established by supposing first information processor 1 and first communication control unit 3 to be at reception side, and second information processor 2 and second communication control unit 4 at transmission side.

(Step S205) Characteristic determination unit 63 determines the characteristic of second communication control unit 4 at reception side.

(Step S206) Determination unit for transmitting and receiving 64 judges whether PS NAT is used or not in second communication control unit 4. When using PS NAT, both transmission side and reception side are using the PS NAT, and communication cannot be established, and it is an error. If not using, the process goes to step S207.

(Step S207) Determination unit for transmitting and receiving 64 judges whether AS NAT is used or not in second communication control unit 4. When using AS NAT, the process goes to step S204, and if not using, the determination process of transmission or reception is over. That is, communication at step S102 is established by supposing first information processor 1 and first communication control unit 3 to be at transmission side, and second information processor 2 and second communication control unit 4 at reception side.

This flowchart is an example of determination of transmission and reception, and transmission or reception may be determined by other method. For example, in this flowchart, when PR NAT is used at the transmission side, in order to save the number of times of determination process, transmission and reception can exchanged without determining the type of NAT used at the reception side, but in the case the number of times of determination process does not matter, after the transmission side is determined to be using the PR NAT, it is determined whether the reception side is using PS NAT or AS NAT, and only when either one is determined to be used, transmission and reception may exchanged.

Figure 7:
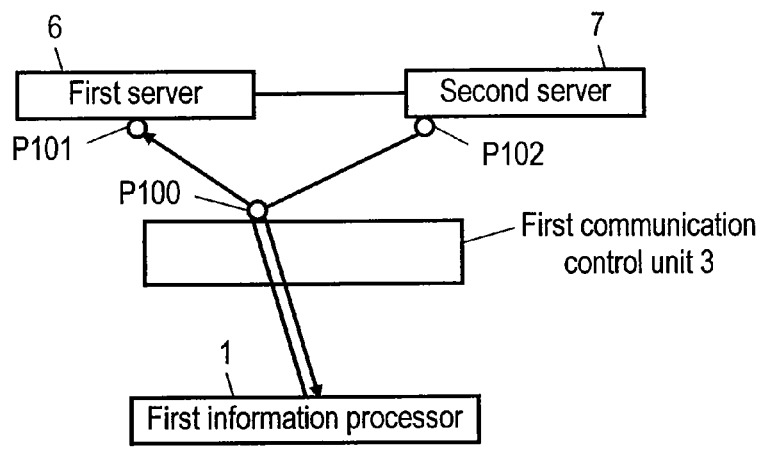
FIG. 7 is an explanatory diagram of determination of characteristic of communication control unit in the preferred embodiment.
Figure 8:
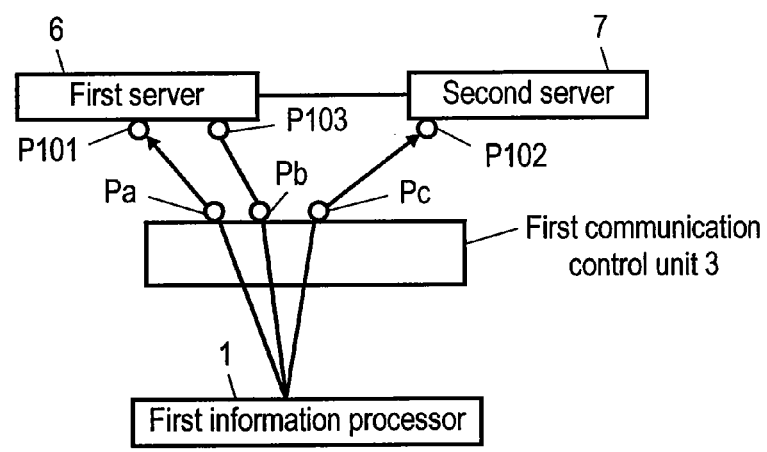
FIG. 8 is an explanatory diagram of determination of characteristic of communication control unit in the preferred embodiment.
Figure 9:
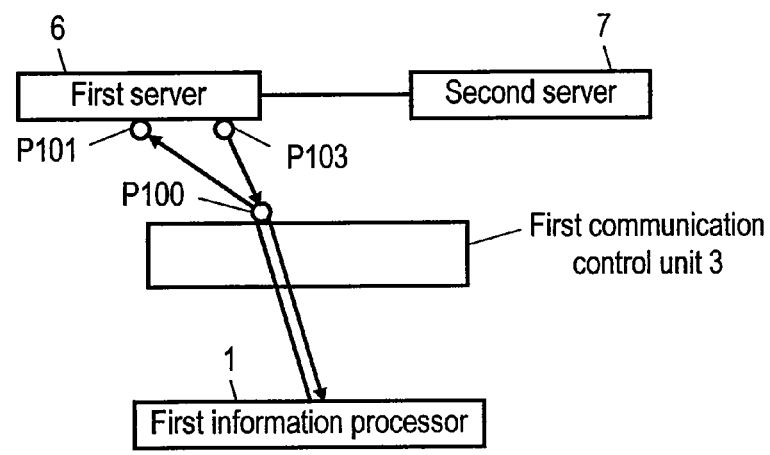
FIG. 9 is an explanatory diagram of determination of characteristic of communication control unit in the preferred embodiment.

Referring now to FIG. 7 to FIG. 9, the determination method of characteristic of first communication control unit 3 is explained. Characteristic of second communication control unit 4 can be similarly determined.

In FIG. 7, information processor 1 transmits specified packet to port P101 of first server 6. Suppose this packet has passed through port 100 of first communication control unit 3. The transmitted packet is received by characteristic determination unit 63 by way of communication unit 61. In sequence, characteristic determination unit 63 transfers an instruction of sending the packet to port P100 of first communication control unit 3 detecting by receiving this packet to communication unit 71 of second server 7 by way of communication unit 61. Thus, the packet is sent from communication unit 71 to port P100. When first information processor 1 can receive the packet to port P100 from communication unit 71, characteristic determination unit 63 judges that full cone NAT is used in first communication control unit 3. On the other hand, when first information processor 1 cannot receive the packet to port P100 from communication unit 71, it is judged by the method explained in FIG. 8.

In FIG. 8, information processor 1 transmits specified packet to port P101 and port P103 of first server 6, and port P102 of second server 7. The packet transmitted to port P101 and port P103 is received by characteristic determination unit 63, and the packet transmitted to port P102 is received by way of communication unit 71. It is judged whether ports Pa, Pb in first communication control unit 3 allowing to pass the packet are the same or not. When port Pa and port Pb are different, it is judged that PS NAT is used in first communication control unit 3.

When port Pa and port Pb are the same, it is judged whether port Pb and port Pc are the same. When port Pb and port Pc are different, it is judged that AS NAT is used in first communication control unit 3. When port Pa, port Pb and port Pc are the same, it is judged by the method explained in FIG. 9.

In FIG. 9, information processor 1 transmits specified packet to port P101 of first server 6. Receiving this packet, characteristic determination unit 63 sends a packet from port P103 different from port P101, to port P100 in first communication control unit 3 allowing to pass this packet. When first information processor 1 can receive the packet from port P103, characteristic determination unit 63 judges that R NAT is used in first communication control unit 3, and when first information processor 1 cannot receive the packet from port P103, characteristic determination unit 63 judges that PR NAT is used in first communication control unit 3.

Thus, by the method explained in FIG. 7 to FIG. 9, characteristic determination unit 63 can judge the characteristic of first communication control unit 3. In this explanation, although detail is omitted, transmission of packet or the like from first information processor 1 is instructed by characteristic determination unit 63.

Figure 5:
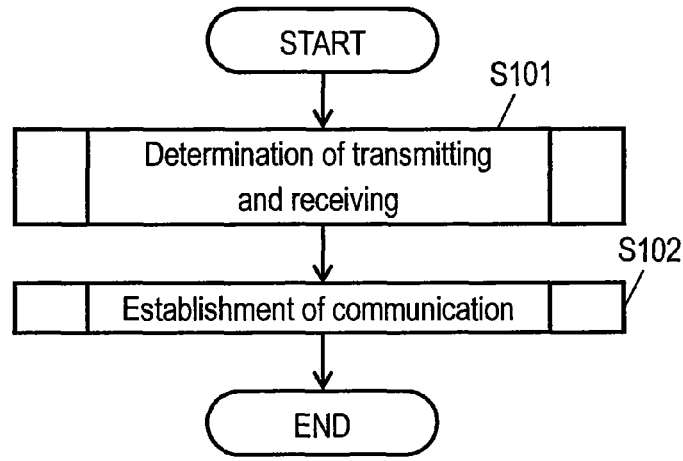
FIG. 5 is a flowchart of operation of communication system in the preferred embodiment.
Figure 10:
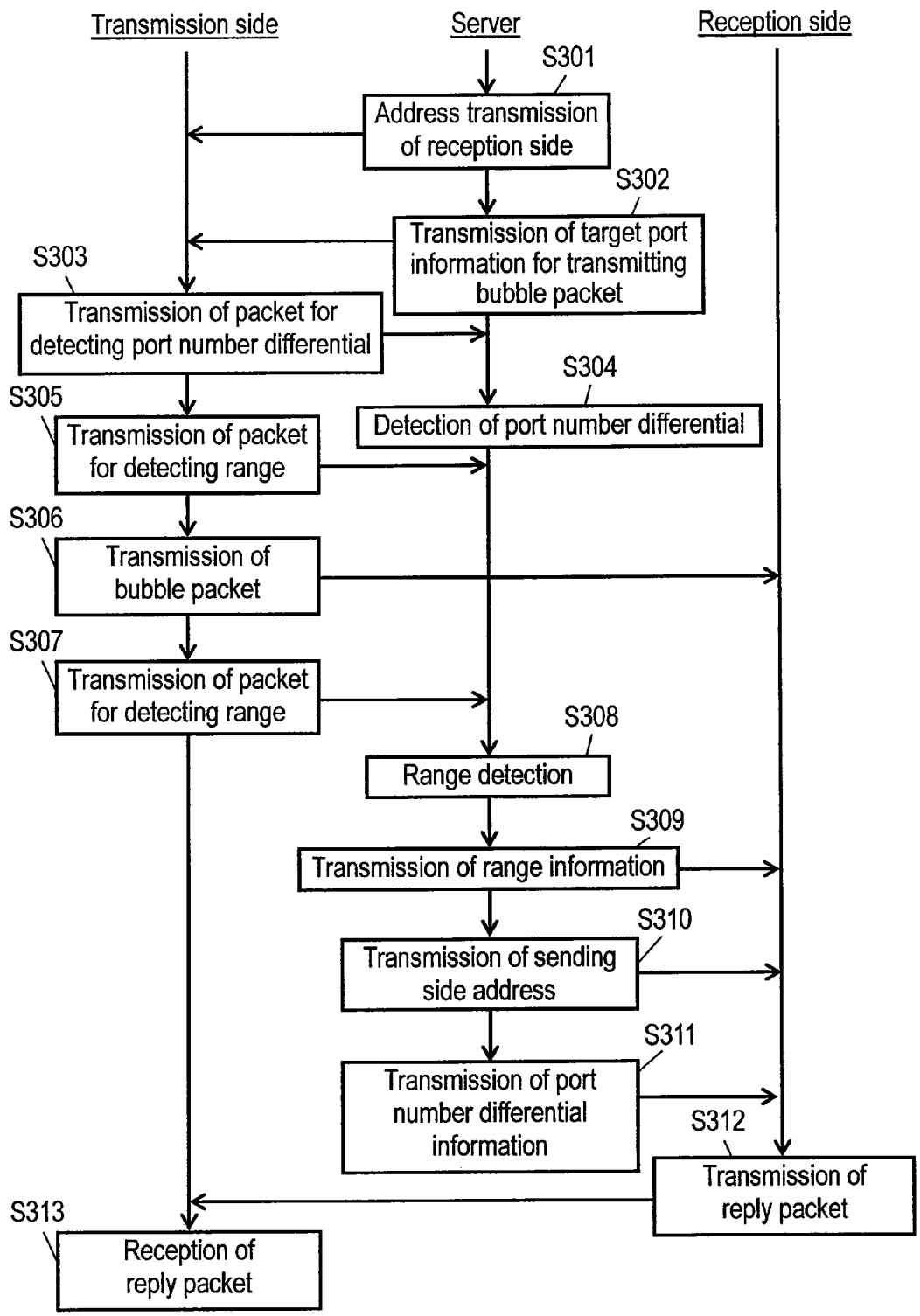
FIG. 10 is a flowchart of process of establishment of communication in the preferred embodiment.

Process at step S102 in the flowchart in FIG. 5 is explained by referring to FIG. 10. FIG. 10 is a diagram explaining the process of exchanging information among sending side information processor, server, and receiving side information processor, about establishment of communication. In FIG. 10, the server refers to both server 6 and server 7. For the convenience of explanation, first information processor 1 and first communication control unit 3 are supposed to be at transmission side, and second information processor 2 and second communication control unit 4 are at reception side.

(Step S301) Information transmitter and receiver 62 in first server 6 sends address information showing IP address of second communication control unit 4 to first information processor 1. The sent address information is received in communication unit 11 of first information processor 1, and is transferred to bubble packet transmitter 12.

(Step S302) Target port transmitter for transmitting bubble packet 65 sends the target port information for transmitting bubble packet to first information processor 1. The transmitted target port information for transmitting bubble packet is received in target port receiver for transmitting bubble packet 16 through communication unit 11, and is transferred to bubble packet transmitter 12.

Figure 11:
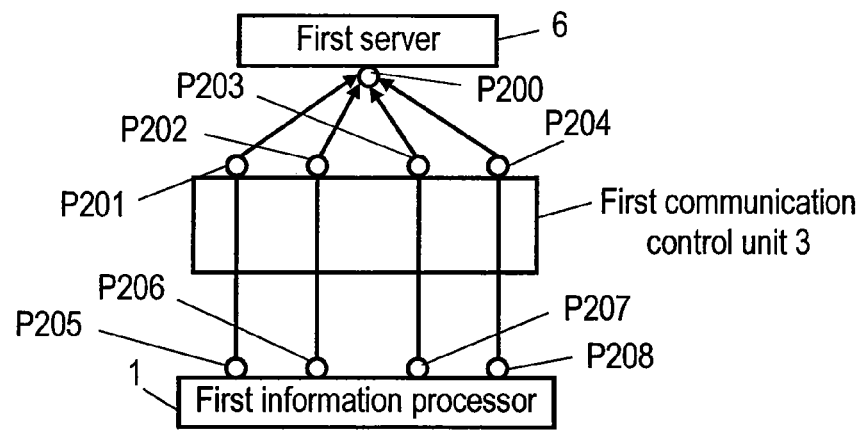
FIG. 11 is an explanatory diagram of detection of port number differential in the preferred embodiment.

(Step S303) Port number differential detection packet transmitter 15 in first information processor 1 sends the port number differential detecting packet to first server 6. In this transmission, ports of first communication control unit 3 for passing plural port number differential detecting packets are mutually different. The port number differential detecting packets are transmitted from plural ports different in port number in, for example, first information processor 1. FIG. 11 is a diagram for explaining transmission of port number differential detecting packets. Port number differential detection packet transmitter 15 sends port number differential detecting packets from different ports P205 to P208 sequentially to port P200 of first server 6. As a result, in first communication control unit 3, these packets pass through different ports P201 to P204. In FIG. 11, it is supposed to pass packets in the sequence of ports P205 to P208. In first information processor 1, ports P205 to P208 are not used in communication with first server 6 before transmission of port number differential detecting packets.

(Step S304) Port number differential detector 68 in first server 6 receives the port number differential detecting packet sent from first information processor 1, and detects the port number differential on the basis of this port number differential detecting packet. Detecting method of port number differential is explained. Port number differential detector 68 receives the port number differential detecting packet, and detects the ports P201 to P204 of first communication control unit 3 used in transmission of each port number differential detecting packet. For example, in the case the port interval of port P202 and port P201 is 12, the port interval of port P203 and port P202 is 6, and the port interval of port P204 and port P203 is 18, the smallest port interval of 6 may be detected as port number differential. Or the greatest common measure of port intervals may be detected as port number differential. For example, in the case the port interval of port P202 and port P201 is 12, the port interval of port P203 and port P202 is 6, and the port interval of port P204 and port P203 is 9, the greatest common measure of 3 may be detected as port number differential. The detected port number differential is transferred to port number differential information transmitter 69. Detecting method of port number differential is not limited to these examples, but the port number differential may be detected by any other method. The number of port number differential detecting packets used in transmission of detection of port number differential is not limited to 4, but may be freely changed within a range of detecting the port number differential.

(Step S305) Range detection packet transmitter 13 sends the range detecting packet to first server 6 by way of first communication control unit 3. In this transmission, the packet is transmitted so as to pass the range detecting packet through the latest assigned port in first communication control unit 3. This is intended to properly limit the range of ports including the bubble packet transmitting port. For example, range detection packet transmitter 13 sends the range detecting packet by using a port of first information processor 1 not used so far in communication between first information processor 1 and first server 6. Thus transmitted range detecting packet is received in range detector 66 in first server 6. This range detector 66 refers to the port number included in the header of received range detecting packet, and detects the position of the port of first communication control unit 3 used in transmission of range detecting packet.

(Step S306) Bubble packet transmitter 12 sends the bubble packet to the target port for transmitting bubble packet of second communication control unit 4 on the basis of the IP address of second communication control unit 4 indicated by address information sent at step S301 and the target port information for transmitting bubble packet sent at step S302. Herein, in the condition that communication is not established by transmission of this bubble packet, the following steps are explained, but, for example, if full cone NAT is used in second communication control unit 4, and the target port for transmitting bubble packet has been already used in second information processor 2, such as the port used in transmission or reception of information between second information processor 2 and first server 6, the bubble packet is received in second information processor 2, and communication is established.

(Step S307) Range detection packet transmitter 13 sends the range detecting packet to second server 7 by way of first communication control unit 3. This range detecting packet is received in range detector 66 by way of communication unit 71 and communication unit 61. In the case of possibility of AS NAT being used in first communication control unit 3, it is required to send the range detecting packet to second server 7 in this manner, but if there is no possibility of AS NAT being used in first communication control unit 3, the range detecting packet after transmission of bubble packet may be also sent to first server 6. In this case, same as in step S305, the range detecting packet is transmitted or received by using, for example, a port of first information processor 1 not used so far in communication with first server 6. Thus transmitted range detecting packet is received in range detector 66 of first server 6. Range detector 66 detects the position of the port of first communication control unit 3 used in transmission of range detecting packet.

(Step S308) Range detector 66 detects the range of ports including the bubble packet transmitting port, on the basis of range detecting packets sent at step S305 and step S307. More specifically, ports including from the port of first communication control unit 3 used in transmission of range detecting packet at step S305, to the port of first communication control unit 3 used in transmission of range detecting packet at step S307, are detected as range of ports including bubble packet transmitting port.

(Step S309) Range transmitter 67 sends the range information showing the range of ports including the bubble packet transmitting port detected by range detector 66 to second information processor 2. This range information is received in range receiver 27 in second information processor 2, and is transferred to reply packet transmitter 29.

(Step S310) Information transmitter and receiver 62 sends the address information showing the IP address of first communication control unit 3 to second information processor 2. The transmitted address information is received in communication unit 21, and is transferred to reply packet transmitter 29.

(Step S311) Port number differential information transmitter 69 sends the port number differential information showing the port number differential detected by port number differential detector 68 to second information processor 2. The port number differential information is received in port number differential receiver 28 in second information processor 2, and is transferred to reply packet transmitter 29.

(Step S312) Reply packet transmitter 29 sends a reply packet to first communication control unit 3 specified by the IP address showing the address information received at step S310. The reply packet is transmitted at every port number differential showing the port number differential information to the ports in the range indicted by the range information received from the range receiver 27.

(Step S313) Reply packet receiver 14 of first information processor 1 receives the reply packet sent from second information processor 2. By receiving this reply packet, communication between first information processor 1 and second information processor 2 is established. Consequently, between first information processor 1 and second information processor 2, information is transmitted and received without resort to first server 6 or second server (that is, tunnel communication, etc.).

In FIG. 10, detection of port number differential (steps S303, S304) may be anywhere before transmission of port number differential information (step S311), and, for example, the port number differential information may be sent to the reception side right after detection of port number differential (step S304). Or transmission of address of transmission side (step S310) may be simultaneous with transmission of address at reception side (step S301). Thus, in FIG. 10, there is a certain freedom about sequence of process.

In transmission of reply packet, if reply packet is transmitted in every port number differential indicated by port number differential information, if the reply packet is not received (that is, if the notice of reception of reply packet of second information processor 2 is not received from first information process 1 in a specified time after transmission of reply packet), it is possible that the detected port number differential is different, and in such a case, therefore, second information processor 2 sets the port number differential to 1, and tries to send the reply packet again. Or if the port number differential is calculated by the greater common measure, the common measures from the greatest common measure to 1 may be sequentially set in the port number differential, and the reply packet can be sent again. For example, if the detected port number differential is 8 or 4, the greatest common measure of 4 is set as port number differential, and the reply packet is transmitted, and if the communication is not established yet, 2 is set as port number differential, and the reply packet may be sent again. If still failing in communication, the port number differential is set at 1.

Operation of communication system of the preferred embodiment is explained by referring to specific examples. In the specific examples, IP addresses of first communication unit 3, second communication unit 4, first server 6 and second server 7 (as for first and second communication control units 3 and 4, communication network 5 side addresses) are as follows.

First communication control unit 3: 202.132.10.6
Second communication control unit 4: 131.206.10.240
First server 6: 155.32.10.10
Second server 7: 155.32.10.20

It is supposed that connection is requested from first information processor 1 to second information processor 2. That is, process is started in the condition that first information processor 1 is at transmission side.

Specifically, in example 1, AS NAT is used in first communication control unit 3, and PS NAT in second communication control unit 4. In example 2, PS NAT is used in first communication control unit 3, and AS NAT in second communication control unit 4. In example 3, PS NAT is used in first communication control unit 3, and PR NAT in second communication control unit 4. In example 4, full cone NAT is used in both first communication control unit 3 and second communication control unit 4.

EXAMPLE 1

Figure 12:
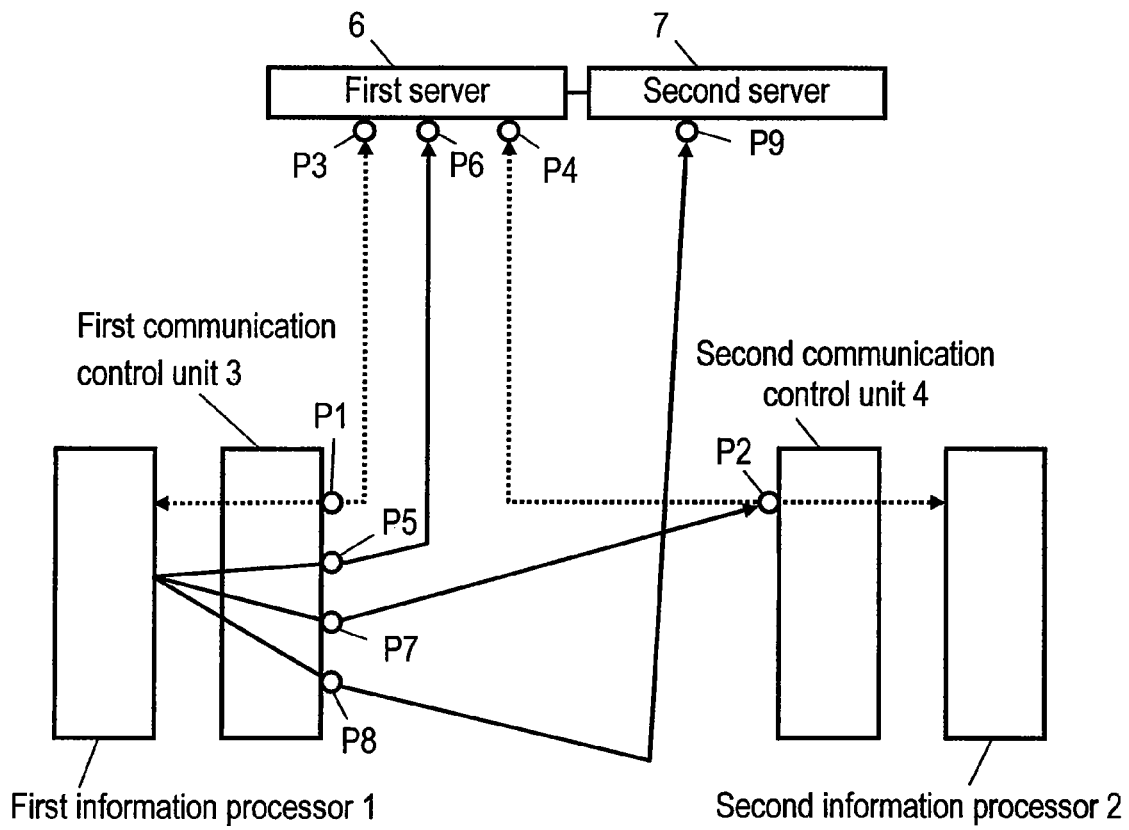
FIG. 12 is an explanatory diagram of specific example in the preferred embodiment.
Figure 13:
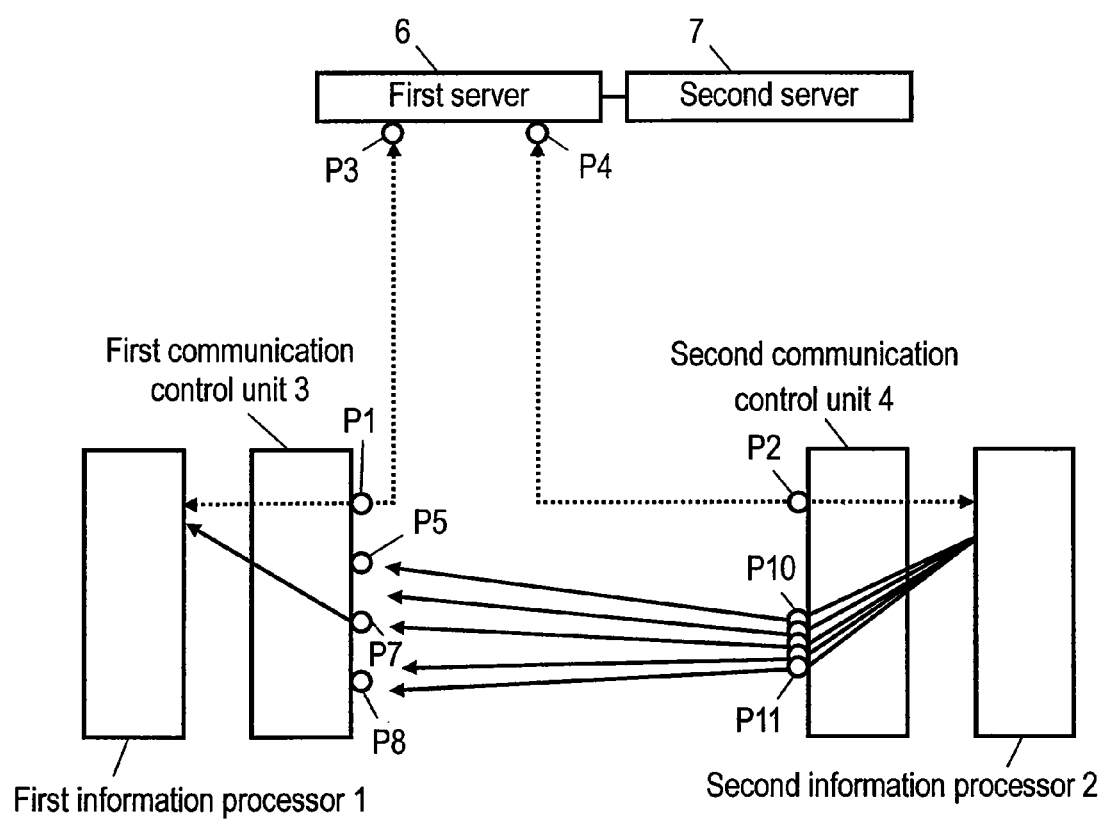
FIG. 13 is an explanatory diagram of specific example in the preferred embodiment.

FIG. 12 and FIG. 13 show example 1. First, operation of requesting connection from first information processor 1 is explained. In FIG. 12, first information processor 1 has prior knowledge about IP address of first server 6 (155.32.10.10) and IP address of second server 7 (155.32.10.20), and sends device ID of first information processor 1 (1234567890123456) to first server 6. This device ID is, for example, MAC address, EU164 base address, or other GUID (global unique ID). The device ID is transmitted to port P3 of first server 6 by way of port P1 of first communication control unit 3. By this transmission, information transmitter and receiver 62 of first server 6 acquires the device ID of first information processor 1, IP address of first communication control unit 3 (202.132.10.6) and port number (10130) of port P1 in first communication control unit 3. These items of information are held in information transmitter and receiver 62.

Next, first information processor 1 sends the device ID (9876543210123456) of second information processor 2 for requesting connection to first server 6, and requests connection to second information processor 2. Information transmitter and receiver 62 of first server 6 receives this connection request, and judges if second information processor 2 has already accessed first server 6 or not. Access by second information processor 2 is also achieved by sending device ID of second information processor 2 same as in the case of first information processor 1. Therefore, if second information processor 2 has already accessed first server 6, first server 6 has already acquired the device ID (9876543210123456) of second information processor 2, IP address (131.206.10.240) of second communication control unit 4, and port number (21000) of port P2 of second communication control unit 4 used in transmission and reception of information between second information processor 2 and first server 6, and these numbers are held in information transmitter and receiver 62. If second information processor 2 has already accessed first server 6, when information transmitter and receiver 62 transfers the instruction for determining transmission or reception to characteristic determination unit 63 (step S101), and process of determination of transmission or reception is started. On the other hand, if second information processor 2 has not accessed first server 6, connection request from first information processor 1 is an error, and communication between first information processor 1 and second information processor 2 is not established.

In determination of transmission or reception, characteristic determination unit 63 judges the characteristic of first communication control unit 3 which is the communication control unit at transmission side (step S201). It is judged that AS NAT is used in first communication control unit 3. This notice is transferred to determination unit for transmitting and receiving 64. Determination unit for transmitting and receiving 64 judges that PS NAT is not used, or PR NAT is not used in communication control unit at transmission side (steps S202, S203). As a result, transmission and reception are not exchanged, and the notice that first information processor 1 and first communication control unit 3 are at transmission side and that second information processor 2 and second communication control unit 4 are at reception side is transferred to information transmitter and receiver 62, target port transmitter for transmitting bubble packet 65, range transmitter 67, and port number differential information transmitter 69.

Information transmitter and receiver 62, when receiving the notice that first information processor 1 is at transmission side, sends the address information showing IP address (131.206.10.240) of second communication control unit 4 at reception side to first information processor 1 by way of port P1 (step S301). Target port transmitter for transmitting bubble packet 65 sends the target port information for transmitting bubble packet showing the port number (21000) of port P2 of second communication control unit 4 to first information processor 1 by way of port P1 (step S302).

In consequence, these items of information are received in communication unit 11 of first information processor 1, and the address information showing the IP address (131.206.10.240) of second communication control unit 4 is transferred to bubble packet transmitter 12, and the target port information for transmitting bubble packet is transferred to target port receiver for transmitting bubble packet 16. The target port information for transmitting bubble packet is received in target port receiver for transmitting bubble packet 16, and transferred to bubble packet transmitter 12. Thus, bubble packet transmitter 12 acquires the IP address of second communication control unit 4 as the destination of transmission of bubble packet.

When communication unit 11 informs port number differential detection packet transmitter 15 of reception of target port information for transmitting bubble packet, etc., port number differential detection packet transmitter 15 sends plural port number differential detecting packets as shown in FIG. 11 (step S303). In FIG. 12 and FIG. 13, however, transmission of port number differential detecting packets is not shown. The port number differential detecting packet is received in port number differential detector 68, and the port number differential is detected. In this case, suppose the port number differential of 1 is detected (step S304). The detected port number differential is transferred to port number differential information transmitter 69.

Bubble packet transmitter 12, before transmitting bubble packet, transfers the notice of transmission of range detecting packet to range detection packet transmitter 13. As a result, range detection packet transmitter 13, using a different port from the port use din communication with first server 6, transmits a range detecting packet to first server 6 (step S305). Herein, port P6 which is transmission destination port of the range detecting packet is supposed to be indicated from first server 6 to first information processor 1. This range detecting packet is supposed to be transmitted by using port P5 of first communication control unit 3. Receiving this range detecting packet, range detector 66 detects port number (10135) of port P5 of first communication control unit 3. Range detector 66 holds port number (10135) of port P5.

Range detection packet transmitter 13 informs bubble packet transmitter 12 of transmission of range detecting packet after transmission of range detecting packet. As a result, bubble packet transmitter 12 sends the bubble packet to target port for transmitting bubble packet of port number (21000) in second communication control unit 4 of IP address (131.206.10.240) indicated by the address information received from communication unit 11 (step S306). This bubble packet is supposed to be transmitted by using port P7 (port number 10142) of first communication control unit 3.

Bubble packet transmitter 12, after transmitting bubble packet, gives an instruction of transmission of range detecting packet to range detection packet transmitter 13. As a result, range detection packet transmitter 13 transmits the range detecting packet to second server 7 of which IP address is 155.32.10.20 (step S307). It is supposed that the bubble packet and second range detecting packet are sent from the port of first information processor 1 for transmitting the first range detecting packet.

The range detecting packet sent after transmission of bubble packet is supposed to be transmitted by using port P8 of first communication control unit 3. Accordingly, range detector 66 detects port number (10145) of port P8 by receiving the range detecting packet by way of communication unit 71 of second server 7 and communication unit 61 of first server 6. In consequence, range detector 66 detects a range specified from port number (10135) of held port P5 and port number (10145) of detected port P8 as lower limit and upper limit, respectively (step S308). When this range is transferred to range transmitter 67, range transmitter 67 transmits range information showing the range to second information processor 2 by way of port P2 of second communication control unit 4 (step S309). This range information is received in range receiver 27 of second information processor 2, and is transferred to reply packet transmitter 29.

Ports P5, P7 and P8 are not consecutive port numbers, and this is because other devices (not shown) than first information processor 1 are connected at the local side of first communication control unit 3, and ports of first communication control unit 3 are assigned to such devices until transmission of bubble packet from transmission of range detecting packet, or until transmission of range detecting packet from transmission of bubble packet.

The notice of transmission of range information is transferred from range transmitter 67 to information transmitter and receiver 62 to port number differential information transmitter 69, information transmitter and receiver 62 sends the address information showing IP address (202.132.20.6) of first communication control unit 3 to second information processor 2 (step S310). Port number differential information transmitter 69 sends port number differential information showing port number differential detected by port number differential detector 68 to second information processor 2 (step S311). Consequently, the address information showing the IP address of first communication control unit 3 is transferred from communication unit 21 to reply packet transmitter 29, and port number differential information is transferred to port number differential receiver 28, and is transferred to reply packet transmitter 29. Thus, reply packet transmitter 29 acquires the IP address of first communication control unit 3 as transmission destination of reply packet.

Reply packet transmitter 29 sends reply packet to first communication control unit 3 of IP address (202.132.10.6) indicated by the address information received from communication unit 21. This reply packet is transmitted, as shown in FIG. 13, from port number 10135 to 10145 indicated by range information, in every port number differential 1 of port number differential information. Herein, since PS NAT is used in second communication control unit 4, the reply packet sent from second information processor 2 is transmitted by using 11 ports from port P10 to port P11 (step S312). In first communication control unit 3, since the transmission record is left in port P7 by transmission of bubble packet, the reply packet sent to port P7 (port number 10142) out of reply packets is transferred to first information processor 1, and is received in reply packet receiver 14 by way of communication unit 11 (step S313). Thus, first information processor 1 acquires the position of port of second communication control unit 4 used in transmission of reply packet. Later, first information processor 1 transmits information to this port through port P7 in first communication control unit 3, and communication between first information processor 1 and second information processor 2 is established, and direct communication by UDP without resort to server is realized.

In this example 1, when the port number of bubble packet transmitting port (port P7) is 10140 and the port number differential of first communication control unit 3 is 5, the reply packet is transmitted to three ports only, that is, ports P5, P7, P8, so that the reply packet can be transmitted efficiently.

Also in this example, second information processor 2 transmits the reply packet from the port (port of second information processor 2) for communicating with first server 6, but the reply packet may be also transmitted from other port. For example, in order that first server 6 may detect the position of target port for transmitting bubble packet, the reply packet may be transmitted from the port of second information processor 2 for transmitting the packet transmitted from second information processor 2 to first server 6. In this case, the port of second communication control unit 4 allowing to pass this packet is the target port for transmitting bubble packet.

In this example 1, the bubble packet and second range detecting packet are transmitted from the port of first information processor 1 for transmitting the first range detecting packet, but the bubble packet and second range detecting packet may be also transmitted from mutually different ports newly assigned in first information processor 1.

EXAMPLE 2

In example 2, PS NAT is used in first communication control unit 3, and AS NAT is used in second communication control unit 4.

The operation of connection request from first information processor 1 is same as in example 1, and its explanation is omitted.

Operation of determination of transmission or reception is explained. Characteristic determination unit 63 judges the characteristic of first communication control unit 3 which is the communication control unit at transmission side (step S201). It is judged that PS NAT is used in first communication control unit 3, and this notice is transferred to determination unit for transmitting and receiving 64. Determination unit for transmitting and receiving 64 judges that PS NAT is used in communication control unit at transmission side (step S202), and transfers the instruction of determination of characteristic of second communication control unit 4 to characteristic determination unit 63. Characteristic determination unit 63 judges the characteristic of second communication control unit 4 (step S205). It is judged that AS NAT is used in second communication control unit 4, and this notice is transferred to determination unit for transmitting and receiving 64. Determination unit for transmitting and receiving 64 judges that AS NAT is used in communication control unit at reception side (steps S206, S207), and transmission and reception are exchanged (step S204). Therefore, first information processor 1 and first communication control unit 3 are set at reception side, and second information processor 2 and second communication control unit 4 are set at transmission side. The notice that first information processor 1 and first communication control unit 3 are set at reception side, and that second information processor 2 and second communication control unit 4 are set at transmission side is transferred to information transmitter and receiver 62, target port transmitter for transmitting bubble packet 65, range transmitter 67, and port number differential information transmitter 69. The subsequent operation is same as in example 1 except that first information processor 1 and second information processor 2 are exchanged and that the first communication control unit 3 and second communication control unit 4 are exchanged, and the explanation is omitted.

Meanwhile, the notice that first information processor 1 and first communication control unit 3 are set at reception side, and that second information processor 2 and second communication control unit 4 are set at transmission side is transferred to first information processor 1 or second information processor 2, or first information processor 1 or second information processor 2 may detect the transmission side when receiving the target port information for transmitting bubble packet, and detect the reception side when receiving the range information.

EXAMPLE 3

In example 3, PS NAT is used in first communication control unit 3, and PR NAT is used in second communication control unit 4.

The operation of connection request from first information processor 1 is same as in example 1, and its explanation is omitted.

Operation of determination of transmission or reception is explained. Characteristic determination unit 63 judges the characteristic of first communication control unit 3 which is the communication control unit at transmission side (step S201). It is judged that PS NAT is used in first communication control unit 3, and this notice is transferred to determination unit for transmitting and receiving 64. Determination unit for transmitting and receiving 64 judges that PS NAT is used in communication control unit at transmission side (step S202), and transfers the instruction of determination of characteristic of second communication control unit 4 to characteristic determination unit 63. Characteristic determination unit 63 judges the characteristic of second communication control unit 4 (step S205). It is judged that PR NAT is used in second communication control unit 4, and this notice is transferred to determination unit for transmitting and receiving 64. Determination unit for transmitting and receiving 64 judges that PS NAT is not used, or AS NAT is not used in communication control unit at reception side (steps S206, S207). As a result, transmission and reception are not exchanged, and the notice that first information processor 1 and first communication control unit 3 are at transmission side and that second information processor 2 and second communication control unit 4 are at reception side is transferred to information transmitter and receiver 62, target port transmitter for transmitting bubble packet 65, range transmitter 67, and port number differential information transmitter 69.

Thereafter, the bubble packet and range detecting packet are transmitted from first information processor 1, and range information, IP address of first communication control unit 3 and port number differential information are received in second information processor 2, and this operation is same as in example 1, and its explanation is omitted.

Figure 14:
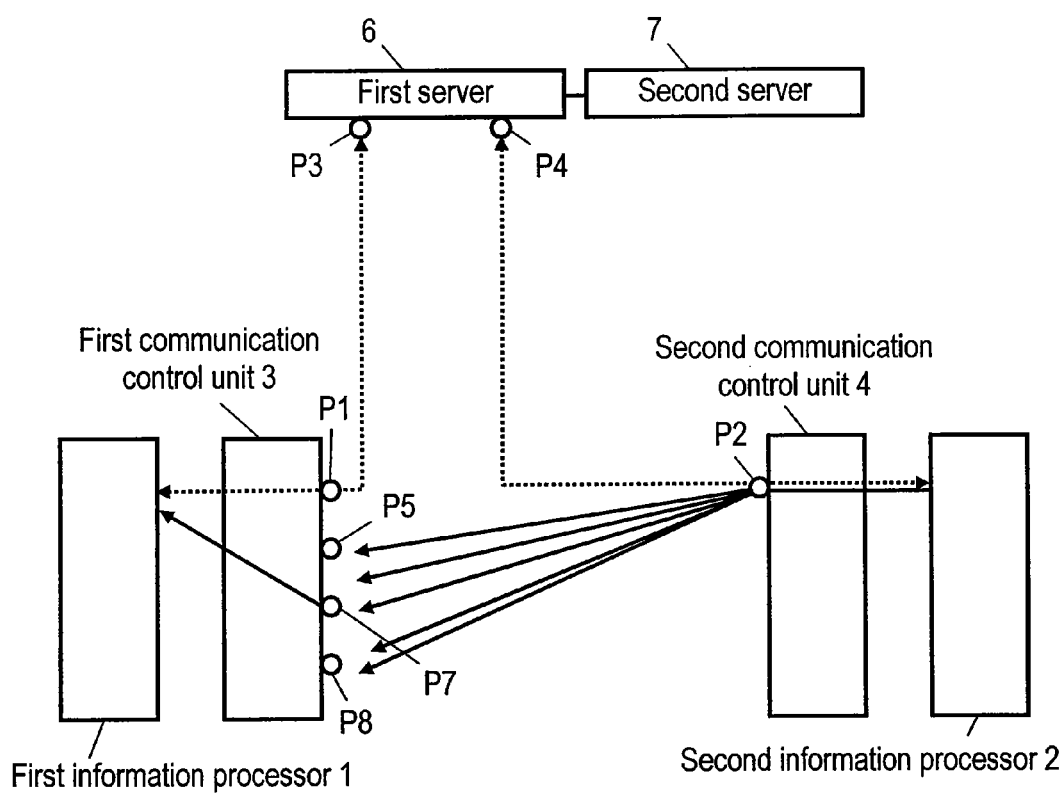
FIG. 14 is an explanatory diagram of specific example in the preferred embodiment.

FIG. 14 is a diagram explaining transmission of reply packet from second information processor 2. In FIG. 14, reply packet transmitter 29 of second information processor 2 sends the reply packet to port P5 of port number 10135 to port P8 of port number 10145 in first communication control unit 3 of IP address (202.132.10.6) on the basis of range information received in range receiver 27 from first server 6 (step S312). The reply packet is transmitted in every port number differential 1 indicated by port number differential information received in port number differential receiver 28. Since PR NAT is used in second communication control unit 4, the reply packet is sent to first communication control unit 3 by way of port P2. That is, the reply packet is sent from the port of second information processor 2 for communicating with first server 6. Other operation is same as in example 1, and the explanation is omitted.

In this example 3, AS NAT is not used in first communication control unit 3 at transmission side. Therefore, range detection packet transmitter 13 may receive this notice from characteristic determination unit 63 or the like, and the range detecting packet after transmission of bubble packet may be sent to first server 6, instead of second server 7. In example 3, since PS NAT is used in first communication control unit 3 at transmission side, when transmitting the range detecting packet to first server 6, the port of first information processor 1 for transmitting this packet may be same as the port used in communication with first server 6 by way of port 1. In this case, too, in order that a new port may be assigned in first communication control unit 3, it is necessary to transmit the range detecting packet to port P3 different from the port in first server 6, and port P6.

EXAMPLE 4

In example 4, full cone NAT is used in both first communication control unit 3 and second communication control unit 4. Herein, only the characteristic points in this case are explained, and similar points to the foregoing examples are not explained.

The operation of connection request from first information processor 1 is same as in example 1, and its explanation is omitted.

In determination of transmission or reception, since full cone NAT is used in both communication control units, transmission and reception are not exchanged, and first information processor 1 and first communication control unit 3 are determined at transmission side, and second information processor 2 and second communication control unit 4 are at reception side.

Figure 15:
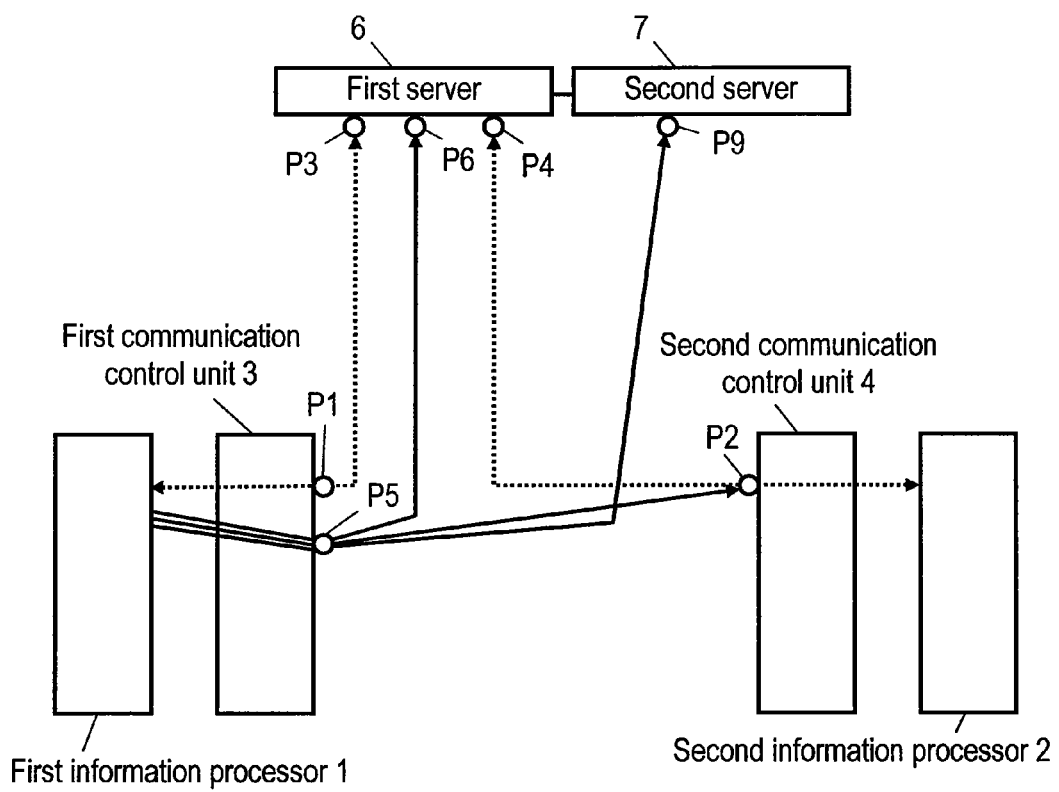
FIG. 15 is an explanatory diagram of specific example in the preferred embodiment.
Figures 16, 17:
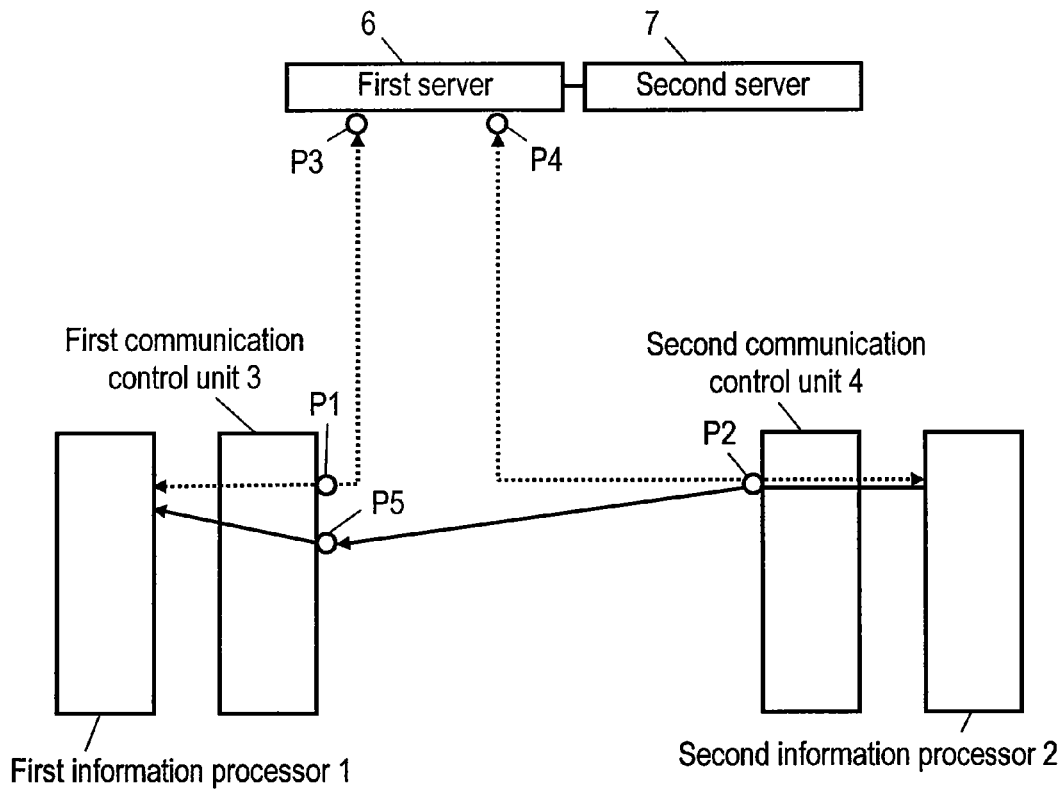
FIG. 16 is an explanatory diagram of specific example in the preferred embodiment.
FIG. 17 is a diagram of combination of characteristics of communication control units that can be connected in the preferred embodiment.

Transmission of bubble packet and others is explained briefly by referring to FIG. 15 and FIG. 16. In FIG. 15, when full cone NAT is used in first communication control unit 3, range detecting packet and bubble packet are transmitted by using same port P5. Hence, only one bubble packet transmitting port is specified by range information. Accordingly, as shown in FIG. 16, the reply packet sent from second information processor 2 is sent to port P5 by way of port P2, and communication between first information processor 1 and second information processor 2 can be established.

This explanation is intended to conform to the processing flow in FIG. 10, but when full cone NAT is used in second communication control unit 4, the transmitted bubble packet can be received in second information processor 2, and hence communication is established at this point. Therefore it is not necessary to transmit range detecting packet or transmit reply packet.

In the foregoing examples, the transmission destination of bubble packet is port P2 (the port used in communication with first server 6 by second information processor 2), which is because communication can be established if PR NAT or PS NAT is used in first communication control unit 3 at transmission side, and full cone NAT, R NAT, or PR NAT is used in second communication control unit 4 at reception side. Therefore, in other cases (for example, in the case of example 4), the bubble packet may be transmitted to other than port P2. In particular, when full cone NAT is used in first communication control unit 3, the bubble packet may be transmitted to other device than second communication control unit 4.

When first communication control unit 3 at transmission side is using other than AS NAT, the range detecting packet to be transmitted to second server 7 may be transmitted to first server 6.

The range detecting packet to be transmitted before and after transmission of bubble packet may be sent to first server 6 by using a port newly assigned in first information processor 1 individually. In this manner, in every transmission of range detecting packet, a new port is assigned in first communication control unit 3, and the range of ports including the bubble packet transmitting port can be detected. Therefore, even if AS NAT is used in first communication control unit 3 at transmission side, without using second server 7, the range of ports including the bubble packet transmitting packet can be detected. Meanwhile, when the bubble packet and the range detecting packet are transmitted from different ports in first information processor 1, the port of first communication control unit 3 allowing to pass the range detecting packet, and the port of first communication control unit 3 allowing to pass the bubble packet are different. Therefore, in such a case, the end of range for transmitting the reply packet may be determined at the position of the port closer to the bubble packet transmitting port by one port number differential than the port (port in first communication control unit 3) for allowing to pass the range detecting packet transmitted from the port different from the port (port in first information processor 1) transmitting the bubble packet. When transmitting the range detecting packet two times, the port for transmitting one range detecting packet (port in first information processor 1) may be same as the port for transmitting the bubble packet. In such a case, the range of ports including the bubble port transmitting port includes the port of first communication control unit 3 allowing to pass the range detecting packet transmitted from the same port as the port for transmitting the bubble packet (port in first information processor 1).

Further, when first communication control unit 3 at transmission side uses any one of full cone NAT, R NAT, and PR NAT, it is enough to send the range detecting packet only either before or after transmitting the bubble packet. That is, when first communication control unit 3 uses either R NAT or PR NAT, too, if the bubble packet and range detecting packet are sent from same port of first information processor 1, as shown in FIG. 15, port P5, port P7, and port P8 are same port, and by one range detecting packet, the bubble packet transmitting port can be identified. Further, when first communication control unit 3 at transmission side transmits bubble packet by way of a port for communicating with, for example, first server 6 (for example, port P1 in FIG. 15), it is not required to transmit range detecting packet.

FIG. 17 relates to types of NAT used in communication control unit, showing whether connectable or not. In the communication system of the preferred embodiment, unless PS NAT is used in both first communication control unit 3 and second communication control unit 4, first information processor 1 and second information processor 2 can be connected. In the foregoing explanation of examples, exceptional handling depending on the type of NAT used in the communication control unit is also described, but regardless of the type of NAT used in the communication control unit, by transmitting the range detecting packet before bubble packet transmission and the range detecting packet after bubble packet transmission to different addresses, and specifying the port of transmission destination of bubble packet as the port used in transmission and reception of information by the information processor at reception side with the server, and transmitting the reply packet to the range of ports including the bubble packet transmitting port detected by using the range detecting packet, the information processors can be connected in the combination indicated by ○-mark in FIG. 17. As for combination of Δ-mark in FIG. 17, the information processors can be connected by exchanging transmission and reception.

Herein, when PS NAT is used at transmission side and PS NAT or AS NAT is used at reception side, or PR NAT is used at transmission side and AS NAT or PS NAT is used at reception side, communication between information processors cannot be established, and the reason is briefly explained by referring to FIG. 12 to FIG. 14.

(1) In the case of PS NAT used at transmission side, and PS NAT or AS NAT at reception side In this case, since PS NAT is used in first communication control unit 3, supposing the bubble packet to be transmitted to port P2, first information processor 1 can receive only the reply packet transmitted from its port P2. On the other hand, second communication control unit 4 is using PS NAT or AS NAT, and second communication control unit 4 is using port P2 for communicating with first server 6, and hence second information processor 2 cannot transmit reply packet to first communication control unit 3 by way of port P2 (that is, reply packet cannot be transmitted as shown in FIG. 14). In this case, therefore, communication cannot be established. However, unless PS NAT is used at both transmission side and reception side, communication can be established by exchanging the transmission side and reception side.

(2) In the case of PR NAT used at transmission side, and PS NAT or AS NAT at reception side In this case, same as in case (1), since PR NAT is used in first communication control unit 3, supposing to transmit bubble packet to port P2, first information processor 1 can receive only the reply packet transmitted from its port P2. On the other hand, second communication control unit is using AS NAT or PS NAT, and hence reply packet cannot be replied through port P2. In this case, therefore, communication cannot be established. As mentioned above, however, in this case, ports P5, P7, P8 in first communication control unit 3 are the same port. In this case, too, communication can be established by exchanging the transmission side and reception side.

Thus, in the communication system of the preferred embodiment, except when PS NAT is used in both first communication control unit 3 and second communication control unit 4, communication can be established between first information processor 1 and second information processor 2.

Preferred Embodiment 2

A communication system in preferred embodiment 2 of the invention is described while referring to the accompanying drawings. The communication system in the preferred embodiment is intended to lessen the processing load of the server by detecting the range of ports including the bubble packet transmitting port or detecting the port number differential not in the server but in the information processor.

The configuration of the communication system in the preferred embodiment is same as shown in FIG. 1, except that first information processor 10, second information processor 20, and first server 60 are provided instead of first information processor 1, second information processor 2, and first server 6, and the detailed description is omitted.

Figure 18:
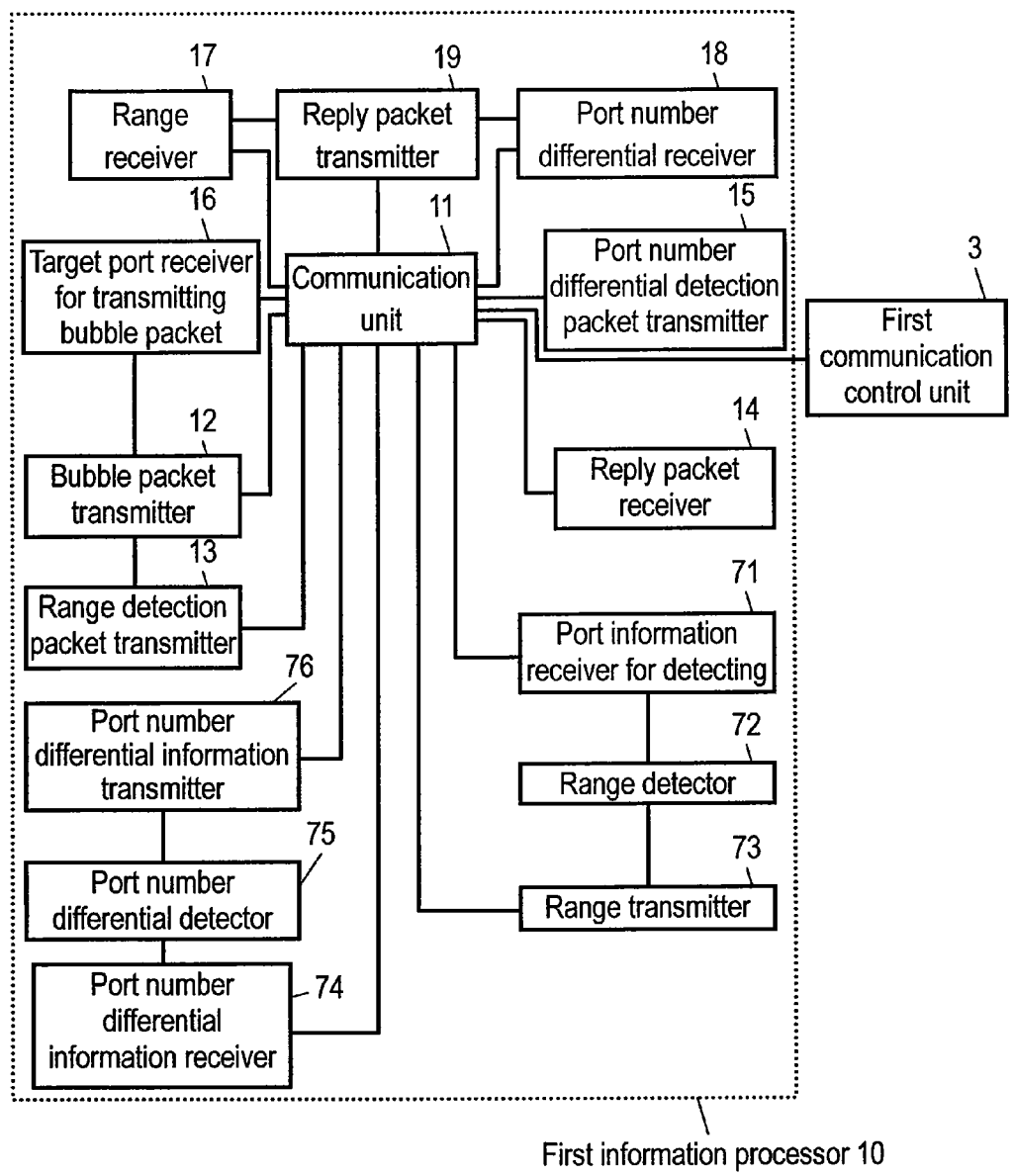
FIG. 18 is a block diagram of configuration of first information processor in preferred embodiment 2 of the invention.

FIG. 18 is a block diagram of configuration of first information processor 10 in the preferred embodiment. In FIG. 18, first information processor 10 comprises communication unit 11, bubble packet transmitter 12, range detection packet transmitter 13, reply packet receiver 14, port number differential detection packet transmitter 15, target port receiver for transmitting bubble packet 16, range receiver 17, port number differential receiver 18, reply packet transmitter 19, port information receiver for detecting 71, range detector 72, range transmitter 73, port number differential information receiver 74, port number differential detector 75, and port number differential information transmitter 76. Structure and operation of other components than port information receiver for detecting 71, range detector 72, range transmitter 73, port number differential information receiver 74, port number differential detector 75, and port number differential information transmitter 76 are same as shown in preferred embodiment 1, except that port number differential receiver 18 receives the port number differential information transmitted from second information processor 20 by way of first server 60, and the explanation is omitted.

Port information receiver for detecting 71 receives the port information for detecting transmitted from first server 60 by way of communication unit 11. The port information for detecting is the information showing the position of the port of first communication control unit 3 allowing to pass the range detection packet transmitted by range detection packet transmitter 13.

Range detector 72 detects the range of ports including the bubble packet transmitting port, on the basis of the port information for detecting received in port information receiver for detecting 71. The range of ports may be detected by acquiring the port number included in the payload of the packet of port information for detecting, and recording in specified memory or the like.

Range transmitter 73 transmits the range information which is the information showing the range of ports including the bubble packet transmitting port detected by range detector 72, to second information processor 20 by way of first server 60.

Port number differential information receiver 74 receives the port information for detecting port number differential. The port information for detecting port number differential is the information showing the position of the port of first communication control unit 3 allowing to pass the port number differential packet transmitted by port number differential detection packet transmitter 15. This port information for detecting port number differential is transmitted from first server 60.

Port number differential detector 75 detects the port number differential in first communication control unit 3, on the basis of port information for detecting port number differential received in port information for detecting port number differential 74. The port number differential is detected same as in port number differential detector 68 in preferred embodiment 1, and its explanation is omitted.

Port number differential information transmitter 76 transmits the port number differential information which is the information showing the port number differential of first communication control unit 3 detected by port number differential detector 75, to second information processor 20 by way of first server 60.

The components from bubble packet transmitter 12 to target port receiver for transmitting bubble packet 16 and from port information receiver for detecting 71 to port number differential information transmitter 76 in first information processor 10 are used when first information processor 10 operates at transmission side. The components from range receiver 17 to reply packet transmitter 19 are used when first information processor 10 operates at reception side.

Figure 19:
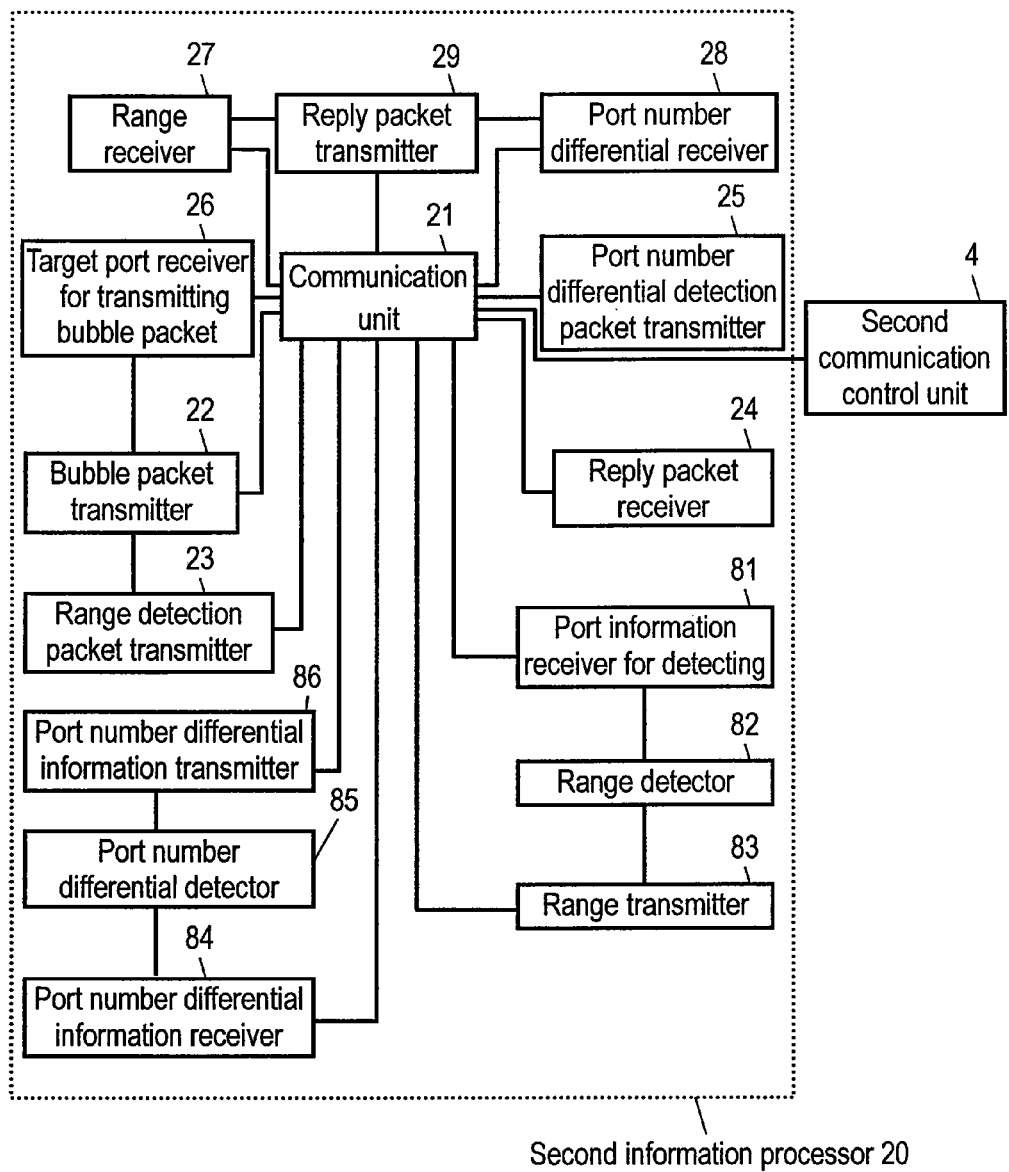
FIG. 19 is a block diagram of configuration of second information processor in the preferred embodiment.

FIG. 19 is a block diagram of configuration of second information processor 20 in the preferred embodiment. In FIG. 19, second information processor 20 comprises communication unit 21, bubble packet transmitter 22, range detection packet transmitter 23, reply packet receiver 24, port number differential detection packet transmitter 25, target port receiver for transmitting bubble packet 26, range receiver 27, port number differential receiver 28, reply packet transmitter 29, port information receiver for detecting 81, range detector 82, range transmitter 83, port number differential information receiver 84, port number differential detector 85, and port number differential information transmitter 86. Herein, the components from communication unit 21 to port number differential information transmitter 86 in second information processor 20 are same as communication unit 11 to port number differential information transmitter 76 in first information processor 10, except that first information processor 10, first communication control unit 3, second information processor 20, and second communication control unit 4 are exchanged, and detailed description is omitted.

The components from bubble packet transmitter 22 to target port receiver for transmitting bubble packet 26 and from port information receiver for detecting 81 to port number differential information transmitter 86 in second information processor 20 are used when second information processor 20 operates at transmission side. The components from range receiver 27 to reply packet transmitter 29 are used when second information processor 20 operates at reception side.

Figure 20:
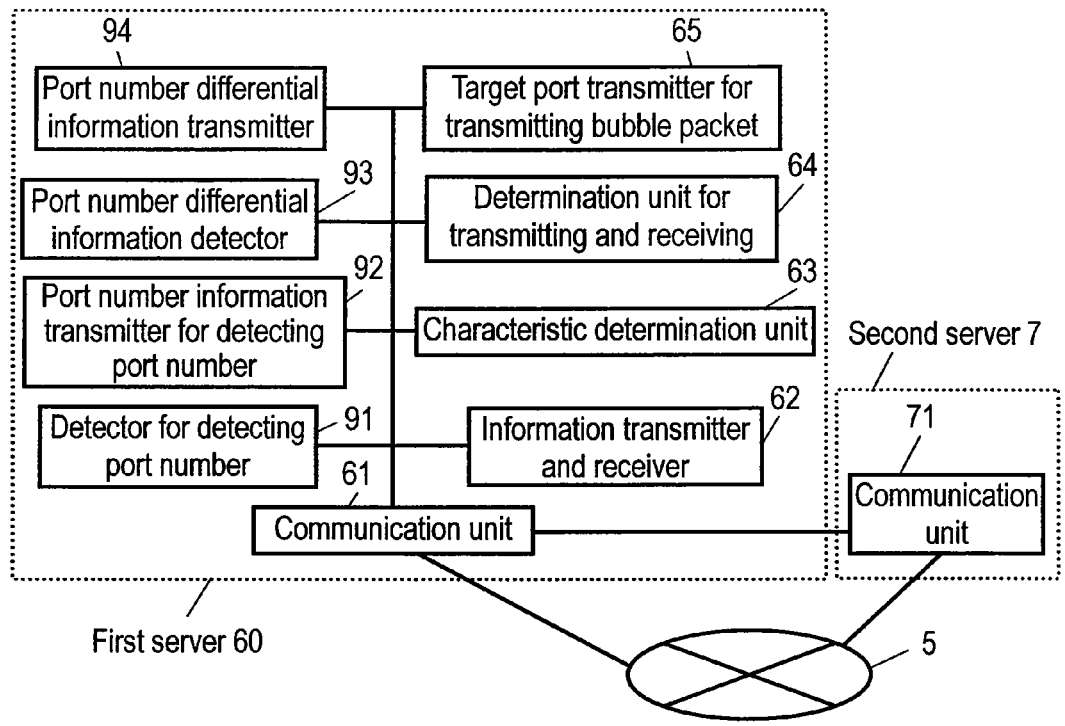
FIG. 20 is a block diagram of configuration of first and second servers in the preferred embodiment.

FIG. 20 is a block diagram of configuration of first server 60 in the preferred embodiment. In FIG. 20, first server 60 comprises communication unit 61, information transmitter and receiver 62, characteristic determination unit 63, determination unit for transmitting and receiving 64, target port transmitter for transmitting bubble packet 65, detector for detecting port number 91, port number information transmitter for detecting port number 92, port number differential information detector 93, and port number information transmitter for detecting port number 94. Structure and operation other than detector for detecting port number 91, port number information transmitter for detecting port number 92, port number differential information detector 93, and port number information transmitter for detecting port number 94 are same as in preferred embodiment 1, and the explanation is omitted.

Detector for detecting port number 91 receives the range detection packet sent from the transmission side information processor, and detects the position of the port of the transmission side communication control unit allowing to pass the range detection packet on the basis of the range detection packet. The port position is detected by acquiring the position of the port of the transmission side communication control unit allowing to pass the range detection packet included in the range detection packet (for example, included in the header of range detection packet). The range detection packet may be one sent from the transmission side information processor to communication unit 61, or may be other sent to communication unit 71 of second server 7, and received by way of communication unit 61. In the latter case, IP addresses should be different in first server 60 and second server 7.

Port number information transmitter for detecting port number 92 transmits the port information for detecting showing the position of the port detected by detector for detecting port number 91 to the transmission side information processor.

Port number differential information detector 93 receives the port number differential detection packet sent from the transmission side information processor by way of transmission side communication control unit, and detects the position of the port of the transmission side communication control unit allowing to pass the port number differential detection packet on the basis of the port number differential detection packet.

Port number information transmitter for detecting port number 94 transmits the port number differential detection port information showing the position of the port of transmission side communication control unit allowing to pass the port number differential detection packet detected by port number differential information detector 93, to the transmission side information processor.

The operation of communication system of the preferred embodiment is explained. The operation of the communication system in the preferred embodiment is same as the operation in preferred embodiment 1 shown in FIG. 5, except that the range of ports including the bubble packet transmitting port is detected or the port number differential is detected by first information processor 10 and second information processor 20, and the explanation is omitted.

Figure 21:
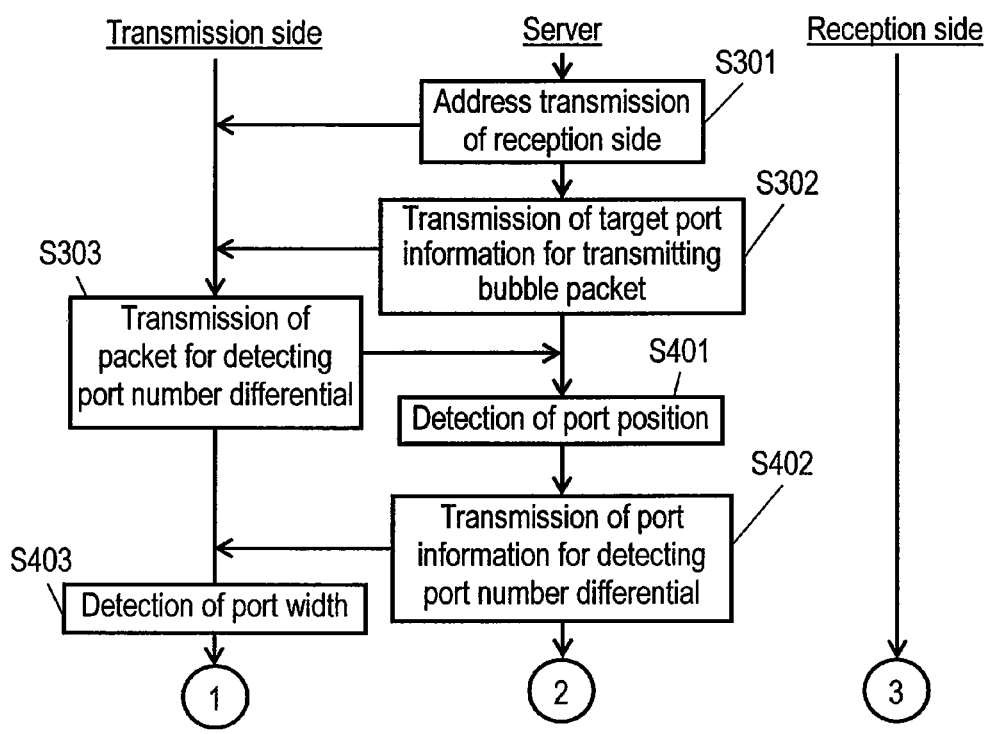
FIG. 21 is a flowchart of process of establishment of communication in the preferred embodiment.
Figure 22:
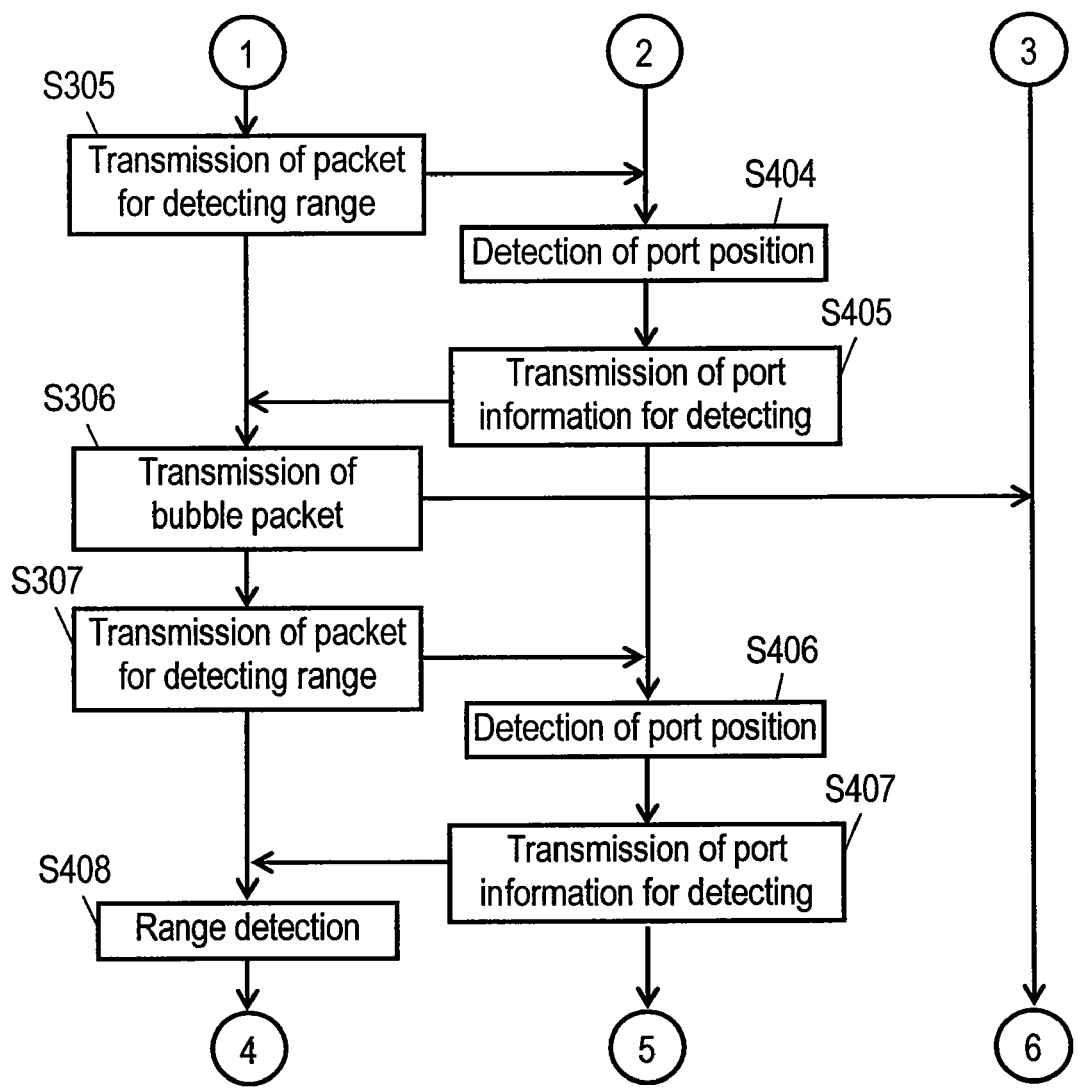
FIG. 22 is a flowchart of process of establishment of communication in the preferred embodiment.
Figure 23:
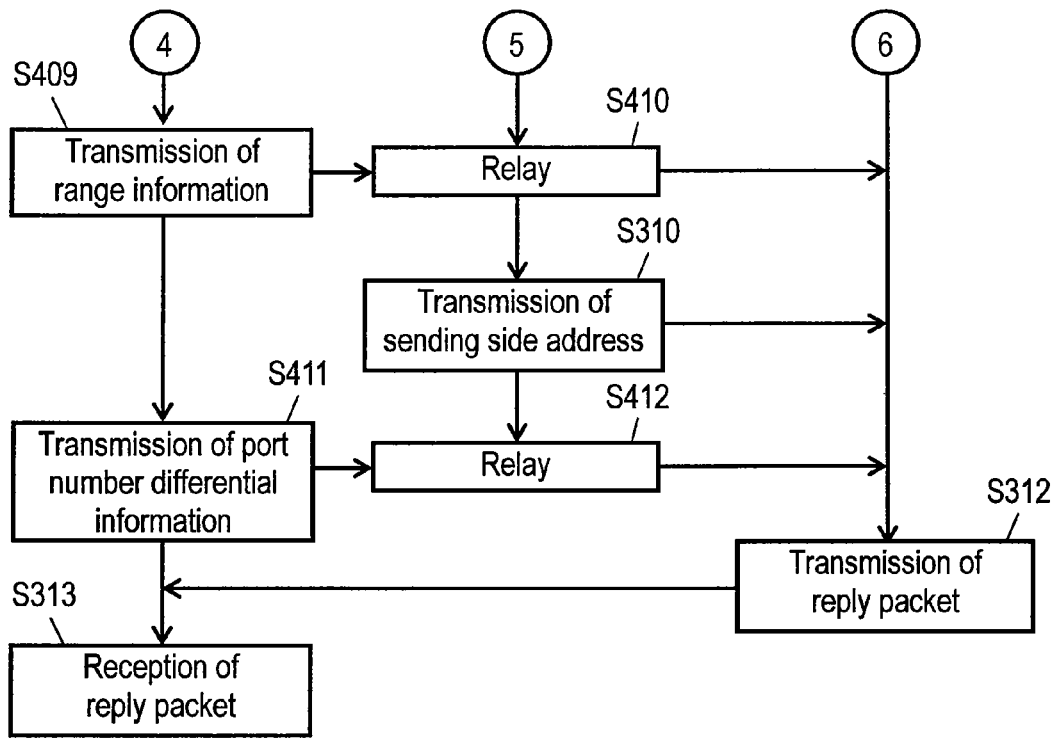
FIG. 23 is a flowchart of process of establishment of communication in the preferred embodiment.

In the flowchart in FIG. 5, the process at step S102 is explained by referring to FIG. 21 to FIG. 23. FIG. 21 to FIG. 23 are diagrams for explaining the exchange and processing of information among the transmission side, servers, and reception side. The server in FIG. 21 to FIG. 23 refers to both server 60 and server 7. For the convenience of explanation, first information processor 10 and first communication control unit 3 are supposed to be at transmission side, and second information processor 20 and second communication control unit 4 are supposed to be at transmission side. Process at steps S301 to S303, S305 to S307, S310, S312, and S313 is same as explained in FIG. 10 in preferred embodiment 1, and the explanation is omitted.

(Step S401) Port number differential information detector 93 of first server 60 receives a port number differential detection packet transmitted from first information processor 10. Port number differential information detector 93 detects the position of the port of first communication control unit 3 allowing to pass this port number differential detection packet.

(Step S402) Port number information transmitter for detecting port number 94 transmits the port differential information which is the information showing the position of the port of first communication control unit 3 allowing to pass the port number differential detection packet detected by port number differential information detector 93, to first information processor 10. This port differential information is received in port number differential information receiver 74 in first information processor 10.

(Step S403) Port number differential detector 75 detects the port number differential of first communication control unit 3 on the basis of port differential information received in port number differential information receiver 74. This detection of port number differential is same as in preferred embodiment 1, and its explanation is omitted.

(Step S404) Detector for detecting port number 91 of first server 60 receives a range detection packet sent from first information processor 10. Detector for detecting port number 91 detects the position of port in first communication control unit 3 allowing to pass this port detection packet included in the header of range detection packet.

(Step S405) Port number information transmitter for detecting port number 92 transmits the port number information showing the position of the port of first communication control unit 3 allowing to pass the range detection packet detected by detector for detecting port number 91, to first information processor 10. This port number information is received in port differential information receiver 71 in first information processor 10.

(Step S406) Detector for detecting port number 91 of first server 60 receives a range detection packet transmitted from first information processor 10. Detector for detecting port number 91 detects the position of port of first communication control unit 3 allowing to pass this port detection packet included in the header of range detection packet.

(Step S407) Port number information transmitter for detecting port number 92 transmits the port number information showing the position of the port of first communication control unit 3 allowing to pass the range detection packet detected by detector for detecting port number 91, to first information processor 10. This port number information is received in port differential information receiver 71 in first information processor 10.

(Step S408) Range detector 72 of first information processor 10 acquires the position of the port of first information processor 3 allowing to pass the range detection packet transmitted at steps S305, S307, from the port number information received in port differential information receiver 71, and detects the range of ports covering the two ports at both ends.

(Step S409) Range transmitter 73 of first information processor 10 transmits the range information which is the information showing the range of ports detected at step S408, to first server 60 together with instruction for transmitting the range information to second information processor 20.

(Step S410) Communication unit 61 of first server 60 receives the range information, and transmits this range information to second information processor 20. This range information is received in range receiver 27 in second information processor 20.

(Step S411) Port number differential information transmitter 76 transmits the port differential information showing the port number differential of first communication control unit 3 detected at step S403, to first server 60 together with instruction for transmitting this port differential information to second information processor 20.

(Step S412) Communication unit 61 of first server 60 receives the port differential information, and transmits this port differential information to second information processor 20. This range information is received in port number differential receiver 28 in second information processor 20.

In FIG. 21 to FIG. 23, there is a certain freedom about sequence of process same as in FIG. 10. For example, address transmission at transmission side (step S310) may be done at the same time as address transmission at reception side (step S301). In particular, in FIG. 22, transmission of range detection packet and transmission of bubble packet (steps S305 to S307) may be done without waiting for reception of detection port information. However, the range is detected (step S408) after reception of port number information.

In specific examples of operation of communication system of the preferred embodiment, the port number differential in transmission side communication control unit is detected in the transmission side information processor, and the range of ports including the bubble packet transmission port is detected in the transmission side information processor, and accompanying processes are done (for example, transmission of range information from first information processor 10 to second information processor), and other operations are same as in preferred embodiment 1, and the explanation is omitted.

Hence, in the communication system in the preferred embodiment, in addition to the same effects as in preferred embodiment 1, detection of port number differential in first communication control unit 3 or second communication control unit 4, or detection of range including ports of bubble packet transmitting port can be done in first information processor 10 or second information processor 20, so that the processing load in first server 60 can be saved. In particular, since the processing load is very in waiting process (such as process of waiting for transmission of second range detection packet after transmission of first range detection packet), such waiting process is not done in the server, so that the processing load of first server 60 may be substantially lessened.

In this preferred embodiment, detection of port number differential of communication control unit, or detection of range including ports of bubble packet transmitting port is done in first information processor, but either process may be done in the server same as in preferred embodiment 1.

In the preferred embodiment, the characteristic of communication control unit is determined by the server, but the characteristic of communication control unit may be determined also in the information processor. In this case, too, by transmitting the information showing the position of the port of communication control unit allowing to pass the packet transmitted from the information processor from the server to the information processor, the characteristic of communication control unit can be determined in the information processor same as in preferred embodiment 1.

Preferred Embodiment 3

A communication system in preferred embodiment 3 of the invention is described while referring to the accompanying drawings. The communication system in the preferred embodiment is characterized by that one information processor communicates directly without resort to communication control unit.

Figure 24:
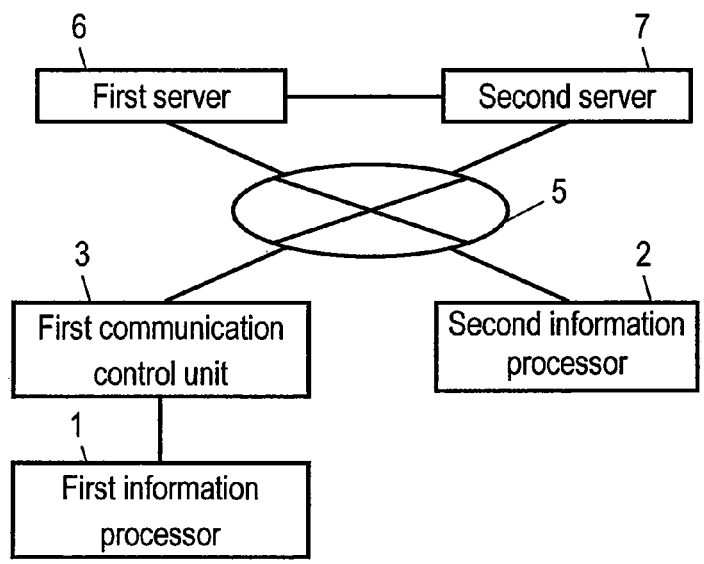
FIG. 24 is a block diagram of configuration of communication system in preferred embodiment 3 of the invention.

FIG. 24 is a block diagram of configuration of communication system in the preferred embodiment. In FIG. 24, the communication system in the preferred embodiment comprises first information processor 1, second information processor 2, first communication control unit 3, first server 6, and second server 7. The communication system in the preferred embodiment shown in FIG. 24 is same as the communication system in preferred embodiment 1, except that second communication control unit is not provided. The structure and operation of first information processor 1, second information processor 2, first server 6, and second server 7 are same as in preferred embodiment, and the detailed description is omitted.

Herein, since second information processor 2 is intended to communicate without resort to communication control unit, second information processor 2 is assumed to be communication as if by way of communication control unit of full cone NAT. Therefore, the operation in this preferred embodiment is same as operation in the case of second communication control unit 4 operating on full cone NAT in preferred embodiment 1, and communication between first information processor 1 and second information processor 2 can be established.

Thus, in the communication system of the preferred embodiment, if second information processor 2 communicates without resort to communication control unit, communication between first information processor 1 and second information processor 2 can be established.

This preferred embodiment is similar to the communication system in preferred embodiment 1 except that second communication control unit is not provided, but it is similarly realized in the communication system in preferred embodiment 2 excluding second communication control unit. Thus, if the second information processor communicates without resort to communication control unit, communication between first information processor 1 and second information processor 2 can be established.

Or, in the preferred embodiment, second information processor 2 communicates without resort to communication control unit, but if second information processor 2 communicates by way of communication control unit, and first information processor 1 communicates without resort to communication control unit, similarly, communication between first information processor 1 and second information processor 2 can be established.

In the explanation of the foregoing preferred embodiments, when determining the transmission side and reception side of information processor and communication control unit, first the information processor is provisionally determined as transmission side, and it is explained to exchange later depending on the characteristic of the communication control unit, but when first server 6 or the like receives the request for establishment of communication with other information processor from the information processor, the characteristic of first communication control unit 3 and second communication control unit 4 can be determined, and depending on the result of determination of characteristic, the information processor at transmission side and information processor at reception side can be determined (in this case, there is no concept of "exchange of transmission and reception").

Preferred Embodiment 4

A communication system in preferred embodiment 4 of the invention is described while referring to the accompanying drawings. The communication system in the preferred embodiment is intended to transmit one or more bubble packets.

Figure 25:
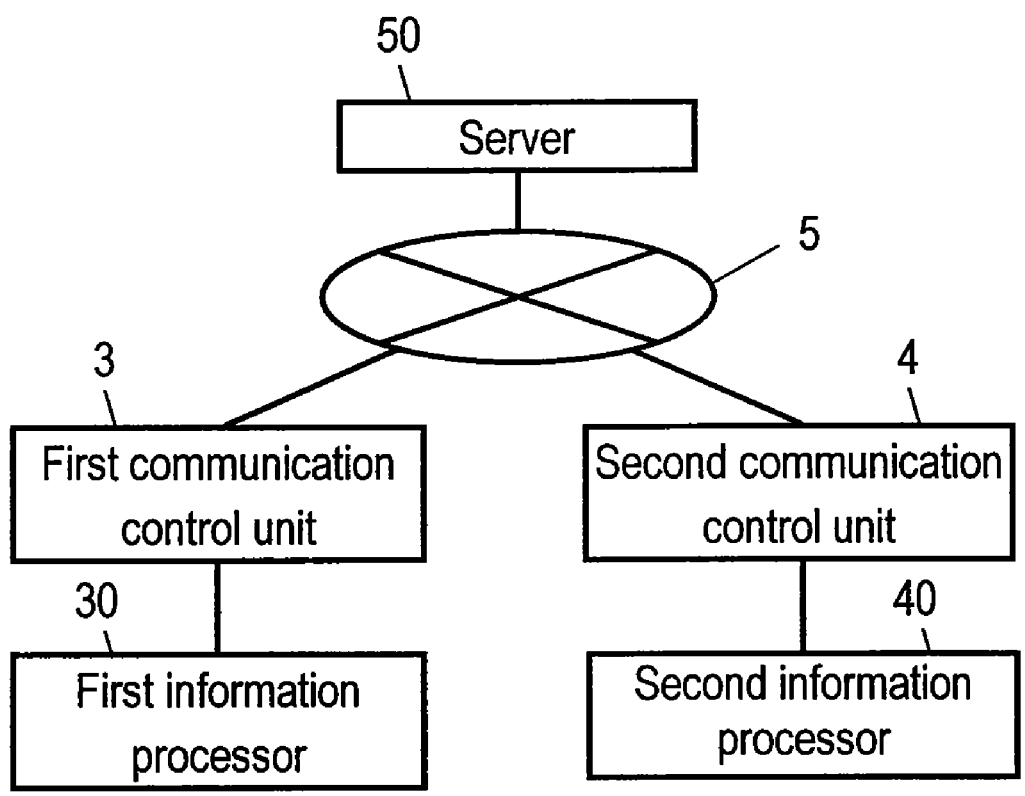
FIG. 25 is a block diagram of configuration of communication system in preferred embodiment 4 of the invention.

FIG. 25 is a block diagram of configuration of communication system in the preferred embodiment. In FIG. 25, the communication system in the preferred embodiment comprises first information processor 30, second information processor 40, first communication control unit 3, second communication control unit 4, and second server 50. First communication control unit 3 and second communication control unit 4 are same as in preferred embodiment 1, and the explanation is omitted.

Figure 26:
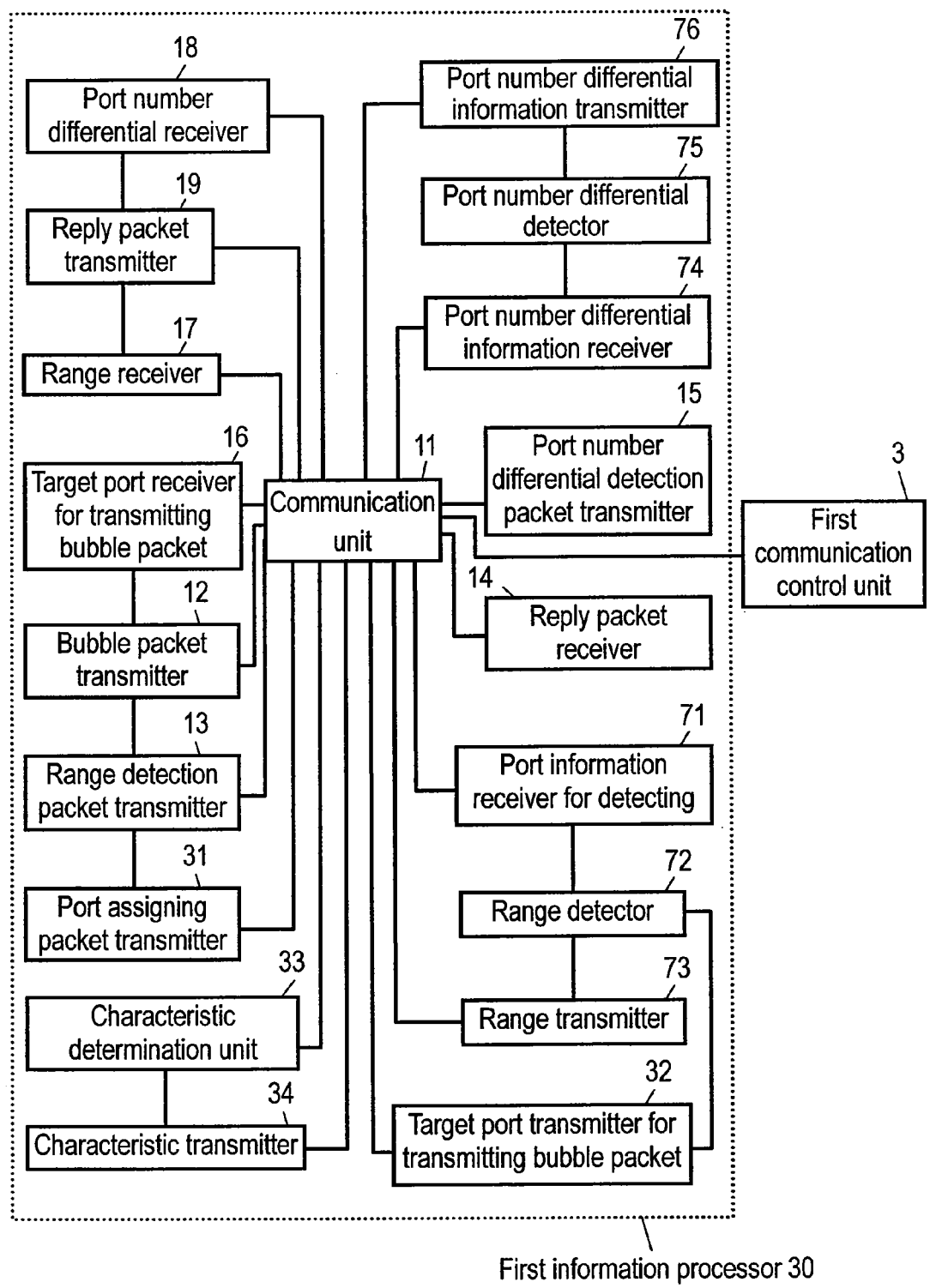
FIG. 26 is a block diagram of configuration of first information processor in the preferred embodiment.

FIG. 26 is a block diagram of configuration of first information processor 30 in the preferred embodiment. In FIG. 26, first information processor 30 comprises communication unit 11, bubble packet transmitter 12, range detection packet transmitter 13, reply packet receiver 14, port number differential detection packet transmitter 15, target port receiver for transmitting bubble packet 16, range receiver 17, port number differential receiver 18, reply packet transmitter 19, port information receiver for detecting 71, range detector 72, range transmitter 73, port number differential information receiver 74, port number differential detector 75, port number differential information transmitter 76, port assigning packet transmitter 31, target port transmitter for transmitting bubble packet 32, characteristic determination unit 33, and characteristic transmitter 34. Structure and operation of other components than port assigning packet transmitter 31, target port transmitter for transmitting bubble packet 32, characteristic determination unit 33, and characteristic transmitter 34 are same as shown in preferred embodiment 2, except that bubble packet transmitter 12 transmits one or more bubble packets, and that port differential information receiver 71 and range detector 72 are responsible for process of detection of range about the bubble packet transmitting port and process of detection of range about port assigning packet transmitted by port assigning packet transmitter 31 described below, and the explanation is omitted.

Port assigning packet transmitter 31 transmits a port assigning packet for assigning the packet for transmitted a reply packet in first communication control unit 3. This port assigning packet is transmitted to second communication control unit 4. The port in second communication control unit 4 to which the port assigning packet is transmitted is arbitrary. For example, the port assigning packet is transmitted to the port of second communication control unit 4 used in communication with server 50 by second information processor 40. Reply packet transmitter 19 is to transmit reply packet from the port of first information processor 30 transmitting the port assigning packet from this port assigning packet transmitter 31.

Target port transmitter for transmitting bubble packet 32 transmits the range of one or more ports including the port (called port assigning packet transmitting port) of first communication control unit 3 allowing to pass port assigning packet transmitter 31 detected by range detector 72, to second information processor 40 by way of server 50, as target port information for transmitting bubble packet.

Characteristic determination unit 33 determines the characteristic of first communication control unit 3. More specifically, transmitting the characteristic determination packet to server 50, the characteristic determination packet information which is the information showing the position of the port of first communication control unit 3 allowing to pass this characteristic determination packet is received, and the characteristic of first communication control unit 3 is determined.

Characteristic transmitter 34 sends the characteristic information which is the information showing the characteristic of first communication control unit 3 determined by characteristic determination unit 33 to second information processor 40 by way of server 50.

In the preferred embodiment, the components from bubble packet transmitter 12 to target port receiver for transmitting bubble packet 16 and from port information receiver for detecting 71 to port number differential information transmitter 76 in first information processor 30 are used when first information processor 30 operates at transmission side. The components from range receiver 17 to reply packet transmitter 19, and range detection packet transmitter 13, port assigning packet transmitter 31, target port transmitter for transmitting bubble packet 32, and port information receiver for detecting 71 to port number differential information transmitter 76 are used when first information processor 30 operates at reception side. In other words, range detection packet transmitter 13, and port information receiver for detecting 71 to port number differential information transmitter 76 are used when first information processor 30 operates at both transmission side and reception side. The preferred embodiment is explained when the components of range detection packet transmitter 13, and port information receiver for detecting 71 to port number differential information transmitter 76 are used when first information processor 30 operates at both transmission side and reception side, but one or more components of these components may be provided independently when first information processor 30 operates at transmission side, and at reception side.

Figure 27:
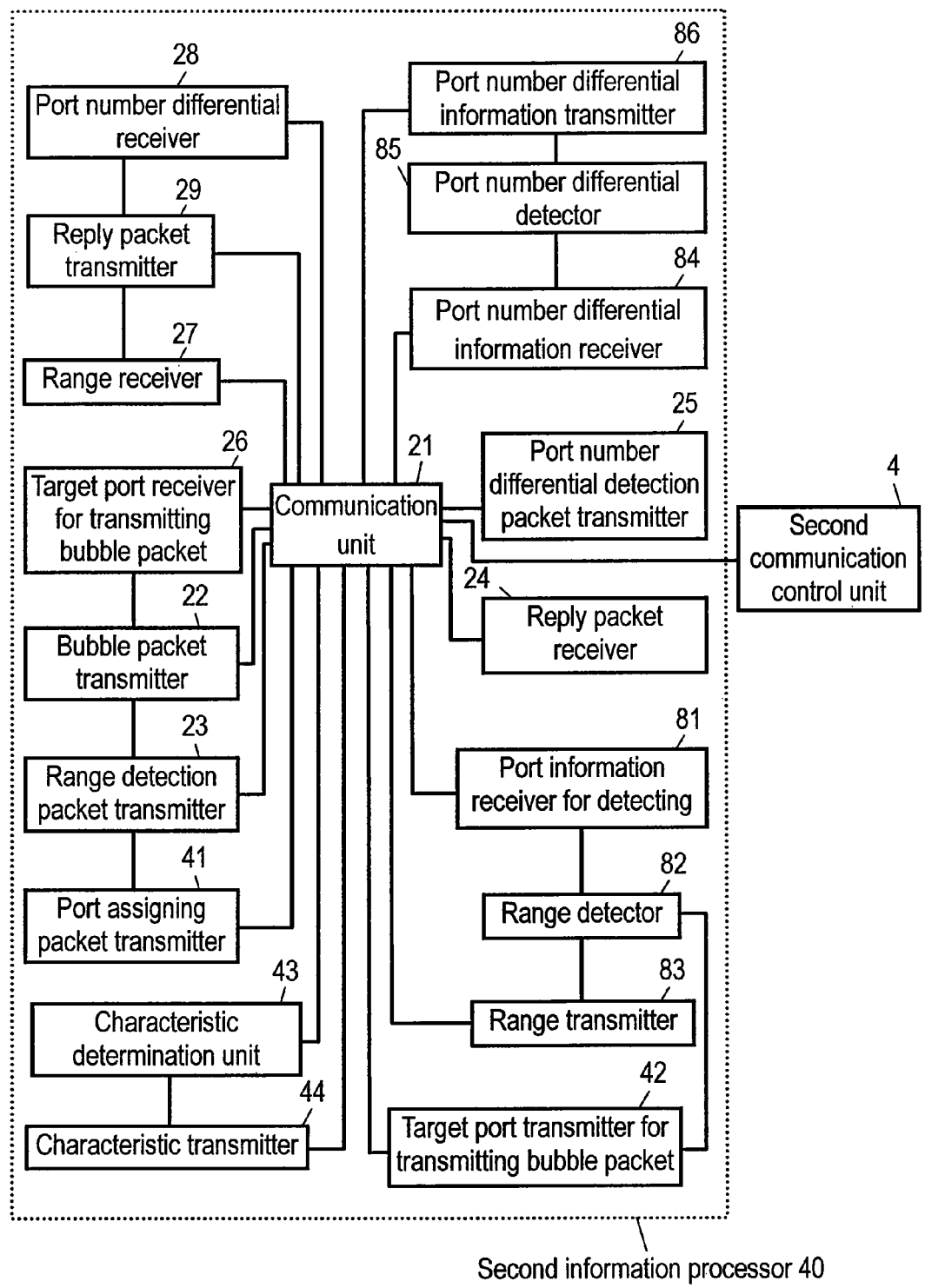
FIG. 27 is a block diagram of configuration of second information processor in the preferred embodiment.

FIG. 27 is a block diagram of configuration of second information processor 40 in the preferred embodiment. In FIG. 27, second information processor 40 comprises communication unit 21, bubble packet transmitter 22, range detection packet transmitter 23, reply packet receiver 24, port number differential detection packet transmitter 25, target port receiver for transmitting bubble packet 26, range receiver 27, port number differential receiver 28, reply packet transmitter 29, port information receiver for detecting 81, range detector 82, range transmitter 83, port number differential information receiver 84, port number differential detector 85, port number differential information transmitter 86, port assigning packet transmitter 41, target port transmitter for transmitting bubble packet 42, characteristic determination unit 43, and characteristic transmitter 44. In second information processor 40, the components from communication unit 21 to port number differential information transmitter 86 are same as communication unit 11 to port number differential information transmitter 76 in first information processor 30 except that first information processor 30, first communication control unit 3, second information processor 40, and second communication control unit 4 are exchanged, and the explanation is omitted.

In the preferred embodiment, the components from bubble packet transmitter 22 to target port receiver for transmitting bubble packet 26 and from port information receiver for detecting 81 to port number differential information transmitter 86 in second information processor 40 are used when second information processor 40 operates at transmission side. The components from range receiver 27 to reply packet transmitter 29, and range detection packet transmitter 23, port assigning packet transmitter 41, target port transmitter for transmitting bubble packet 42, and port information receiver for detecting 81 to port number differential information transmitter 86 are used when second information processor 40 operates at reception side. That is, range detection packet transmitter 23, and port differential information receiver 81 to port number differential detector 86 are used in both cases of second information processor 40 used at transmission side and at reception side. Also, in the preferred embodiment, it is explained when the components of range detection packet transmitter 23, and port information receiver for detecting 81 to port number differential information transmitter 86 are used when second information processor 40 operates at both transmission side and reception side, but one or more components of these components may be provided independently when second information processor 40 operates at transmission side, and at reception side.

Figure 28:
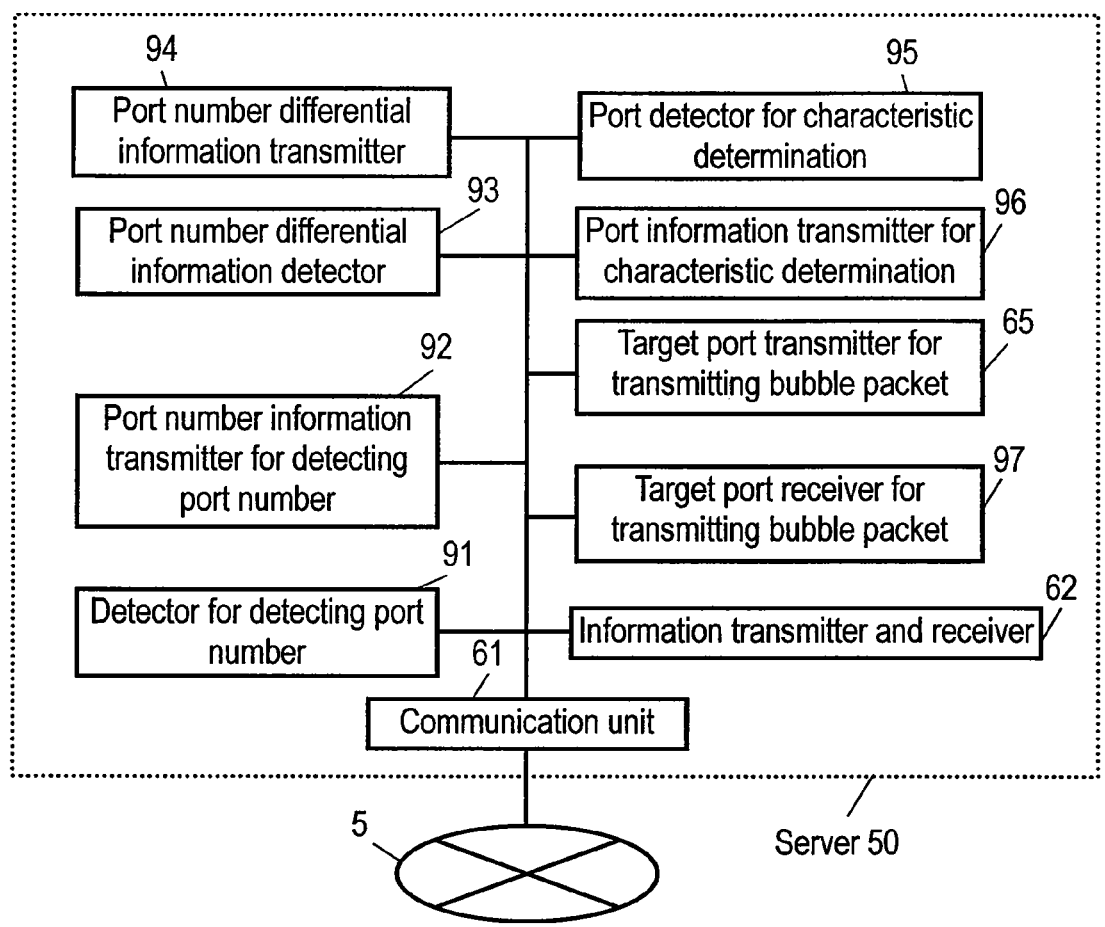
FIG. 28 is a block diagram of configuration of server in the preferred embodiment.

FIG. 28 is a block diagram of configuration of server 50 in the preferred embodiment. In FIG. 28, server 50 comprises communication unit 61, information transmitter and receiver 62, target port transmitter for transmitting bubble packet 65, detector for detecting port number 91, port number information transmitter for detecting port number 92, port number differential information detector 93, port number information transmitter for detecting port number 94, port detector for characteristic determination 95, port information transmitter for characteristic determination 96, and target port receiver for transmitting bubble packet 97. Structure and operation other than port detector for characteristic determination 95, port information transmitter for characteristic determination 96, and target port receiver for transmitting bubble packet 97 in server 50 are same as in preferred embodiment 2, except that detector for detecting port number 91, port number information transmitter for detecting port number 92, port number differential information detector 93, and port number information transmitter for detecting port number 94 are active in both information processor at transmission side and information processor at reception side, and the explanation is omitted. In the preferred embodiment, target port transmitter for transmitting bubble packet 65 is to transmit the target port information of bubble packet received in target port receiver for transmitting bubble packet 97.

Port detector for characteristic determination 95 receives packet for characteristic determination transmitted from first information processor 30 or second information processor 40, and detects the position of the port of first communication control unit 3 or second communication control unit 4 allowing to pass the packet for characteristic determination on the basis of this packet for characteristic determination. The port position is detected by acquiring the position of the port of first communication control unit 3 or second communication control unit 4 allowing to pass the packet for characteristic determination included in the packet for characteristic determination (for example, included in the header of packet for characteristic determination).

Port information transmitter for characteristic determination 96 transmits the port information for characteristic determination showing the position of the port detected by port detector for characteristic determination 95, to the information processor having transmitted the packet for characteristic determination.

Target port receiver for transmitting bubble packet 97 receives the target port information for transmitting bubble packet which is the information showing the target port for transmitting bubble packet. The target port for transmitting bubble packet indicated by this target port information for transmitting bubble packet is one or more ports.

The operation of communication system of the preferred embodiment is explained. The operation of the communication system in the preferred embodiment is same as the operation in preferred embodiment 1 shown in FIG. 5, and the explanation is omitted.

Figure 29:
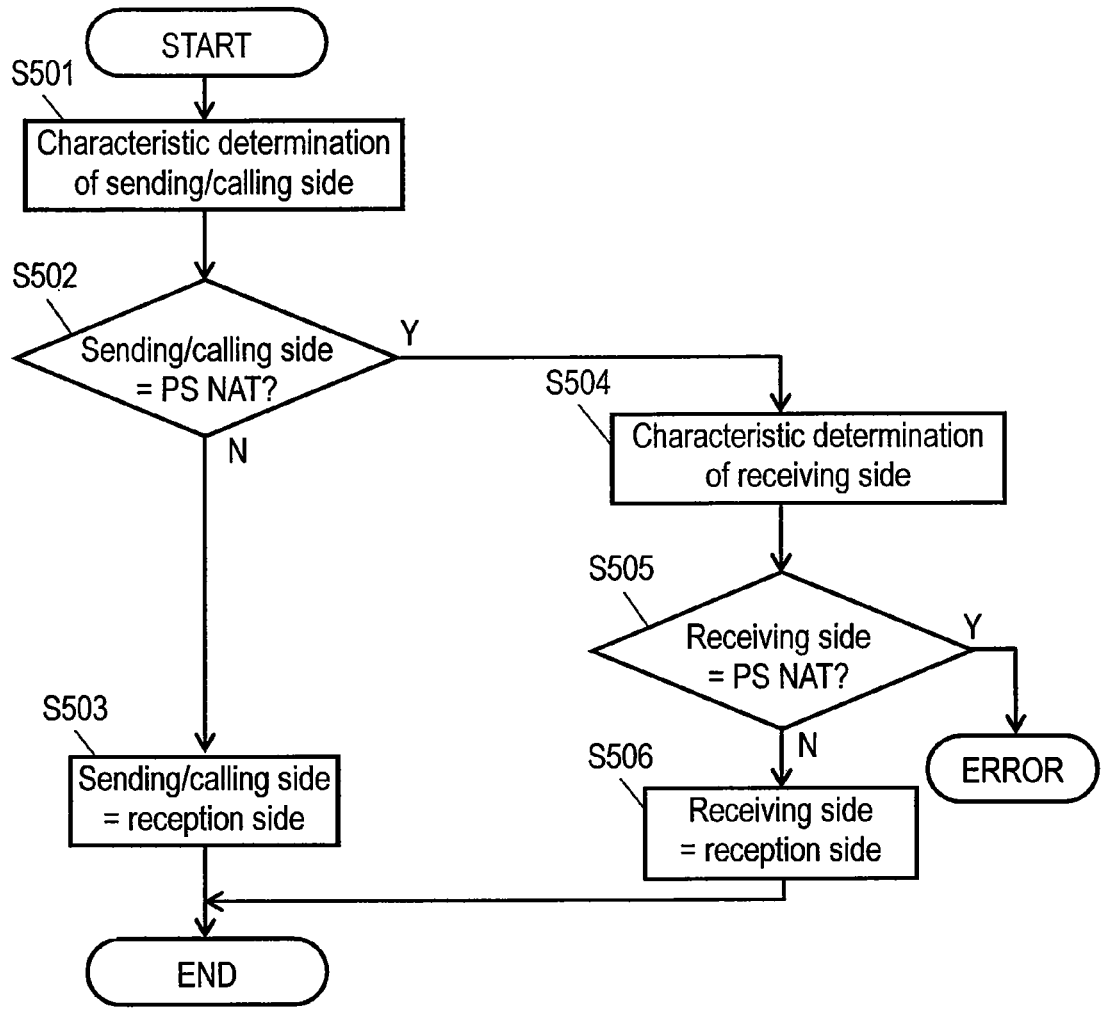
FIG. 29 is a flowchart of determination process of transmission and reception in the preferred embodiment.

In the flowchart in FIG. 5, the process at step S101 is explained by referring to FIG. 29. FIG. 29 is a flowchart of process of determination of transmission side and determination side of information processor. In this explanation of flowchart, it is supposed that second information processor 40 is attempting to communicate with first information processor 30. Therefore, first information processor 30 and first communication control unit 3 are at receiving side, and second information processor 40 and second communication control unit 4 are at sending/calling side. Alternatively, if first information processor 30 attempts to call second information processor 40, only first information processor 30 and first communication control unit 3, and second information processor 40 and second communication control unit 4 are exchanged, and other points are same as in the flowchart. The sending/calling side is the side requesting communication with the partner side, and the receiving side is the side requested to communicate from the sending/calling side.

(Step S501) Characteristic determination unit 43 of second information processor 40 determines the characteristic of second communication control unit 4, that is, communication control unit at sending/calling side. Method of determining the characteristic is described below.

(Step S502) Characteristic determination unit 43 judges if PS NAT is used or not in second communication control unit 4. When PS NAT is used, characteristic transmitter 44 send the characteristic information showing PS NAT is used in second communication control unit 4 to first information processor 30 by way of server 50, and the process goes to step S504, and otherwise the process goes to step S503.

(Step S503) Characteristic determination unit 43 determines the sending/calling side device, that is, second information processor 40 as the reception side device, that is, the device at the side of receiving the bubble packet. This ends the process of determination of transmission and reception.

(Step S504) Characteristic determination unit 33 of first information processor 30 determines the characteristic of first communication control unit 3 which is the communication control unit at receiving side. Method of determining the characteristic is described below.

(Step S505) Characteristic determination unit 33 judges if PS NAT is used or not in first communication control unit 3. When PS NAT is used, both transmission side and reception side are using PS NAT, and it is an error. If PS NAT is not used, the process goes to step S506.

(Step S506) Characteristic determination unit 33 determines the receiving side device, that is, first information processor 30 as the reception side device, that is, the device at the side of receiving the bubble packet. This ends the process of determination of transmission and reception.

Figure 30:
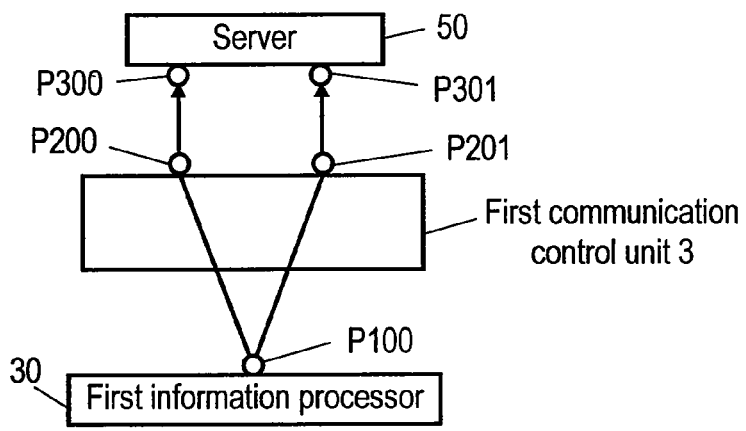
FIG. 30 is an explanatory diagram of determination of characteristic of communication control unit in the preferred embodiment.

Referring now to FIG. 30, the method of determining the characteristic of first communication control unit 3 is explained. The characteristic of second communication control unit 4 can be similarly determined.

In FIG. 30, characteristic determination unit 33 of first information processor 30 transmits two characteristic determination packets to port P300 and port P301 of server 50 from one port P100. Herein, port P300 and port P301 are different ports. Port detector for characteristic determination 95 of server 50 detects the position of ports (P200, P201) of first communication control unit 3 allowing to pass each packet for characteristic determination transmitted to ports P300, P301. The port information for characteristic determination as the information showing the port position is transmitted from port information transmitter for characteristic determination 96 to first information processor 30. Then, characteristic determination unit 33 receives this port information for characteristic determination, and judges the characteristic of first communication control unit 3 depending on whether or not port P200 and port P201 are identical. More specifically, if port P200 and port P201 are identical, it is judged that PS NAT is not used in first communication control unit 3. On the other hand, if port P200 and port P201 are different, it is judged that PS NAT is used in first communication control unit 3.

Figure 31:
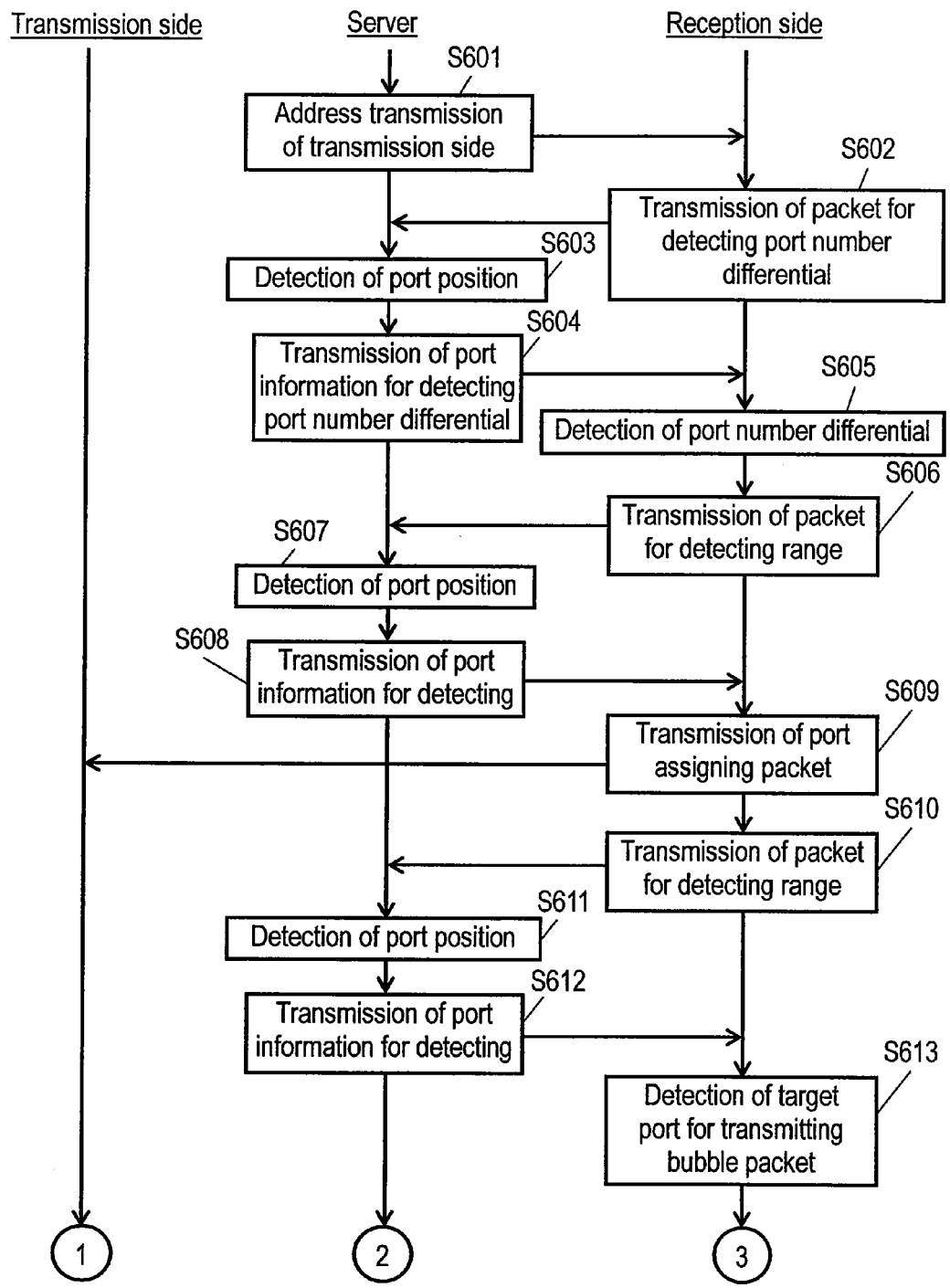
FIG. 31 is a flowchart of process of establishment of communication in the preferred embodiment.
Figure 32:
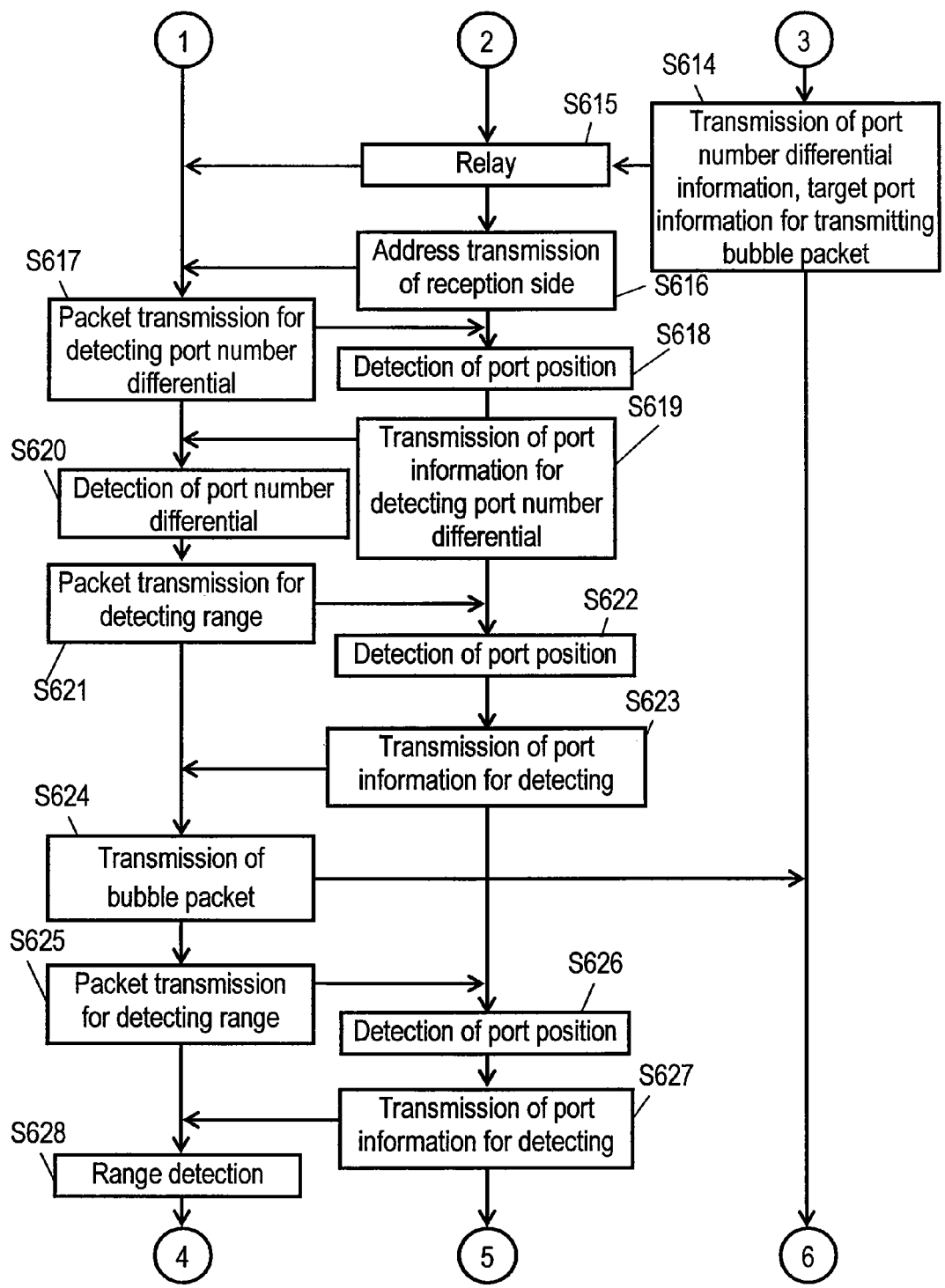
FIG. 32 is a flowchart of process of establishment of communication in the preferred embodiment.
Figure 33:
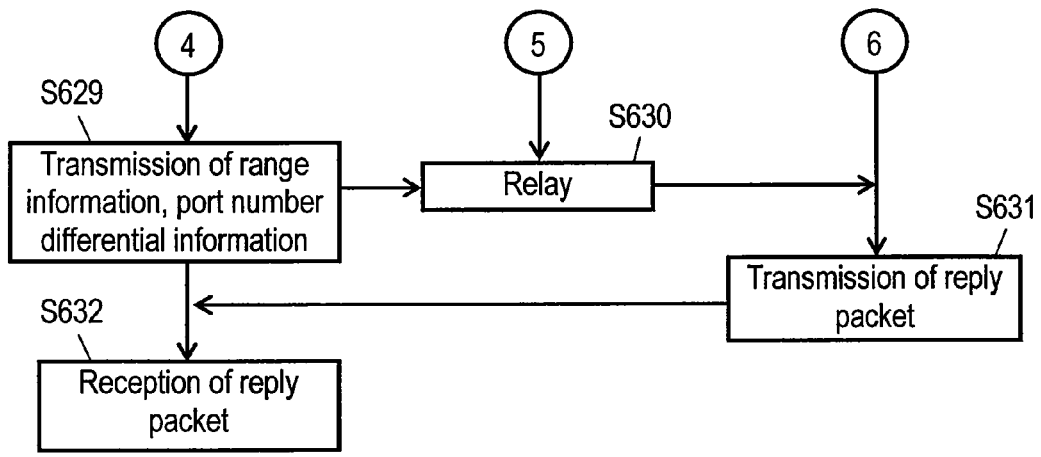
FIG. 33 is a flowchart of process of establishment of communication in the preferred embodiment.

The process at step S102 in the flowchart in FIG. 5 is explained by referring to FIG. 31 to FIG. 33. FIG. 31 to FIG. 33 are diagrams for explaining the exchange and processing of information among the transmission side information processor, server, and reception side information processor, about establishment of communication. For the convenience of explanation, first information processor 30 and first communication control unit 3 are supposed to be at transmission side, and second information processor 40 and second communication control unit 4 are supposed to be at transmission side.

(Step S601) Information transmitter and receiver 62 of server 50 transmits the address information showing the IP address of first communication control unit 3 to second information processor 40. The transmitted address information is received in communication unit 21 of second information processor 40, and is transferred to port assigning packet transmitter 41.

(Step S602) Port number differential detection packet transmitter 25 of second information processor 40 transmits port number differential detection packet to server 50. In this transmission, ports of second communication control unit 4 allowing to pass plural port number differential detection packets are mutually different. The port number differential detection packets are transmitted, for example, from plural ports of different port numbers in second information processor 40.

(Step S603) Port number differential information detector 93 of server 50 receives the port number differential detection packets sent from second information processor 40. Port number differential information detector 93 detects the position of ports of second communication control unit 4 allowing to pass the port number differential detection packets included in the header of port number differential detection packets.

(Step S604) Port number information transmitter for detecting port number 94 transmits the port differential information which is the information showing the position of ports of second communication control unit 4 allowing to pass the port number differential detection packets detected by port number differential information detector 93, to second information processor 40. The port differential information is received in port differential information receiver 84 in second information processor 40.

(Step S605) Port number differential detector 85 detects the port number differential of second information control unit 4 on the basis of the port differential information received in port differential information receiver 84. The port number differential is detected in the same manner as in preferred embodiment 1, and its explanation is omitted.

(Step S606) Range detection packet transmitter 23 transmits a range detection packet to server 50 by way of second communication control unit 4. In this transmission, the packet is transmitted so that the range detection packet may pass through the latest assigned port in second communication control unit 4. This is intended to properly limit the range of ports including the bubble packet transmitting port. For example, range detection packet transmitter 23 transmits the range detection packet by using a port of second information processor 40 not used so far in communication.

(Step S607) Detector for detecting port number 91 of server 50 receives the range detection packet transmitted from second information processor 40. Detector for detecting port number 91 detects the position of port of second communication control unit 4 allowing to pass this port detection packet included in the header of the range detection packet.

(Step S608) Port number information transmitter for detecting port number 92 transmits the information for port differential detection showing the position of port of second communication control unit 4 allowing to pass the range detection packet, detected by detector for detecting port number 91, to second information processor 40. This information for port differential detection is received in port differential information receiver 81 in second information processor 40.

(Step S609) Port assigning packet transmitter 41 transmits a port assigning packet to first communication control unit 3. The address of first communication control unit 3 is the one transmitted at step S601.

(Step S610) Range detection packet transmitter 23 transmits a range detection packet to server 50 by way of second communication control unit 4.

(Step S611) Detector for detecting port number 91 of server 50 receives the range detection packet transmitted from second information processor 40. Detector for detecting port number 91 detects the position of port of second communication control unit 4 allowing to pass this port detection packet included in the header of the range detection packet.

(Step S612) Port number information transmitter for detecting port number 92 transmits the information for port differential detection showing the position of port of second communication control unit 4 allowing to pass the range detection packet, detected by detector for detecting port number 91, to second information processor 40. This information for port differential detection is received in port differential information receiver 81 in second information processor 40.

(Step S613) Range detector 82 of second information processor 40 acquires the position of ports of second communication control unit 4 allowing to pass range detection packets transmitted at steps S606, S610, from the information for port differential detection received in port differential information receiver 81, and on the basis of position of two ports, the range of ports including the port assigning packet transmitting port (target port for transmitting bubble packet) is detected. The target port for transmitting bubble packet may be either one port or may include two or more ports.

(Step S614) Port number differential information transmitter 86 of second information processor 40 transmits the port number differential information showing the port number differential of second communication control unit 4 detected at step S605, to server 50, together with instruction for transmitting this port number differential information to first information processor 30. Target port transmitter for transmitting bubble packet 42 of second information processor 40 transmits target port information for transmitting bubble packet showing the target port for transmitting bubble packet detected at step S613, to server 50, together with instruction for transmitting the target port information for transmitting bubble packet to first information processor 30. These items of information may be transmitted by one packet, or by different packets.

(Step S615) Communication unit 61 of server 50 receives port number differential information and target port information for transmitting bubble packet, and sends these items of information to first information processor 30. The target port for transmitting bubble packet is received in target port receiver for transmitting bubble packet 97, and transmitted to first information processor 30 by target port transmitter for transmitting bubble packet 65. The port number differential information is received in port number differential receiver 18 of first information processor 30, and target port information for transmitting bubble packet is received in target port receiver for transmitting bubble packet 16.

(Step S616) Information transmitter and receiver 62 of server 50 transmits address information showing the IP address of second communication control unit 4 to first information processor 30. The transmitted address information is received in communication unit 11 of first information processor 30, and is transferred to bubble packet transmitter 12.

(Step S617) Packet transmitter for port differential detection 15 in first information processor 30 transmits a port number differential detection packet to server 50. In this transmission, ports of first communication control unit 3 allowing to pass plural port number differential detection packets should be different from each other. The port number differential detection packets are transmitted, for example, from plural ports different in port numbers of first information processor 30.

(Step S618) Port number differential information detector 93 of server 50 receives the port number differential detection packet transmitted from first information processor 30. Port number differential information detector 93 detects the position of port of first communication control unit 3 allowing to pass the port number differential detection packet included in the header of the port number differential detection packet.

(Step S619) Port number information transmitter for detecting port number 94 transmits the port number information for port differential detection showing the position of port of first communication control unit 3 allowing to pass the port number differential detection packet detected by port number differential information detector 93 to first information processor 30. The port number information for port differential detection is received in port number differential information receiver 74 in first information processor 30.

(Step S620) Port number differential detector 75 detects the port number differential of first communication control unit 3 on the basis of the port number information for port differential detection received in port number differential information receiver 74. The port number differential is detected in the same manner as in preferred embodiment 1, and its explanation is omitted.

(Step S621) Range detection packet transmitter 13 transmits the range detection packet to server 50 by way of first communication control unit 3.

(Step S622) Detector for detecting port number 91 of server 50 receives the range detection packet sent from first information processor 30. Detector for detecting port number 91 detects the position of port of first communication control unit 3 allowing to pass this port detection packet.

(Step S623) Port number information transmitter for detecting port number 92 transmits the port number information for port differential detection showing the position of port of first communication control unit 3 allowing to pass the range detection packet detected by detector for detecting port number 91 to first information processor 30. The port number information for port differential detection is received in port differential information receiver 71 in first information processor 30.

(Step S624) Bubble packet transmitter 12 transmits the IP address of second communication control unit 4 indicated by the address information transmitted at step S616, and a bubble packet to the target port for transmitting bubble packet of second communication control unit 4, on the basis of target port information for transmitting bubble packet transmitted at steps S614 and S615. When the target port for transmitting bubble packet includes two or more ports, the bubble packet transmitter 12 transmits bubble packets at every port number differential indicated by the port differential information received in port number differential receiver 18.

(Step S625) Range detection packet transmitter 13 transmits a range detection packet to server 50 by way of first communication control unit 3.

(Step S626) Detector for detecting port number 91 of server 50 receives the range detection packet sent from first information processor 30. Detector for detecting port number 91 detects the position of port of first communication control unit 3 allowing to pass this port detection packet.

(Step S627) Port number information transmitter for detecting port number 92 transmits the port number information for port differential detection showing the position of port of first communication control unit 3 allowing to pass the range detection packet detected by detector for detecting port number 91 to first information processor 30. The port number information for port differential detection is received in port differential information receiver 71 in first information processor 30.

(Step S628) Range detector 72 of first information processor 30 acquires the position of ports of first communication control unit 3 allowing to pass range detection packets transmitted at steps S621, S622, from the information for port differential detection received in port differential information receiver 71, and on the basis of position of two ports, the range of ports including the port assigning packet transmitting port is detected. The range of port may be either one port or may include two or more ports.

(Step S629) Range transmitter 73 of first information processor 30 transmits the range information showing the range of ports detected at step S628 to server 50 together with instruction for transmitting the range information to second information processor 40. Port number differential information transmitter 76 transmits the port number differential information showing the port number differential of first communication control unit 3 detected at step S620 to server 50 together with an instruction for transmitting to the port number differential information to second information processor 40. The range information and port number differential information may be transmitted by one packet, or by different packets.

(Step S630) Communication unit 61 of server 50 receives the range information and port number differential information, and sends the range information and other to second information processor 40. The range information is received in range receiver 27 of second information processor 40. The port number differential information is port number differential receiver 28.

(Step S631) Reply packet transmitter 29 sends a reply packet to first communication control unit 3 specified by the IP address showing the address information received at step S601. The reply packet is transmitted in every port number differential showing the port number differential information, to the ports in the range indicated by the range information received from the range receiver 27.

(Step S632) Reply packet receiver 14 of first information processor 30 receives the reply packet sent from second information processor 40. By receiving this reply packet, communication between first information processor 30 and second information processor 40 is established. Afterwards, the information can be transmitted and received between first information processor 30 and second information processor 40 without resort to server (for example, tunnel communication is established).

In FIG. 31 to FIG. 33, detection of port number differential may be anywhere before transmission of port number differential information and, for example, the port number differential information may be sent to the reception side right after detection of port number differential. Or transmission of address of transmission side (step S601) may be simultaneous with transmission of port number information for port differential detection (step 5608). Thus, in FIG. 31 to FIG. 33, there is a certain freedom about sequence of process. In FIG. 32, transmission of range detection packet and transmission of port assigning packet (steps S606, S609, S610), or transmission of range detection packet and transmission of bubble packet (steps S621, S624, S625) may be executed without waiting for reception of port number information for port differential detection.

Operation of communication system of the preferred embodiment is explained by referring to specific examples. In the specific examples, IP addresses of first communication unit 3 and others are same as in specific examples in preferred embodiment 1, except that first server 6 is replaced by server 50.

Second information processor 40 is supposed to be at sending/calling side. In the following specific examples, example 1 refers to a case in which second communication control unit 4 is other than PS NAT. In example 2, second communication control unit 4 is PS NAT, and first communication control unit 3 is other than PS NAT.

In the specific examples, in order to transmit and receive packets efficiently between server 50 and first information processor 30, or between server 50 and second information processor 40, determination of transmission and reception (step S101) and establishment of communication (step S102) are partly processed in parallel.

EXAMPLE 1

FIG. 34 to FIG. 38 explain this example. First information processor 30 and second information processor 40 are accessing server 50, and it is supposed that the IP address of first communication control unit 3, the port number of port P1 of first communication control unit 3, and the device ID of first information processor 30 have been already held in server 50. Similarly, the IP address of second communication control unit 4, the port number of port P2 of second communication control unit 4, and the device ID of second information processor 40 have been already held in server 50.

Figure 34:
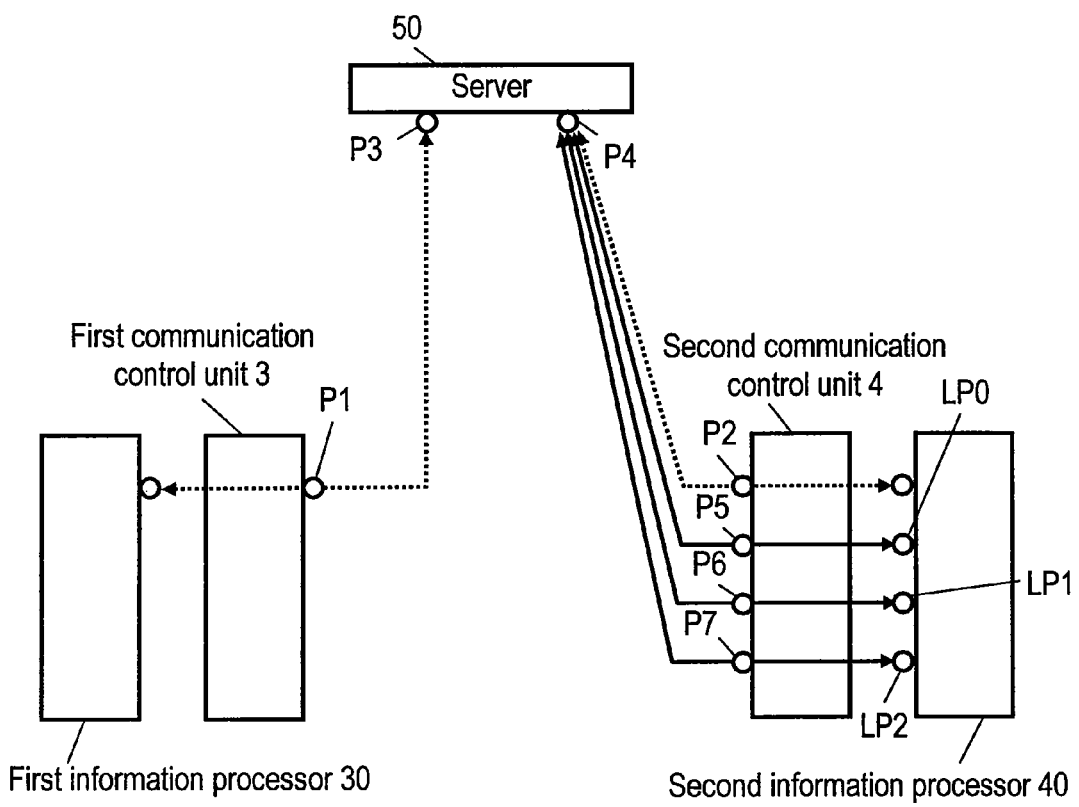
FIG. 34 is an explanatory diagram of specific example in the preferred embodiment.
Figure 35:
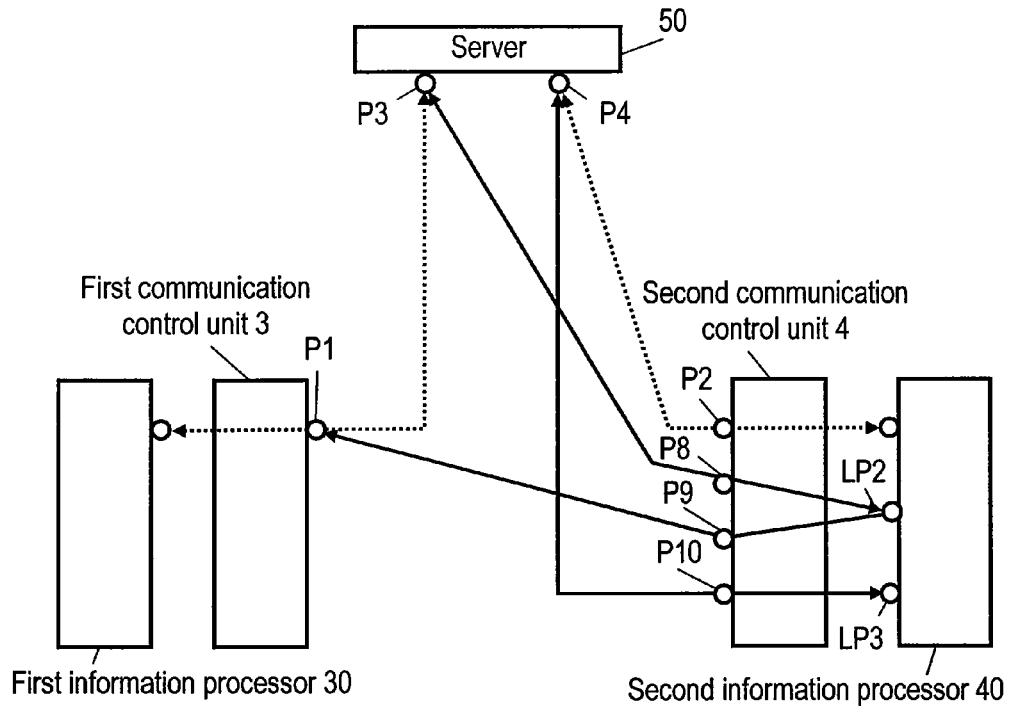
FIG. 35 is an explanatory diagram of specific example in the preferred embodiment.
Figure 36:
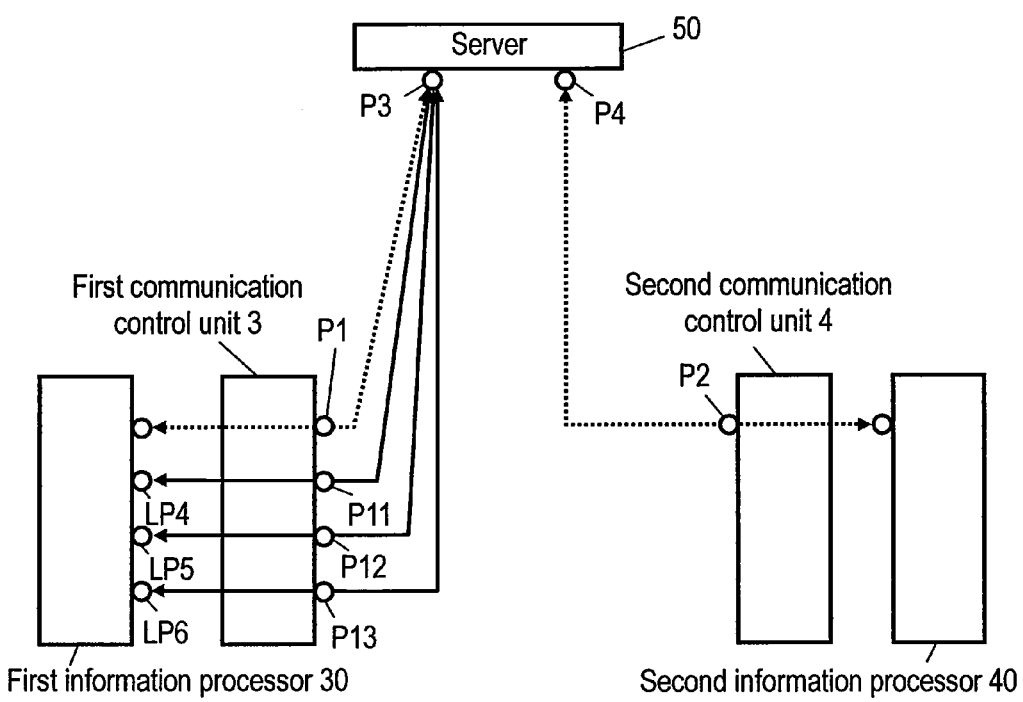
FIG. 36 is an explanatory diagram of specific example in the preferred embodiment.

First, operation of requesting connection from second information processor 40 is explained. In FIG. 34, second information processor 40 transmits device ID of first information processor 30 and connection request to server 50. As a result, server 50 transmits the IP address of first communication control unit 3 and port number of port P1 to second information processor 40 (step S601). This transmission is executed through port P2.

Packet transmitter for detecting port number 25 of second information processor 40 transmits three port number differential detection packets (packets of UDP) from ports LP0, LP1, LP2 of second information processor 40, respectively. Herein, ports LP0, LP1, LP2 are different ports newly assigned in second information processor 40. Therefore, regardless of the characteristic of second communication control unit 4, each port number differential detection packet is transmitted to server 50 by way of different ports P5, P6, P7 in second communication control unit 4 (step S602). Each port number differential detection packet is received in detector for detecting port number 93 by way of communication unit 61 of server 50, and the port numbers of ports P5, P6, P7 of second communication control unit 4 included in the header of each packet are detected (step S603). Port number information transmitter for detecting port number 94 transmits the port differential information which is the packet containing each port number in the payload, to the ports of second communication control unit 4 allowing to pass each port number differential detection packet (step S604). More specifically, to the port number differential detection packet transmitted through port P5, the port differential information including the port number of port P5 in its payload is transmitted by way of port PS. The port differential information is converted in address in second communication control unit 4, and is transmitted to port LP0 of second information processor 40. This port differential information is received in port differential information receiver 84 by way of communication unit 21. Similarly, through ports P6, P7, the port differential information is transmitted to second information processor 40. In this example, since the port number differential is detected by using also the range detection packet, the port number differential is not detected at this stage. The port number differential detection packet transmitted through port P7 serves also characteristic determination packet as the packet for determining the characteristic of second communication control unit 4, and therefore the port differential information transmitted through port P7 of second communication control unit 4 is also transferred to characteristic determination unit 43 from communication unit 21.

Range detection packet transmitter 23 of second information processor 40 transmits the range detection packet (a packet of UDP) from port LP2 to port P3 of server 50 (step S606). In this specific example, this range detection packet serves also as port number differential detection packet.

Port P3 is a port different from port P4 as transmission destination of port number differential detection packet. Therefore, when the port assigning rule of second communication control unit 4 is port sensitive type, that is, when PS NAT is used in second communication control unit 4, port P8 in second communication control unit 4 allowing to pass the range detection packet is a port different from port P7 allowing to pass the port number differential detection packet transmitted from port LP2, but when the port assigning rule of second communication control unit 4 is other than port sensitive type, port P7 and port P8 are the same port.

Detector for detecting port number 91 of server 50 receives the range detection packet transmitted to port P3 by way of communication unit 61. Detector for detecting port number 91 detects the port number of port P8 of second communication control unit 4 included in the header of its packet (step S607). Port number information transmitter for detecting port number 92 transmits the port differential information including the port number of detected port P8 in the payload to port P8 of second communication control unit 4 (step S608). The port differential information is converted in address in second communication control unit 4, and transmitted to port LP2 of second information processor 40, and received in port differential information receiver 81. In this example, the range detection packet transmitted to port P3 of server 50 serves also as port number differential detection packet and characteristic determination packet, and hence the port differential information is also transferred from communication unit 21 to port differential information receiver 84 and characteristic determination unit 43.

In this example, since the characteristic determination packet serves also as port number differential detection packet and range detection packet, port detector for characteristic determination 95 and port differential information transmitter for characteristic determination 96 of server 50 are not used.

Port number differential detector 85 detects the port number differential of second communication control unit 4 on the basis of port numbers of ports P5, P6, P7, P8 of second communication control unit 4 received in port differential information receiver 84 (step S605). More specifically, if the difference of port P8 and port P7 is not zero, the smallest value of difference between port P6 and port P5, difference between port P7 and port P6, and difference between port P8 and port P7 is detected as the port number differential of second communication control unit 4. On the other hand, if the difference of port P8 and port P7 is zero, the smaller value of difference between port P6 and port P5 and difference between port P7 and port P6 is detected as the port number differential of second communication control unit 4. In this example, since second communication control unit 4 is not PS NAT, the difference of port P8 and port P7 is zero. In this example, it is supposed that the port number differential is detected to be 1.

Characteristic determination unit 43 determines the characteristic of second communication control unit 4 on the basis of port numbers of ports P7 and P8 (step S501). More specifically, when port P7 and port P8 are the same, the characteristic of second communication control unit 4 is determined to be any one of full cone NAT, R NAT, PR NAT (these three address assigning types are NAT of cone, which is called cone system NAT), and AS NAT (that is, the port assigning rule is cone type or address sensitive type), and if port P7 and port P8 are different, the characteristic of second communication control unit 4 is determined to be PS NAT type (that is, the port assigning rule is port sensitive type). In this example, since second communication control unit 4 is not in PS NAT type, as mentioned above, port P7 and port P8 are the same, and characteristic determination unit 43 determines that second communication control unit 4 is not in PS NAT (step S502). As a result, second information processor 40 at sending/calling side operates as information processor at reception side (step S503).

Port assigning packet transmitter 41 of second information processor 40, using the address of first communication control unit 3 transmitted from server 50, transmits the port assigning packet as packet of UDP to port P1 of first communication control unit 3 (step S609). This port assigning packet is also transmitted from port LP2 of second information processor 40. This port assigning packet is transmitted through port P9 of second communication control unit 4. When AS NAT is used in second communication control unit 4, port P8 and port P9 are different, and when cone system NAT is used in second communication control unit 4, port P8 and port P9 are the same. By setting the life of the port assigning packet (for example, TTL set in this packet), it may be designed to extinguish before the port assigning packet reaches port P1. Port assigning packet is transmitted in order to leave transmission record in second communication control unit 4, and it is not particularly required that the port assigning packet may reach up to first communication control unit 3.

Range detection packet transmitter 23 transmits the range detection packet as packet of UDP from port LP3 of second information processor 40 to port P4 of server 50 (step S610). Port LP3 is a port newly assigned in second information processor 40, different from any of ports LP0, LP1, LP2. The range detection packet is transmitted by way of port P10 of second communication control unit 4. Herein, port P10 is different from any one of ports P7, P8, P9. The range detection packet is received in detector for detecting port number 91 of server 50, and the port number of port P10 included in the header is detected (step S611). The port differential information including this port number is transmitted from port number information transmitter for detecting port number 92 to second information processor 40 by way of port P10 (step S612). This port differential information is received in port differential information receiver 81 of second information processor 40. The range of target port for transmitting bubble packet is detected by range detector 82 (step S613). In this detection, the range from the port position of port P8 to the port position to be assigned one port before port P10 is detected as target ports for transmitting bubble packet. Depending on the characteristic of second communication control unit 4, port P8 and port P9 may be the same, but regardless of the characteristic of second communication control unit 4, port P9 and port P10 are always different. The port position to be assigned one port before port P10 is the port position indicated by the port number by subtracting the port number differential (1 in this example) of second communication control unit 4 detected by port number differential detector 85, from the port number of port P10. Target port transmitter for transmitting bubble packet 42 transmits the target port information for transmitting bubble packet indicating the target port for transmitting bubble packet detected by range detector 82, to server 50, together with instruction for transmission to first information processor 30 (step S614). Port number differential information transmitter 86 transmits the port number differential information showing the port number differential of second communication control unit 4, to server 50, together with instruction for transmission to first information processor 30 (step S614). Characteristic transmitter 44 transmits the information showing the characteristic of second communication control unit 4, that is, the characteristic information showing PS NAT is not used in second communication control unit 4, to server 50, together with instruction for transmission to first information processor 30.

These items of information are relayed by server 50, and transmitted to first information processor 30 by way of port P1 of first communication control unit 3 (step S615). The target port information for transmitting bubble packet is received in target port receiver for transmitting bubble packet 16. The port number differential information is received in port number differential receiver 18, and is transferred to bubble packet transmitter 12 by way of a route not shown. Characteristic information is transferred to packet transmitter for port differential detection 15, range detection packet transmitter 13, bubble packet transmitter 12, and others, and since PS NAT is not used in second communication control unit 4, first information processor 30 is judged to be responsible for processing sequence as the transmission side device.

Server 50 transmits the IP address of reception side second communication control unit 4 to first information processor 30 (step S616).

Packet transmitter for port differential detection 15 of first information processor 30 transmits the port number differential detection packets which are UDP packets, from different ports LP4, LP5 of first information processor 30 to port P3 of server 50 (step S617). These port number differential detection packets are transmitted to server 50 by way of different ports P11, P12 of first communication control unit 3, and are received in port number differential information detector 93. In port number differential information detector 93, port numbers of ports P11, P12 are detected same as in the case of port number differential detection packet transmitted from second information processor 40 (step S618). Port number information transmitter for detecting port number 94 transmits the port differential information which is the packet including the detected port numbers of ports P11, P12 in the payload, to first information processor 30 by way of ports P11, P12, respectively (step S619). The port differential information is received in port number differential information receiver 74. In this example, the port number differential is detected also by using the range detection packet, the port number differential is not detected as this stage.

Range detection packet transmitter 13 transmits the range detection packet as UDP packet from port LP6 of first information processor 30 (step S621). This range detection packet is transmitted to port P3 of server 50 by way of port P13 of first communication control unit 3. Herein, the range detection packet serves also as port number differential detection packet. Port LP6 is a port newly assigned in first information processor 30, different from ports LP4, LP5.

The range detection packet is received in detector for detecting port number 91 of server 50, and port number of port P13 is detected (step S622). Port number information transmitter for detecting port number 92 transmits the port differential information which is a packet including the detected port number of port P13 in the payload, to first information processor 30 by way of port P13 (step S623). The port differential information is received in port differential information receiver 71, and this range detection packet serves also as port number differential detection packet, and hence communication unit 11 transfers this port differential information also to port number differential information receiver 74.

Port number differential detector 75 detects the port number differential of first communication control unit 3, on the basis of port numbers of ports P11, P12, P13 of first communication control unit 3 received in port differential information receiver 84 (step S620). More specifically, the smaller value of difference of port P12 and port P11 and difference of port P13 and port P12 is detected as the port differential number of first communication control unit 3. In this example, port number differential of 1 is detected.

Figure 37:
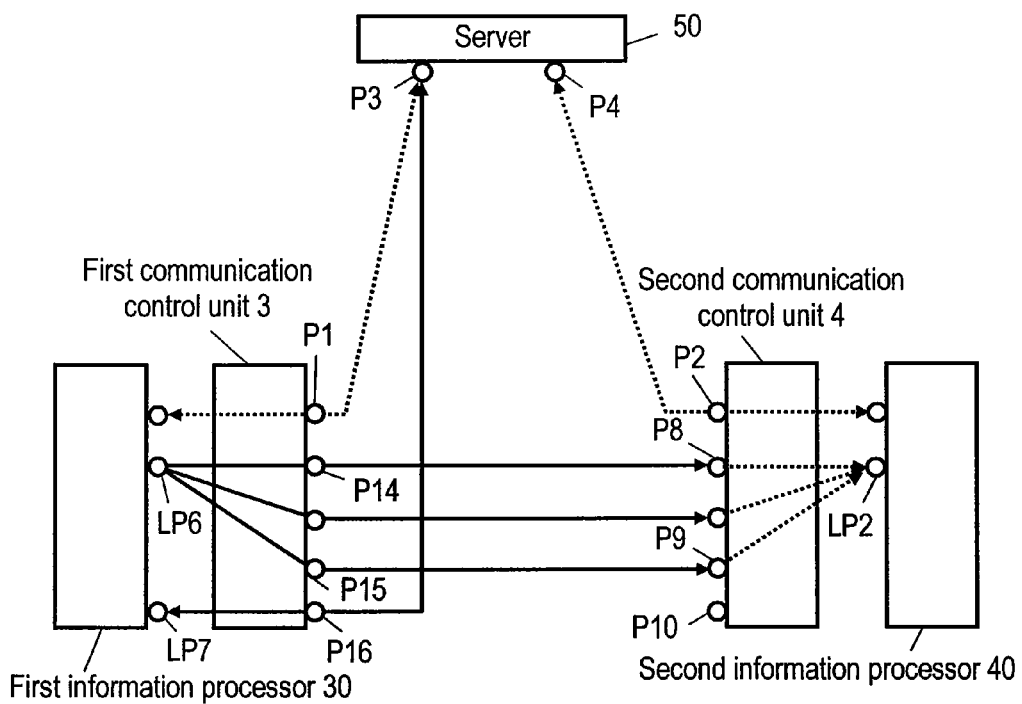
FIG. 37 is an explanatory diagram of specific example in the preferred embodiment.

Bubble packet transmitter 12 transmits bubble packets to target ports for transmitting bubble packet in a range indicated by target port information for transmitting bubble packets (step S624). The bubble packet is transmitted from port LP6 of first information processor 30. If the range of target port for transmitting bubble packet includes plural ports, the bubble packets are transmitted in every port number differential (in every 1 in this example) indicated by the port differential information of second communication control unit 4 received in port number differential receiver 18. In this example, as shown in FIG. 37, suppose the bubble packets are transmitted by way of ports from port P14 to port P15 of first communication control unit 3. Depending on the characteristic of the second communication control unit 4, the bubble packet may be received in port LP2, but in this example, the process is further continued in order to establish the communication securely between first information processor 30 and second information processor 40.

Range detection packet transmitter 13 transmits the range detection packet from port LP7 of first information processor 30 to port P3 of server 50 (step S625). Port LP7 and port LP6 are different ports, and are ports newly assigned in first information processor 30. Since port LP7 is a new port, port P16 allowing to pass the range detection packet is a port different from port P15. The range detection packet transmitted through port P16 is received in detector for detecting port number 91 of server 50, and the port number of port P16 is detected (step S626). Port number information transmitter for detecting port number 92 transmits the port differential information which is a packet including the detected port number in payload to first information processor 30 by way of port P16 of first communication control unit 3 (step S627). The port differential information transmitted from server 50 is received in port differential information receiver 71. Range detector 72 detects the range of ports including the bubble packet transmitting port on the basis of port positions of port P13 and port P16 (step S628). In this detection, the range from the port position of port P13 to the port position to be assigned one port before port P16 is detected as range including the port for transmitting bubble packet. Regardless of the characteristic of first communication control unit 3, port P15 and port P16 are always different, and port P16 is not included in this range. The port position to be assigned one port before port P16 is the port position indicated by the port number by subtracting the port number differential (1 in this example) of first communication control unit 3 detected by port number differential detector 75, from the port number of port P16. Range transmitter 73 transmits the range information showing the range of ports detected by range detector 72, to server 50, together with instruction for transmission to second information processor 40 (step S629). Port number differential information transmitter 76 transmits the port number differential information showing the port number differential of first communication control unit 3, to server 50, together with instruction for transmission to second information processor 40 (step S629).

These items of information are relayed by server 50, and transmitted to second information processor 40 by way of port P2 of second communication control unit 4 (step S630). The range information is received in range receiver 27. The port number differential information is received in port number differential receiver 28. Reply packet transmitter 29 sends reply packet to the port in the range indicated by the range information received in the range receiver 27 (step S631).

The reply packet is sent from port LP6 of first information processor 30. If the range information is a range including plural ports, the reply packet is transmitted in every port number differential (1 in this example) indicated by the port number differential information of first communication control unit 3 received in the port number differential receiver 28.

Figure 38:
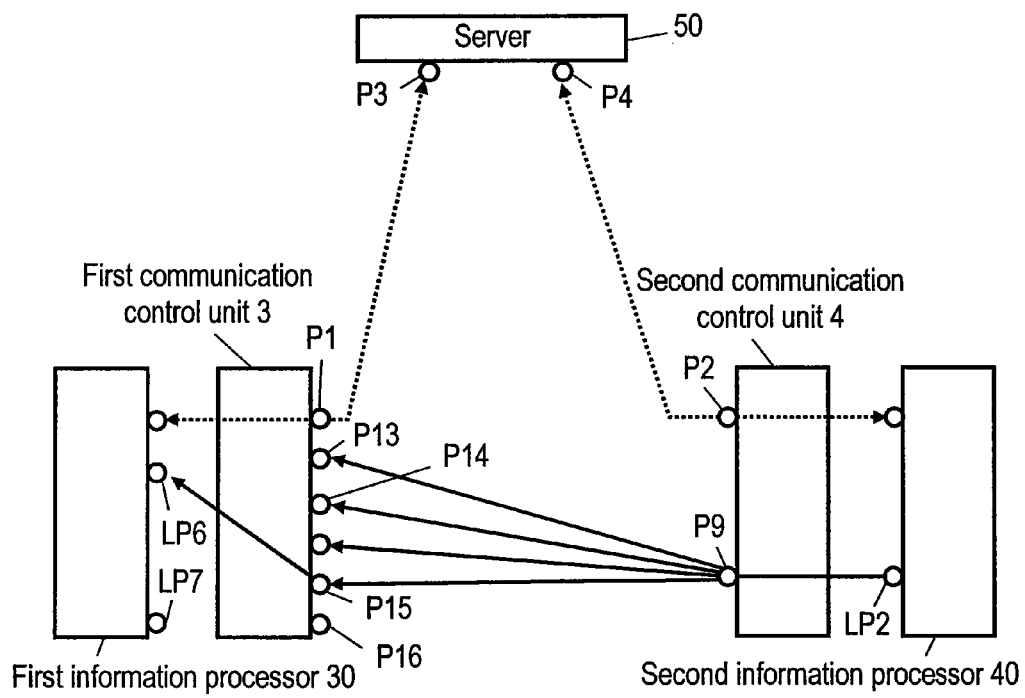
FIG. 38 is an explanatory diagram of specific example in the preferred embodiment.

In this example, as shown in FIG. 38, the reply packet is transmitted by way of port P9 of second communication control unit 4. Since PS NAT is not used in second communication control unit 4, all reply packets to be transmitted to first communication control unit 3 have been already sent by way of port P9. Thus, in order that all reply packets be transmitted from port P9, second information processor 40 has primarily sent all port assigning packets to first communication control unit 3 from port LP2.

Of the reply packets sent from second information processor 40, the reply packet sent to the bubble packet transmitting port allowing to pass the bubble packet sent to port P9 is converted in address in first communication control unit 3, and is received in reply packet receiver 24 of first information processor 30 (step S632). Depending on the characteristic of first communication control unit 3, plural reply packets may be received in first information processor 30.

Thus, communication between first information processor 30 and second information processor 40 is established.

In the communication system of the preferred embodiment, the reason of transmitting the port assigning packet is briefly explained. Before transmission of bubble packet, by transmitting the port assigning packet to the first communication control unit 3, port P9 is assigned in second communication control unit 4. Since PS NAT is not used in the reception side device (see FIG. 29), PS NAT is not used in second communication control unit 4 (that is, the port assigning rule is not port sensitive type). Therefore, from port LP2 transmitting this port assigning packet, by transmitting the reply packet to first communication control unit 3, the reply packet is transmitted through port P9 of second communication control unit 4 assigned by transmission of port assigning packet.

By detecting the range including this port P9, and transmitting the bubble packet to this range, at least one bubble packet can be transmitted to port P9. Then, in the range of ports including the bubble packet transmitting port, by sending the reply packet from port LP2, the reply packet can be sent to the port of first communication control unit 3 allowing to pass the bubble packet transmitted to port P9, by way of port P9. As a result, if PR NAT or PS NAT is used in first communication control unit 3, the reply packet is received in first information processor 30, and communication between first information processor 30 and second information processor 40 is established. Thus, the port assigning packet is transmitted in order to assign the passing port of reply packet preliminarily in second communication control unit 4 (in other words, to determine the range of target ports for transmitting bubble packet).

EXAMPLE 2

In example 2, PS NAT is used in second communication control unit 4, and other than PS NAT is used in first communication control unit 3. Same as in example 1, second information processor 40 is at sending/calling side.

Second information processor 40 transmits port number differential detection packet, range detection packet, and port assigning packet, and the port number differential of second communication control unit 4 is detected, the position of target port for transmitting bubble packet is detected, and the characteristic of second communication control unit 4 is determined, and this series of operation is same as in example 1.

As the port number differential information, target port information for transmitting bubble packet, and characteristic are transmitted from second information processor 40 by way of server 50 (steps S614, S615), first information processor 30 knows that PS NAT is used in second communication control unit 4. As a result, first information processor 30 executes the process from step S601 to step S614, and the judging process (process explained in FIG. 34 and FIG. 35 in example 1) to determine the characteristic of first communication control unit 3 of receiving side (first information processor 30 side) at step S504. These processes are same as in example 1, except that the reception side and transmission side are exchanged, and its explanation is omitted. In this example, since PA NAT is not used in first communication control unit 3, the receiving side is judged to be reception side (step S506). In the state of exchange of reception side and transmission side in example 1, transmission of bubble packet, detection of range including bubble packet transmitting port, and transmission of reply packet are conducted, and communication is established between first information processor 30 and second information processor 40. This is same as in example 1, and explanation is omitted.

In the foregoing examples, the port assigning packet is explained to be transmitted from the same port (port LP2) as the port used for transmitting the first range detection packet, but the port assigning packet may be transmitted from the same port (port LP3) as the port used for transmitting the second range detection packet. In this case, the target ports for transmitting bubble packet range from the port assigned next to port P8 to port P10. Otherwise the port assigning packets and two range detection packets may be transmitted from different ports (ports newly assigned in second information processor 40, respectively). In this case, the target ports for transmitting bubble packet range from the port assigned next to the port of second communication control unit 4 allowing to pass the first range detection packet to the port assigned one port before the port of second communication control unit 4 allowing to pass the second range detection packet. These target ports for transmitting bubble packet are explained as a minimum range of ports, and target ports for transmitting bubble packet may be specified in a wider range than the range including these target ports for transmitting bubble packet.

Similarly, the bubble packet may be transmitted from port LP7, instead of port LP6. In this case, too, the reply packet transmitting range is from the port assigned next to port P13 to port P16. Or the bubble packet and second range detection packet may be transmitted from different ports (ports newly assigned in first information processor 30, respectively). In this case, the range of ports including the bubble packet transmitting port ranges from the port assigned next to the port of first communication control unit 3 allowing to pass the first range detection packet, to the port assigned one port before the port of first communication control unit 3 allowing to pass the second range detection packet. The range of these ports including the ports for transmitting bubble packet are explained as a minimum range of ports, and a wider range than the range including these may be defined as a range of ports including ports for transmitting bubble packet.

In the specific examples, in order to decrease the number of times of communication between server 50 and information processor, one packet has plural roles, and efficient communication of packet is explained, but the packet may be also transmitted so that one packet may have one role only. In the examples, characteristic determination of communication control unit, and establishment of communication between information processors are executed in parallel, but these processes may be done separately. In such a case, in determination of characteristic, characteristic determination port detector 95 and characteristic determination port information transmitter 96 may be used.

Thus, according to the communication system of the preferred embodiment, except when PS NAT is used in both first communication control unit 3 and second communication control unit 4, communication is established between first information processor 30 and second information processor 40. Further, only by checking if PS NAT is used in the communication control unit or not, the establishment of communication can be executed without requiring further particular determination.

Figures 39, 40:
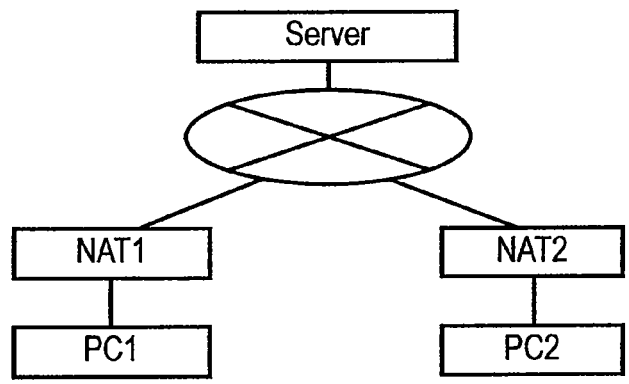
FIG. 39 is a diagram of combination of characteristics of communication control units that can be connected in the preferred embodiment.
FIG. 40 is a diagram showing an example of communication system.

In the method of preferred embodiment 1, when PR NAT is used in transmission side device, it is required to exchange transmission and reception (see FIG. 17), but in the method of this preferred embodiment, it is not required to exchange transmission and reception even if RP NAT is used in either transmission side or reception side information processor. Therefore, when the cone system NAT is used in the communication system, communication between information processors can be established without exchanging transmission and reception (see FIG. 39).

In the preferred embodiment, since it is not required to determine whether AS NAT is used or not in the communication control unit (it is only required to determine whether PS NAT is used or not), it is not necessary to specify the communication control unit using two or more servers, and a simple configuration of communication system is realized.

In the preferred embodiment, it is explained that detection of port number differential, detection of range of ports including bubble packet transmitting port, and detection of target port for transmitting bubble packet are executed in the information processor, one or more arbitrary processes of these processes may be executed in server 50 same as in preferred embodiment 1.

In the preferred embodiment, in order to detect the target port for transmitting bubble packet, two range detection packets are transmitted before and after transmission of port assigning packet, but by transmitting only one range detection packet, the target port information for transmitting bubble packet may show only the upper limit or lower limit of the target port for transmitting bubble packet. In this case, bubble packets may be transmitted to all ports included in the range.

Or, the bubble packet may be transmitted to all ports in the reception side communication control unit. In this manner, bubble packets can be transmitted to all ports used in transmission of port assigning packet. Herein, in spite of all ports, well-known ports of which application is already known may be excluded, and the reply packet may be transmitted to other than well-known ports. When transmitting the bubble packet to every specified port number differential, the position of the port as the base point maybe noticed to the transmission side information processor.

In the preferred embodiment, too, even in the communication system not having one communication control unit, communication between information processors can be established same as in preferred embodiment 3.

In the foregoing preferred embodiments, the communication system is a communication system comprising information processors for transmitting bubble packets, and a server (or two or more servers) for processing detection of range of ports including bubble packet transmitting port, and it may be designed to detect the range of ports including the bubble packet transmitting port. That is, the communication system of the invention may be a communication system as described below. The communication system is a communication system comprising an information processor, a communication control unit for controlling the communication of the information processor, and a server, in which the information processor includes a bubble packet transmitter for transmitting one or more bubble packets for leaving transmission record in the communication control unit, and a range detection packet transmitter for transmitting the range detection packet used for detecting the range of ports including one or more bubble packet transmitting ports as ports of the communication control unit used in transmission of one or more bubble packets, to the server, and the server includes a range detector for detecting the range of ports including the one or more bubble packet transmitting ports on the basis of the range detection packet by receiving the range detection packet. In this communication system, the transmission destination of bubble packet may be, for example, other communication control unit as the communication partner of the information processor, or the communication control unit for controlling communication of other information processor as communication partner. In the communication system, the range of ports detected by the server may be transmitted to the information processor by transmitter, or transferred to the information processor by other method. Other method includes, for example, a method of recording the information showing the range of ports in a recording medium, and reading out the information from the recording medium by the information processor, or a method of displaying the information showing the range of ports in the server, and allowing the user to see the display and enter the information showing the range of ports in the information processor. Or, as shown in preferred embodiment 4, one or more bubble packets may be transmitted in the communication system.

Other communication system is a communication system comprising an information processor, a communication control unit for controlling the communication of the information processor, and a server, in which the information processor includes a bubble packet transmitter for transmitting one or more bubble packets for leaving transmission record in the communication control unit, a range detection packet transmitter for transmitting the range detection packet used for detecting the range of ports including one or more bubble packet transmitting ports as ports of the communication control unit used in transmission of one or more bubble packets, to the server, a port differential information receiver for receiving the port differential information showing the position of the port of communication control unit allowing to pass the range detection packet, and a range detector for detecting the range of ports including one or more bubble packet transmitting ports on the basis of the port differential information received in the port differential information receiver, and the server includes a detector for detecting port number by receiving the range detection packet and detecting the position of the port of the communication control unit allowing to pass the range detection packet, and a port number information transmitter for detecting port number for transmitting the port differential information showing the position of the port detected by the detector for detecting port number to the information processor. In this manner, the range may be detected by the information processor, instead of the server. In this communication system, the transmission destination of bubble packet may be, for example, other communication control unit as the communication partner of the information processor, or the communication control unit for controlling communication of other information processor as communication partner. In the communication system, the range of ports detected by the information processor may be transmitted to other information processor by transmitter, or transferred to the other information processor by other method. Other method includes, for example, a method of recording the information showing the range of ports in a recording medium, and reading out the information from the recording medium by the information processor, or a method of displaying the information showing the range of ports in the information processor, and allowing the user to see the display and enter the information showing the range of ports in the information processor. Or, as shown in preferred embodiment 4, one or more bubble packets may be transmitted in the communication system.

In the foregoing embodiments, first servers 6, 60 and server 50 function to notice IP address of partner side communication control unit to the information processor, but this function may be realized by other server than first server 6, etc. That is, the server for noticing the address of other communication control unit to one information processor may be different from the server for processing about range detection packet, etc. On the other hand, in process about notice of address of other communication control unit to one information processor, or in process about calling of partner side (receiving side) information process by sending/calling side information processor, SIP (session initiation protocol) may be used.

In the explanation of the foregoing preferred embodiments, the reply packet is transmitted in every port number differential indicated by the port differential information, but the reply packet may be transmitted at port interval of 1 regardless of the port number differential.

In the explanation of the foregoing preferred embodiments, the reply packet is transmitted in a range of ports indicated by the range information, but the reply packet may be transmitted to all ports in the transmission side communication control unit. In this manner, the reply packet can be transmitted to the bubble packet transmitting port used in transmission of bubble packet. By the range information, when the upper limit or lower limit of the range is shown, the reply packet may be transmitted to all ports in this range. Herein, in spite of all ports, well-known ports of which application is already known may be excluded, and the reply packet may be transmitted to other than well-known ports. When transmitting the reply packet to every specified port number differential, the position of the port as the base point may be noticed to the reception side information processor.

In the explanation of the foregoing preferred embodiments, too, the type of NAT used in the communication control unit is determined in first server 6, etc. or information processor, but, for example, the characteristic (type of NAT) of communication control unit entered from the information processor by manual input or the like by the user may be held in first server 6, etc., or may be stored in memory means (for example, nonvolatile memory) held by communication control unit, and the characteristic of the communication control unit may be determined by reading the stores characteristic by first server 6, etc. The characteristic of the communication control unit may be stored somewhere other than the communication control unit. For example, the database server may store the characteristic by corresponding to the ID or type number of the communication control unit.

In the preferred embodiments, in first server 6, etc. or information processor, the characteristic of the communication control unit is detected, but the detection timing is not specified. That is, it may be after request for establishment of communication from either information processor, or the characteristic may be determined in advance when the information processor is connected to first server 6, etc.

The IP address of the communication control unit or the port number differential of communication control unit may be transferred to the information processor by manual input by the user, instead of being transmitted from first server 6, etc., or the port number differential stored in the communication control unit may be acquired.

As explained herein, the target port for transmitting bubble packet is noticed from first server 6, etc. or reception side information processor, to transmission side information processor, but the target port for transmitting bubble packet may be preliminarily set in the transmission side information processor, or the position of the target port for transmitting bubble packet may be detected by transmission side information processor by manual input by the user or access to specified server.

In preferred embodiments 1 to 3, the first server and second server communicate directly with each other, but the first server and second server may share the information between servers (for example, port number of port P8 in FIG. 12), by way of specified shared recording medium.

In these preferred embodiments, in order to limit the target ports for transmitting bubble packet to specified ports, it is mainly explained to transmit the target port information for transmitting bubble packet, but the target port information for transmitting bubble packet is not intended to limit the target port for transmitting bubble packet, but may be transmitted only for the purpose of specifying the port of transmission destination of bubble packet.

In the preferred embodiments, each information processor is connected to communication network 5 through only one communication control unit, but if connected to communication network 5 through plural communication control units (that is, in the case of multi-stage connection NAT), communication between information processors can be established.

In the preferred embodiments, first communication control unit 3 and second communication control unit 4 have the NAT function, but first communication control unit 3 and second communication control unit 4 may have, instead of the NAT function, or together with the NAT function, firewall function of packet filtering. The packet filtering is to select the reception packet on the basis of, for example, the reception filter rule. When first communication control unit 3 has the firewall function on the basis of such reception filter rule, by leaving the transmission record in first communication control unit 3 by transmission of bubble packet from the local side (first information processor 1, etc. side) to the global side (communication network 5), the reply packet transmitted to bubble packet transmitting port may be received. Or when second communication control unit 4 has the fire wall function on the basis of such reception filter rule, by transmission of reply packet from the local side (second information processor 2, etc. side) to the global side by way of the target port for transmitting bubble packet, communication is established between first information processor 1, etc. and second information processor 2, etc.

Herein, first information processor 1, etc. and second information processor 2, etc. may or may not support the firewall function as application.

In the preferred embodiments, first server 6 or the like is specified by the IP address, but first server 6 or the like may be specified by domain name (for example, server.pana.net or the like). In this case, the domain name is converted into IP address by using the DNS server, and first server 6 or the like can be specified.

The protocol used in communication in the preferred embodiments may be either IPv4 (Internet protocol version 4) or IPv6 (Internet protocol version 6).

In the preferred embodiments, each process (each function) may be realized by concentrated processing by a single device (system), or realized by discrete processing by plural devices.

In the preferred embodiments, the constituent elements may be composed of exclusive hardware, or constituent elements that can be realized by the software may be realized by the software by program control. The software for realizing the information processor in the preferred embodiments may include the following program. That is, the program is a program for executing the process in the first information processor for communicating with the second information processor, by way of the first communication control unit for controlling the communication of the first information processor and the second communication control unit for controlling the communication of the second information processor, and is intended to execute a bubble packet transmitting step of transmitting the bubble packet for leaving the transmission record in the first communication control unit to the second communication control unit by way of the first communication control unit, and a reply packet transmitting step of receiving the reply packet transmitted to the bubble packet transmitting port as the port of the first communication control unit from the second information processor by way of the second communication control unit.

In this program, the computer may further execute a range detection packet transmitting step of transmitting the range detection packet used in detection of range of ports including the bubble packet transmitting port.

In this program, at the range detection packet transmitting step, the range detection packet may be transmitted before and after transmission of bubble packet in the bubble packet transmitting step.

In this program, at the range detection packet transmitting step, the range detection packet may be transmitted before and after transmission of bubble packet to mutually different addresses.

In this program, the computer may further execute a step of receiving the target port for transmitting bubble packet for receiving the target port information for transmitting bubble packet showing the position of the target port for transmitting bubble packet which is the target port for transmitting the bubble packet in the second communication control unit, and at the bubble packet transmitting step, the bubble packet may be transmitted to the target port for transmitting bubble packet indicated by the target port information for transmitting bubble packet.

In this program, the target port for transmitting bubble packet may be a port for transmitting and receiving the information with the server for establishing communication between the first information processor and second information processor by the second information processor.

In this program, the computer may further execute a port number differential detection packet transmitting step of transmitting a port number differential detection packet for detecting the port number differential in the first communication control unit by way of the first communication control unit.

In this program, the first communication control unit transmits the bubble packet for leaving the transmission record in the second communication control unit from the second information processor by way of the second communication control unit, and the computer may also execute a reply packet transmitting step of transmitting the reply packet to one or more ports at least including the port of the second communication control unit used in transmission of the bubble packet from the second information processor.

In this program, the computer may further execute a range receiving step of receiving the range information as the information showing the range of ports for transmitting the reply packet, and the reply packet may be sent to the ports in the range indicated by the range information at the reply packet transmitting step.

In the program, the computer may further execute a port number differential receiving step of receiving the port number differential information as the information showing the port number differential in the second communication control unit, and the reply packet may be sent in every port number differential indicated by the port number differential information at the reply packet transmitting step.

The software for realizing the information processor in the preferred embodiments is the following program. That is, the program is a program for executing the process in the first information processor for communicating with the second information processor, by way of the first communication control unit for controlling the communication of the first information processor and the second communication control unit for controlling the communication of the second information processor, in which the first communication control unit receives the bubble packet for leaving the transmission record in the second communication control unit, from the second information processor by way of the second communication control unit, and executes the reply packet transmitting step of sending the reply packet to one or more ports including at least the port of the second communication control unit used in transmission of the bubble packet from the second information processor.

In this program, the computer may further execute a range receiving step of receiving the range information as the information showing the range of ports for transmitting the reply packet, and the reply packet may be sent to the ports in the range indicated by the range information at the reply packet transmitting step.

In the program, the computer may also execute a port number differential receiving step of receiving the port number differential information as the information showing the port number differential in the second communication control unit, and the reply packet may be sent in every port number differential indicated by the port number differential information at the reply packet transmitting step.

The software for realizing the server in the preferred embodiments is the following program. That is, the program is a program for executing the process in the server for establishing communication between the first information processor and second information processor, by way of the first communication control unit for controlling the communication of the first information processor and the second communication control unit for controlling the communication of the second information processor, and is intended to execute an information transmitting and receiving step of transmitting and receiving information between the first information processor and second information processor, a characteristic determining step of determining the characteristic of the first communication control unit and second communication control unit, and a transmission and reception determining step of determining either one of the first information processor and second information processor at transmission side (transmission side information processor) and other at reception side (reception side information processor) depending on the judging result at the characteristic determining step.

In this program, the computer may further execute a transmitting step of target port for transmitting bubble packet for transmitting the target port information for transmitting bubble packet indicating the position of the target port for transmitting bubble packet as the target port for transmitting the bubble packet for leaving the transmission record in the communication control unit (transmission side communication control unit) for controlling the communication of the transmission side information processor by the transmission side information processor, to the transmission side information processor.

In this program, the target port for transmitting bubble packet indicated by the target port information for transmitting bubble packet may be the port of the reception side communication control unit, used in communication between the information transmitter and receiver and the reception side information processor.

In this program, the computer, receiving the range detection packet, from the transmission side information processor, for detecting the range of ports including the bubble packet transmitting port to the target port for transmitting bubble packet in the reception side communication control unit, may further execute a range detecting step of detecting the range of ports including the bubble packet transmitting port, and a range transmitting step of transmitting the range information as the information showing the range of ports including the bubble packet transmitting port detected at the range detecting step.

In this program, at the range detecting step, the range may be detected on the basis of the range detection packet transmitted to plural addresses.

In this program, the computer, receiving the port number differential detection packet for detecting the port number differential in the transmission side communication control unit transmitted from the transmission side information processor by way of the transmission side communication control unit, may further execute a port number differential detecting step of detecting the port number differential in the transmission side communication control unit on the basis of the port number differential detection packet, and a port number differential transmitting step of transmitting the port number differential information as the information showing the port number differential of the transmission side communication control unit detected at the port number differential detecting step.

In this program, the computer may further execute a detection port information receiving step of receiving the detection port information showing the position of the port of the first communication control unit allowing to pass the range detection packet, a range detecting step of detecting the range of ports including the bubble packet transmitting port on the basis of the detection port information received at the detection port information receiving step, and a range transmitting step of transmitting the range information as the information showing the range of ports including the bubble packet transmitting port detected at the range detecting step.

In this program, the computer may further execute a port differential information receiving step of receiving the port differential information showing the position of the port in the first communication control unit allowing to pass the port number differential detection packet, a port number differential detecting step of detecting the port number differential in the first communication control unit on the basis of the port differential information received at the port differential information receiving step, and a port number differential transmitting step of transmitting the port number differential information as the information showing the port number differential of the first communication control unit detected at the port number differential detecting step to the second information processor.

In this program, the computer may further execute a receiving step of target port for transmitting bubble packet of receiving the target port information for transmitting bubble packet indicating the position of the target port for transmitting bubble packet as the target port for transmitting the bubble packet in the second communication control unit, and the bubble packet may be transmitted to the target port for transmitting bubble packet indicated by the target port information for transmitting bubble packet at the bubble packet transmitting packet.

In this program, the target port information for transmitting bubble packet is the information showing the position of one or more target ports for transmitting the bubble packets, and at the bubble packet transmitting step, the bubble packet may be transmitted to one or more target ports for transmitting bubble packet indicated by the target port information for transmitting bubble packet.

In this program, the computer may further execute a port assigning packet transmitting step of transmitting a port assigning packet for assigning the port for transmitting the reply packet in the first communication control unit, and the reply packet may be transmitted from the port of the first information processor receiving the port assigning packet at the reply packet transmitting packet.

In this program, the computer may further execute a range detection packet transmitting step of transmitting the range detection packet used in detection of range of ports including the port assigning packet transmitting port as the port in the first communication control used in transmission of the port assigning packet.

The software for realizing the information processor in the preferred embodiments is the following program. That is, the program is a program for causing the computer to execute the process in the information processor for composing a communication system comprising an information processor, a communication control unit for controlling the communication of the information processor, and a server, and is intended to execute a bubble packet transmitting step of transmitting one or more bubble packets for leaving the transmission record in the communication control unit by way of the communication control unit, and a range detection packet transmitting step of transmitting the range detection packet used in detection of range of ports including one or more bubble packet transmitting ports as the ports of the communication control unit used in transmission of one or more bubble packets.

In this program, the computer may further execute a detection port information receiving step of receiving the detection port information showing the position of the port of the communication control unit allowing to pass the range detection packet, and a range detecting step of detecting the range of ports including one or more bubble packet transmitting ports on the basis of the detection port information received at the detection port information receiving step.

In this program, the computer may further execute a range transmitting step of transmitting the range information as the information showing the range of ports including one or more bubble packet transmitting ports detected at the range detecting step.

The software for realizing the server in the preferred embodiments is the following program. That is, the program is a program for causing the computer to execute the process in the server for composing a communication system comprising an information processor, a communication control unit for controlling the communication of the information processor, and a server, and is intended to execute, by receiving the range detection packet transmitted from the information processor used for detecting the range of ports including one or more bubble packet transmitting ports as ports of the communication control unit used in transmission of one or more bubble packets transmitted for leaving the transmission record in the communication control unit, a range detecting step of detecting the range of ports including one or more bubble packet transmitting ports on the basis of the range detection packet, and a range transmitting step of transmitting the range information as the information showing the range of ports including one or more bubble packet transmitting ports detected at the range detecting step.

Other program is a program for causing the computer to execute the process in the server for composing a communication system comprising an information processor, a communication control unit for controlling the communication of the information processor, and a server, and is intended to execute, by receiving the range detection packet transmitted from the information processor used for detecting the range of ports including one or more bubble packet transmitting ports as ports of the communication control unit used in transmission of one or more bubble packets transmitted for leaving the transmission record in the communication control unit, a detection port detecting step of detecting the position of the port of communication control unit allowing to pass the range detection packet, and a detection port information transmitting step of transmitting the detection port information showing the position of the port detected at the detection port detecting step to the information processor.

In these programs, in the transmitting step of transmitting information or in the receiving step of receiving information, the process executed in the hardware, such as the process conducted in the modem or interface card at the transmitting step (the process executed only in the hardware) is not included.

The program may be distributed by downloading from the server or the like, or may be distributed by recording from a specified recording medium (for example, optical disk such as CD-ROM or magnetic disk, semiconductor memory, etc.).

The computer for executing the program may be either one or plural. That is, either concentrated process or discrete process may be applied.

INDUSTRIAL APPLICABILITY

As described herein, in the communication system and others by the invention, communication can be established between plural information processors by way of a communication control unit, and it is very useful for communication between information processors.

The invention claimed is:

1. A communication system comprising:
   a first information processor;
   a second information processor;
   a first communication control unit coupled to a network for relaying communication between the first information processor and the network;
   a server coupled to the network; and
   a second communication control unit coupled to the network for relaying communication between the second information processor and the network,
   the first information processor includes:
      a bubble packet transmitter transmitting a bubble packet from a bubble packet transmitting port to the second communication control unit via the first communication control unit; and
      a range detection packet transmitter transmitting a range detection packet to the server via the first communication control unit on a first detection port before transmitting the bubble packet and on a second detection port after transmitting the bubble packet;
   the server includes:
      a port range detector which receives the range detection packet from the first communication control unit and detects a range of ports in between the first detection port and second detection port, the range of ports including the bubble packet transmitting port.

2. The communication system according to claim 1, wherein the server further includes a port range information transmitter transmitting port range information showing the range of ports detected by the range detector.

3. The communication system according to claim 1, wherein the range detection packet transmitter transmits the range detection packet to different addresses before and after transmitting the bubble packet.

4. The communication system according to claim 1, wherein the range detection packet transmitter transmits the range detection packet through newly assigned ports before and after transmitting the bubble packet.

* * * * *